(12) United States Patent
Drake et al.

(10) Patent No.: US 9,054,530 B2
(45) Date of Patent: Jun. 9, 2015

(54) PULSED INTERRUPTER AND METHOD OF OPERATION

(71) Applicant: GENERAL ATOMICS, San Diego, CA (US)

(72) Inventors: Joel Lawton Drake, San Diego, CA (US); Robert Kratz, San Diego, CA (US)

(73) Assignee: General Atomics, San Diego, CA (US)

( * ) Notice: Subject to any disclaimer, the term of this patent is extended or adjusted under 35 U.S.C. 154(b) by 122 days.

(21) Appl. No.: 13/870,615

(22) Filed: Apr. 25, 2013

(65) Prior Publication Data
US 2014/0321013 A1    Oct. 30, 2014

(51) Int. Cl.
H02H 3/00    (2006.01)
H02H 7/00    (2006.01)
H01H 9/30    (2006.01)
H02H 3/26    (2006.01)

(52) U.S. Cl.
CPC ...................................... *H02H 3/26* (2013.01)

(58) Field of Classification Search
USPC ................................................. 361/78, 2, 14
See application file for complete search history.

(56) References Cited

U.S. PATENT DOCUMENTS

| | | | |
|---|---|---|---|
| 3,558,977 A | 1/1971 | Beaudoin | |
| 3,786,310 A | 1/1974 | Long | |
| 4,052,576 A | 10/1977 | Smith | |
| 4,052,577 A | 10/1977 | Votta | |
| 4,079,219 A | 3/1978 | Weston | |
| 4,087,664 A | 5/1978 | Weston | |
| 4,121,075 A * | 10/1978 | Tanaka | 218/57 |
| 4,153,518 A | 5/1979 | Holmes | |
| 4,204,101 A | 5/1980 | Dethlefsen | |
| 4,250,365 A * | 2/1981 | McConnell | 218/95 |
| 4,420,784 A | 12/1983 | Chen et al. | |
| 4,434,332 A | 2/1984 | Yanabu | |

(Continued)

FOREIGN PATENT DOCUMENTS

| | | |
|---|---|---|
| CA | 1166327 | 4/1984 |
| CA | 2018847 | 12/1990 |

(Continued)

OTHER PUBLICATIONS

PCT; International Search Report and Written Opinion of the International Searching Authority for International Patent Application No. PCT/US2014/035200 mailed Aug. 25, 2014.

*Primary Examiner* — Scott Bauer
(74) *Attorney, Agent, or Firm* — Fitch, Even, Tabin & Flannery LLP

(57) ABSTRACT

Some embodiments provide interrupter systems comprising: a first electrode; a second electrode; a piston movably located at a first position and electrically coupled with the first and second electrodes establishing a closed state, the piston comprises an electrical conductor that couples with the first and second electrodes providing a conductive path; an electromagnetic launcher configured to, when activated, induce a magnetic field pulse causing the piston to move away from the electrical coupling with the first and second electrodes establishing an open circuit between the first and second electrodes; and a piston control system comprising a piston arresting system configured to control a deceleration of the piston following the movement of the piston induced by the electromagnetic launcher such that the piston is not in electrical contact with at least one of the first electrode and the second electrode when in the open state.

42 Claims, 28 Drawing Sheets

(56) References Cited

U.S. PATENT DOCUMENTS

| | | | |
|---|---|---|---|
| 4,458,119 A | 7/1984 | Hashimoto et al. | |
| 4,459,629 A | 7/1984 | Titus | |
| 4,489,226 A * | 12/1984 | Holmgren et al. | 218/57 |
| 4,617,435 A | 10/1986 | Kawasaki | |
| 4,642,481 A | 2/1987 | Bielinski et al. | |
| 4,686,337 A * | 8/1987 | Crookston et al. | 218/84 |
| 4,704,652 A | 11/1987 | Billings | |
| 5,053,967 A | 10/1991 | Clavelloux | |
| 5,155,315 A | 10/1992 | Malkin et al. | |
| 5,170,023 A | 12/1992 | Pham et al. | |
| 5,280,144 A | 1/1994 | Bolongeat-Mobleu et al. | |
| 5,291,372 A | 3/1994 | Matsumoto | |
| 5,296,661 A | 3/1994 | Pham et al. | |
| 5,905,242 A | 5/1999 | Bernard et al. | |
| 6,069,545 A | 5/2000 | VanZeeland | |
| 6,437,273 B2 | 8/2002 | Stechbarth et al. | |
| 6,437,274 B2 | 8/2002 | Claessens et al. | |
| 6,570,116 B2 | 5/2003 | Maulandi et al. | |
| 6,593,538 B2 | 7/2003 | Perret | |
| 6,689,980 B2 | 2/2004 | Sohn | |
| 6,727,453 B2 | 4/2004 | Skarby et al. | |
| 6,760,202 B1 | 7/2004 | Meyer et al. | |
| 6,849,819 B2 | 2/2005 | Tresy | |
| 6,952,335 B2 | 10/2005 | Huang et al. | |
| 7,010,436 B2 | 3/2006 | Larsson | |
| 7,166,936 B2 | 1/2007 | Larsson | |
| 7,199,324 B2 | 4/2007 | Perret | |
| 7,405,910 B2 | 7/2008 | Maitra et al. | |
| 7,426,100 B2 | 9/2008 | Neveu et al. | |
| 7,508,636 B2 | 3/2009 | Sellier et al. | |
| 7,563,161 B2 | 7/2009 | Perret | |
| 7,566,842 B2 | 7/2009 | Hunger et al. | |
| 7,710,697 B2 | 5/2010 | Michalko et al. | |
| 7,994,442 B2 | 8/2011 | Vestner et al. | |
| 8,081,407 B2 | 12/2011 | Willieme et al. | |
| 8,264,803 B2 | 9/2012 | Willieme et al. | |
| 8,503,138 B2 | 8/2013 | Demetriades et al. | |
| 8,742,828 B2 | 6/2014 | Naumann | |
| 8,810,985 B2 | 8/2014 | Demetriades | |
| 2003/0173831 A1 | 9/2003 | Pohle et al. | |
| 2005/0139696 A1 * | 6/2005 | Lockwood | 239/203 |
| 2007/0273461 A1 | 11/2007 | Kang et al. | |
| 2009/0014418 A1 | 1/2009 | Jahn et al. | |
| 2009/0201617 A1 | 8/2009 | Yamaguchi | |
| 2010/0219162 A1 * | 9/2010 | Gentsch | 218/121 |
| 2011/0005255 A1 | 1/2011 | Tanihata | |
| 2011/0169593 A1 | 7/2011 | Hu et al. | |
| 2011/0278921 A1 | 11/2011 | Fretheim et al. | |
| 2012/0199558 A1 | 8/2012 | Faulkner | |
| 2012/0218676 A1 | 8/2012 | Demetriades | |
| 2013/0233831 A1 | 9/2013 | Ardyna | |

FOREIGN PATENT DOCUMENTS

| | | |
|---|---|---|
| CN | 102782792 | 11/2012 |
| DE | 2711232 | 9/1978 |
| DE | 4317965 | 12/1994 |
| DE | 10219299 | 2/2004 |
| DE | 102010024854 | 1/2011 |
| DE | 10157140 | 2/2011 |
| DE | 202012100024 | 5/2012 |
| DE | 202012100023 | 6/2012 |
| EP | 0737993 | 10/1996 |
| EP | 1523024 | 4/2005 |
| EP | 1480241 | 1/2006 |
| EP | 1742241 | 1/2007 |
| FR | 2574222 | 6/1986 |
| FR | 2588124 | 4/1987 |
| FR | 2648620 | 12/1990 |
| FR | 2658949 | 8/1991 |
| FR | 2678770 | 1/1993 |
| FR | 2681724 | 3/1993 |
| FR | 2714567 | 6/1995 |
| FR | 2717949 | 9/1995 |
| FR | 2797359 | 2/2001 |
| JP | 06074970 | 3/1994 |
| JP | 08279325 | 10/1996 |
| JP | 11271379 | 10/1999 |
| JP | 2000030580 | 1/2000 |
| JP | 2000040451 | 2/2000 |
| JP | 2003281980 | 10/2003 |
| JP | 2004014241 | 1/2004 |
| JP | 2004048964 | 2/2004 |
| JP | 2004080977 | 3/2004 |
| JP | 2005119518 | 5/2005 |
| JP | 2005158456 | 6/2005 |
| JP | 2006278001 | 10/2006 |
| WO | 2005078754 | 8/2005 |
| WO | 2010037424 | 4/2010 |
| WO | 2011018113 | 2/2011 |

* cited by examiner

Closed

Open

Independent

Series Connected

Parallel Connected

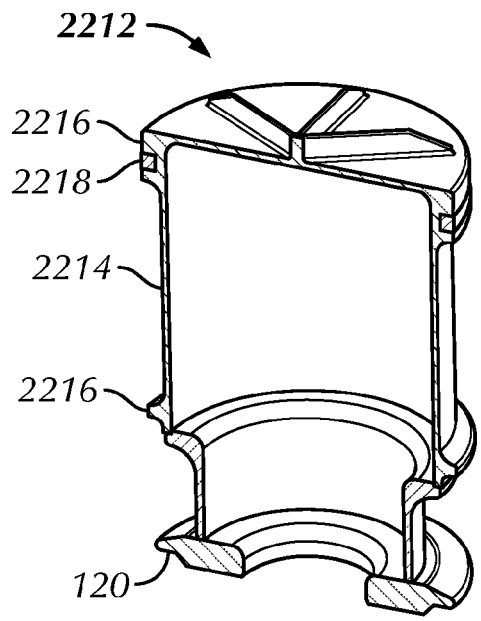
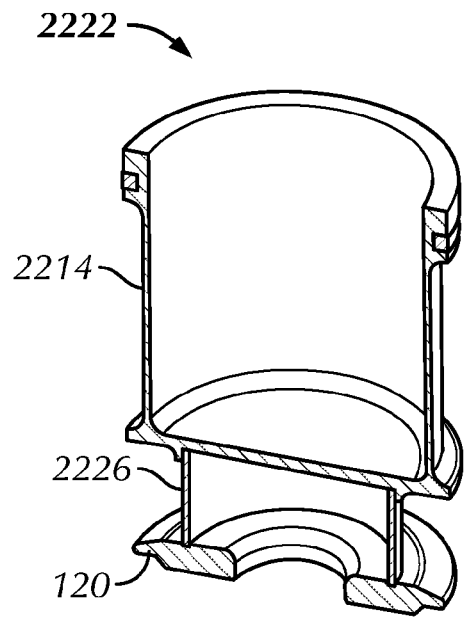
FIG. 22A  FIG. 22B
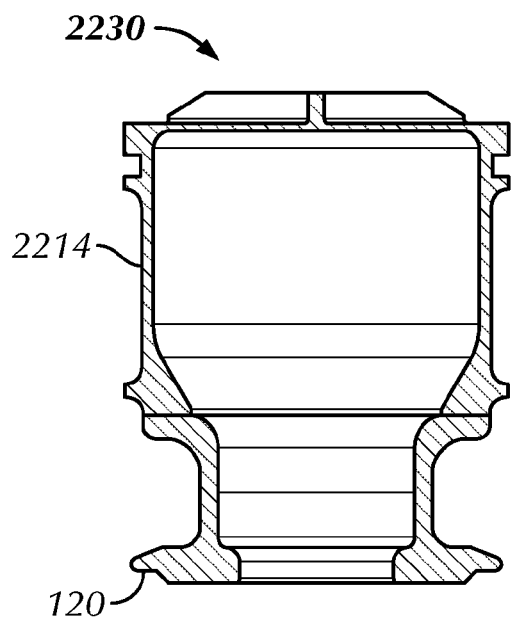
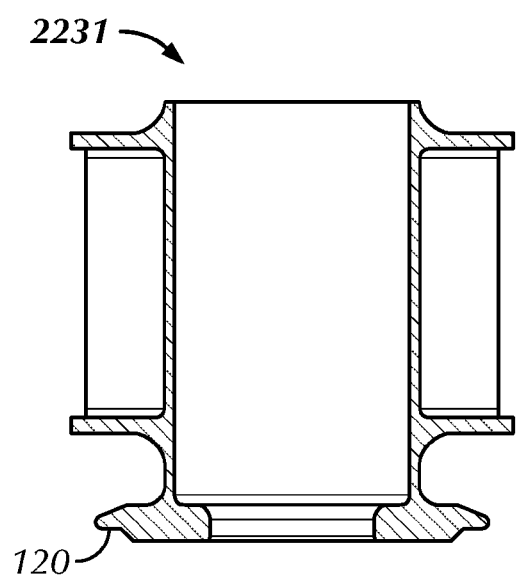
FIG. 22C  FIG. 22D

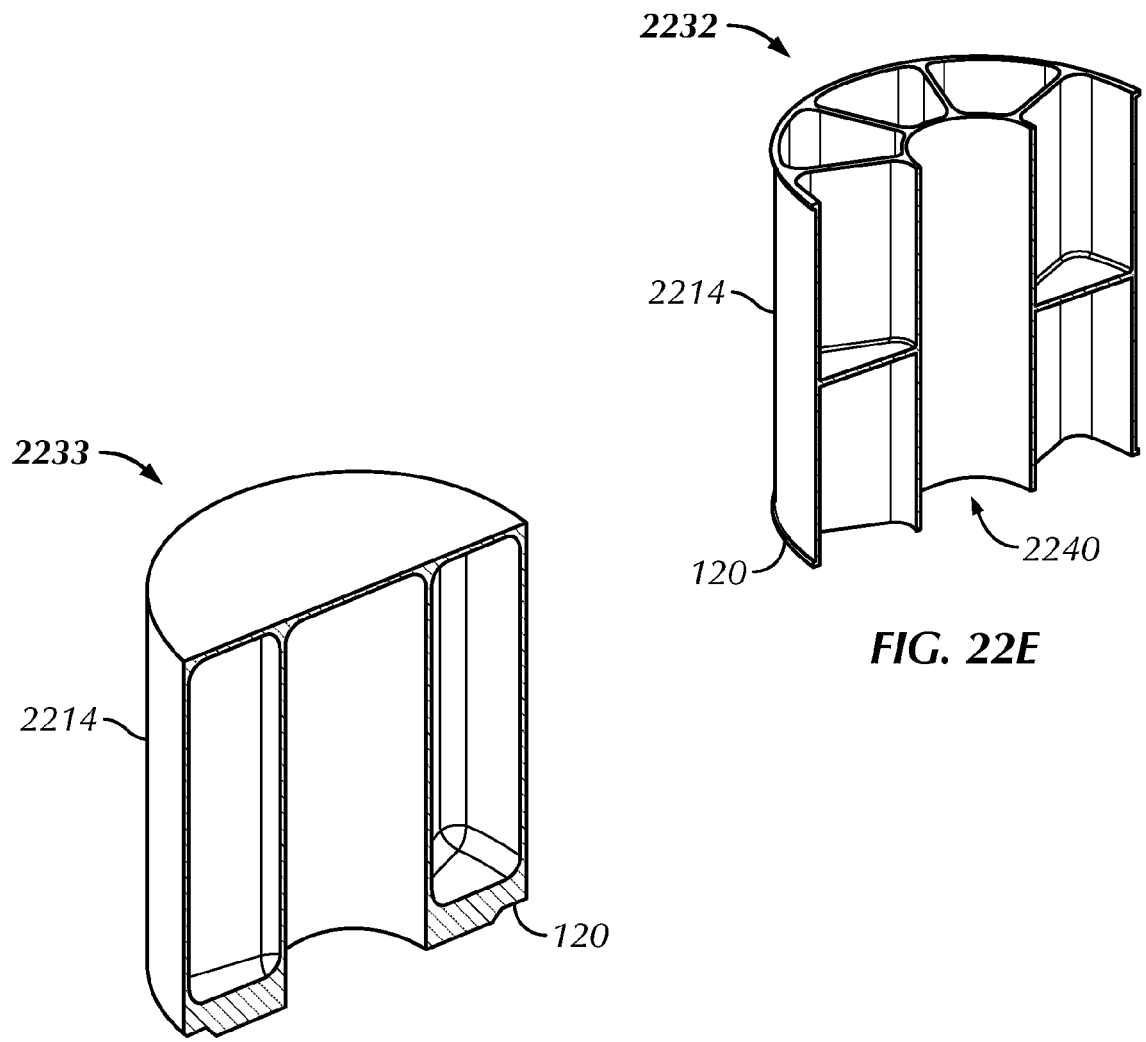
*FIG. 22E*
*FIG. 22F*
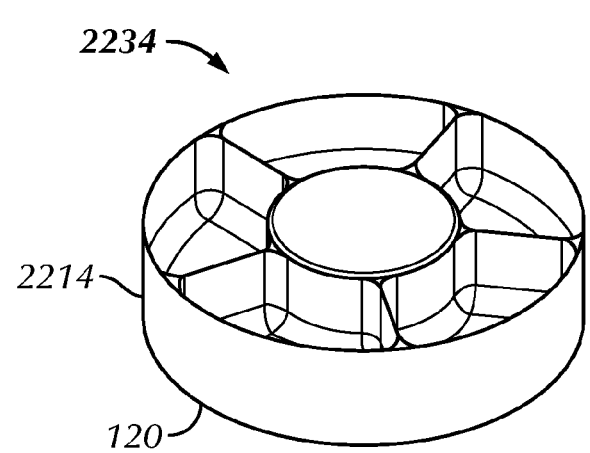
*FIG. 22G*

PULSED INTERRUPTER AND METHOD OF OPERATION

The United States Government may have rights in this invention pursuant to Contract No. DE-AR0000234 between U.S. Department of Energy, Office of HQ PS (HQ) and General Atomics.

BACKGROUND

1. Field of the Invention

The present invention relates generally to circuit protection, and more specifically to interrupter systems.

2. Discussion of the Related Art

It is critical in many electrical systems and/or circuits to provide protection for components of the system and/or to segregate portions of a system. These protections can be particularly important when the system operates at high voltages and/or currents. There are many devices that are used to provide protection for systems and circuits.

Many of such devices may provide low insertion losses, but often are relatively slow to react, which can result in damage to the system and/or components coupled with the system. Other devices operate at faster rates, but may introduce unwanted insertion losses.

SUMMARY OF THE INVENTION

Several embodiments advantageously address the needs above as well as other needs by providing systems, methods, apparatuses, assemblies and the like in protecting electrical systems, circuits, networks, transmission lines of such systems, circuits, networks, and other such systems. In some embodiments, interrupter systems comprise: a first electrode; a second electrode; a piston movably located at a first position and electrically coupled with both the first electrode and the second electrode establishing a closed state, wherein the piston comprises an electrical conductor that electrically couples with the first electrode and the second electrode providing an electrically conductive path between the first electrode and the second electrode when in the closed state; an electromagnetic launcher configured to, when activated, induce a magnetic field pulse causing the piston to move away from the electrical coupling with the first electrode and the second electrode such that the electrical conductor is no longer electrically coupled with at least one of the first electrode and the second electrode and establishing an open circuit between the first electrode and the second electrode defining an open state; and a piston control system comprising a piston arresting system cooperated with the piston and configured to control a deceleration of the piston following the movement of the piston induced by the electromagnetic launcher such that the piston is not electrically coupled with at least one of the first electrode and the second electrode when in the open state.

Further, some embodiments provide interrupters systems, comprising: a first electrode; a second electrode; a piston movably located at a first position and electrically coupled with both the first electrode and the second electrode establishing a closed state, wherein the piston comprises an electrical conductor that electrically couples with the first electrode and the second electrode providing an electrically conductive path between the first electrode and the second electrode when in the closed state; an impulse force launcher configured to, when activated, induce a force on the piston causing the piston to move away from the electrical coupling with the first electrode and the second electrode such that the electrical conductor is no longer electrically coupled with at least one of the first electrode and the second electrode and establishing an open circuit between the first electrode and the second electrode defining an open state; and a piston control system comprising a piston arresting system cooperated with the piston and configured to control a deceleration of the piston following the movement of the piston induced by the impulse force launcher such that the piston is not electrically coupled with at least one of the first electrode and the second electrode when in the open state.

In some embodiments, interrupter systems comprise: a first electrode; a second electrode; a first chamber; and a piston movably positioned within the first chamber and configured to move along at least a portion of a length the first chamber; wherein the piston comprises an electrical conductor configured to establish an electrically conductive path between the first electrode and the second electrode when the piston is in a first position providing a closed state, and the electrical conductor is further configured to induce movement of the piston along at least a portion of the length of the first chamber in response to an electromagnetic pulse causing the piston to move away from the first position such that the electrical conductor is no longer electrically coupled with at least one of the first electrode and the second electrode causing a transition from the closed state to an open state wherein there is no longer an electrically conductive path between the first electrode and the second electrode.

Some embodiments include interrupter systems, comprising: a first electrode; a second electrode; a chamber; a piston positioned within the chamber, wherein the piston comprises an electrical conductor configured to electrically couple with both the first electrode and the second electrode and to establish an electrical path between the first electrode and a second electrode when the piston is in a first position establishing a closed state, and wherein the piston is configured to move along at least a portion of the chamber such that the piston is no longer electrically coupled with at least one of the first electrode and the second electrode such that there is no longer an electrical path between the first electrode and the second electrode; and a guard ring electrically coupled with the first electrode, wherein the guard ring comprises a conductive body formed in substantially a ring shape and is positioned to be electrically proximate to and extend circumferentially about at least a portion of the electrical conductor of the piston when the piston is in the first position.

Still further, some embodiments provide interrupter systems, comprising: a first electrode; a second electrode; a chamber; a piston positioned within the chamber, wherein the piston is configured to electrically couple with both the first electrode and the second electrode establishing an electrical path between the first electrode and a second electrode when the piston is in a first position establishing a closed state, and wherein the piston is configured to move along at least a portion of the chamber such that the piston is no longer electrically coupled with at least one of the first electrode and the second electrode such that there is no longer an electrical path between the first electrode and the second electrode; a gas within the chamber; and a valve cooperated with the chamber, wherein the valve is biased closed and configured to open in response increased pressure on the gas caused by the movement of the piston away from the first position and to at least dissipate kinetic energy of the piston as it moves away from the first position.

Some embodiments provide methods of interrupting an electrical current comprising: positioning a piston comprising a conductor in a first position such that a conductor of the piston is in contact with electrical contacts providing a conductive path between a first electrode and a second electrode;

detecting a condition in excess of a threshold; driving the piston away from the electrical contacts breaking the conductive path between the first electrode and the second electrode and establishing an open state; controlling a deceleration of the piston as it is driven away from the electrical contacts; and arresting movement of the piston at a second position separate from the first position such that the piston is not electrically coupled with at least one of the first electrode and the second electrode when in the second position while maintaining the piston in a position to be returned to the first position.

Further, in some embodiments, methods of interrupting an electrical current comprise: positioning a piston in a first position electrically coupled with a first electrode and a second electrode with the piston establishing an electrically conductive path between the first electrode and the second electrode when in the first position providing a closed state; inducing a magnetic field pulse proximate the piston while in the first position driving the piston away from the first position and the electrical coupling with the first electrode and the second electrode establishing an open state such that the piston is no longer electrically coupled with at least one of the first electrode and the second electrode and breaking the electrically conductive path between the first electrode and the second electrode; and controlling movement of the piston as the piston is being driven away from the first position.

Some embodiments provide methods of interrupting an electrical current, comprising: positioning a piston comprising a conductor in a first position such that the conductor of the piston is in contact with electrical contacts that are electrically coupled with first and second electrodes and providing a conductive path between the first electrode and a second electrode; driving the piston away from the electrical contacts breaking the conductive path between the first electrode and the second electrode and establishing an open state; and activating closing control to drive the piston to return the piston to the first position when a threshold condition is satisfied such that the conductor of the piston contacts the electrical contacts and reestablishing the conductive path between the first electrode and the second electrode and the closed state.

BRIEF DESCRIPTION OF THE DRAWINGS

The above and other aspects, features and advantages of several embodiments of the present invention will be more apparent from the following more particular description thereof, presented in conjunction with the following drawings.

FIGS. 22A-22G show simplified cross-sectional views of exemplary piston configurations, in accordance with some embodiments.

Figure 1A:
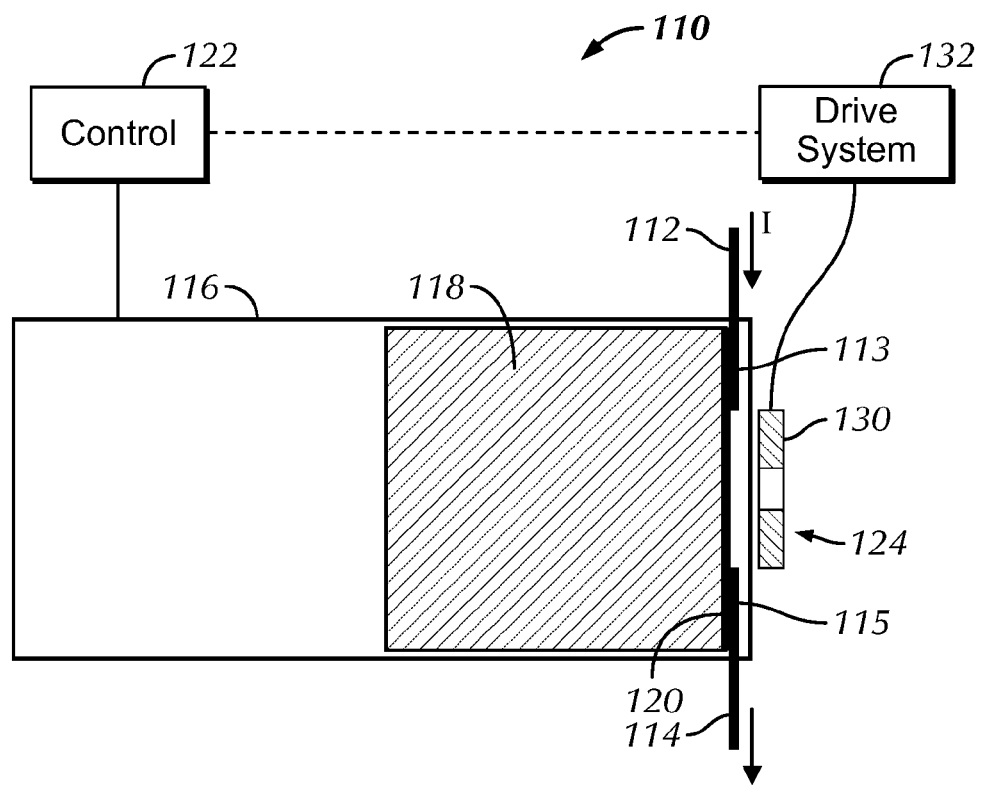
FIGS. 1A and 1B illustrate simplified block diagrams of an interrupter system, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of components, assemblies, sub-assemblies, systems, control systems, programming, software, hardware components and modules, hardware circuits, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present embodiments provide interrupters, interrupter assemblies, interrupter systems, methods of operation such interrupters and assemblies that can be utilized in interrupting direct-current (DC) and/or alternating-current (AC) systems, circuits, networks and the like. The interrupter systems and/or assemblies provide rapid response to provide protection to systems that incorporate the interrupter systems and/or assemblies. As such, these interrupter assemblies and/or interrupter systems can be utilized in high-speed and/or high-voltage systems, as well as low voltage systems. It is often critical in many systems, and particularly in high-voltage systems to incorporate protective circuitry and/or devices to protect an overall system from damage and/or catastrophic failure. Accordingly, many systems incorporate interrupters. Such interrupters typically need to react at relatively high speeds to provide protection for the system.

Figure 1B:
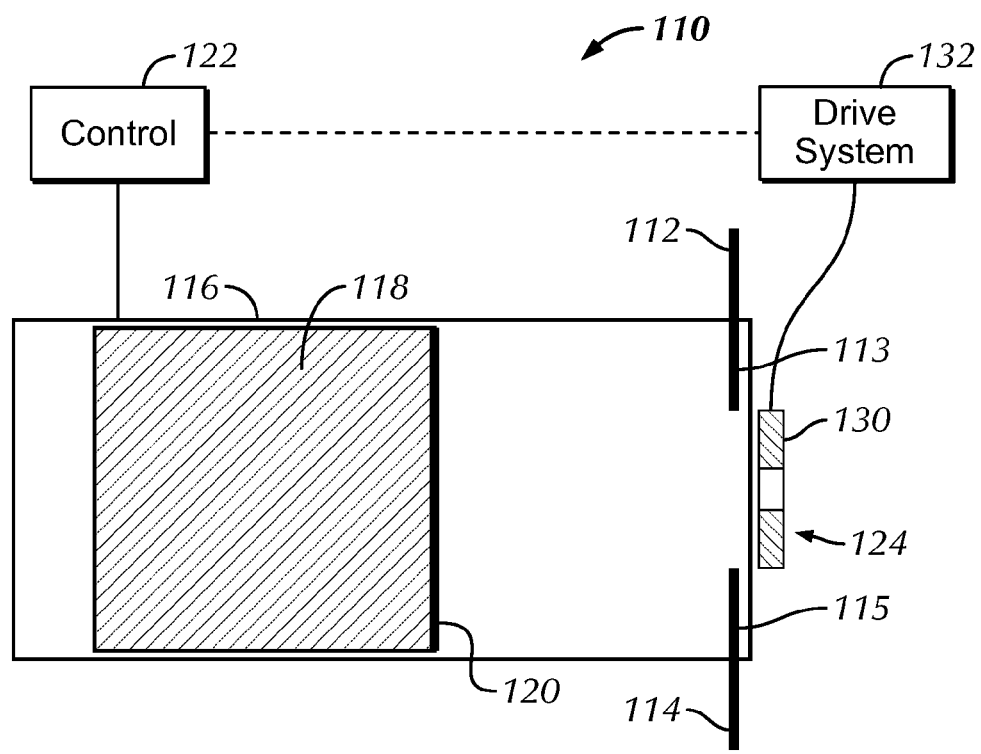

FIGS. 1A and 1B illustrate simplified block diagrams of an interrupter system 110 in accordance with some embodiments. The interrupter system comprises an electromechanical system that includes a first electrode 112, a second electrode 114, a chamber 116, a piston 118, a piston control system 122, and a piston launching system 124. The piston 118 is movably cooperated with and/or position within the chamber 116 and configured to move along at least a portion of a length of the chamber. In some embodiments, the first and second electrodes 112, 114 extend into the chamber 116 (or past a boundary of the chamber) and provide first and second electrical or electrode contacts 113 and 115 that are part of or electrically coupled with the first and second electrodes 112, 114.

The piston 118 further comprises an electrical conductor 120. Again, the piston 118 is movably within the chamber 116. With the piston positioned at a first position (to the right and as illustrated in FIG. 1A), the piston 118 is electrically coupled with the first electrode 112 and the second electrode 114. In some implementation, with the piston 118 in the first position, the electrical conductor 120 of the piston is in contact with and electrically coupled with the electrode contacts 113, 115 of the first and second electrodes 112, 114. The electrical conductor 120 is configured to provide an electrically conductive path between the first electrode 112 and the second electrode 114 when the piston is in the first position establishing a closed state of the interrupter system 110 such that current is carried through the interrupter system (e.g., from the first electrode 112, through the electrical conductor 120 of the piston 118, and to the second electrode 114).

The electrical conductor 120 is cooperated with and/or is part of piston 118. Further, the placement of the electrical conductor 120 can be substantially anywhere on and/or through the piston such that the electrical conductor 120 is configured to electrically couple with the first and second electrodes 112, 114 providing the electrical path between the first and second electrodes. In some embodiments, the electrical conductor 120 is positioned at one end of the piston such that the electrical conductor 120 is in contact with and electrically coupled with the electrode contacts of both the first and second electrodes 112, 114 when the piston 118 is located at the first position. For example, in some embodiments, the piston comprises an electrical conductor plate that covers some or all of an end of the piston 118. Similarly, the electrical conductor 120 can have a ring configuration, be a straight bar across a width or diameter of the piston, or other such shapes. Still further, the electrical conductor can be secured with the piston 118 and/or be formed as part of the piston.

The piston launching system 124 includes an impulse force launcher that is configured to induce a force onto the piston 118 and drive the piston away from the electrical coupling with at least one of the first and second electrodes 112, 114 breaking the electrically conductive path between the first electrode and the second electrode and establishing an open circuit between the first electrode and the second electrode defining an open state. The impulse force launcher can be mechanical, explosive, a release of compressed gas, electromagnetic and/or other such systems that can be cooperated with the system and induce an impulse force on the piston. In some embodiments, the impulse force launcher is electromagnetic and comprises one or more drive coils 130 configured to generate a magnetic field pulse. For simplicity, the description below refers to the drive coil 130 as part of the impulse force launcher; however, it will be appreciated by those skilled in the art that the impulse force launcher can be implemented through other mechanisms and/or systems.

In those embodiments that utilize an electromagnetic launcher, the piston launching system 124 comprises the drive coil 130 and a drive control system or circuit 132. The drive control system 132 activates the drive coil 130, for example, by storing electrical energy used to generate an electrical pulse delivered to the drive coil on command. When activated the drive control system 132 can trigger an electric discharge into the drive coil with the electric pulse in the drive coil generating a magnetic field pulse that induces currents in the electrical conductor 120 of the piston 118 and Lorentz forces that drive the piston away from the electrode contacts and drive coil 130. Some embodiments control the speed and/or force applied to the piston by controlling the electric pulse relative to the configuration and/or parameters of the drive coil 130. In some embodiments, the drive coil and generated Lorentz forces drive the piston 118 away from the first position, and thus breaking the electrical connection with one or both of the first and second electrodes 112, 114, providing for a rapid opening of the circuit between the first and second electrodes.

FIG. 1B shows the interrupter system 110 of FIG. 1A in the open state after the piston 118 is driven away from the first position and the electrode contacts 113, 115 of the first and second electrodes 112, 114. Some embodiments include the piston control system 122 that provides some control over at least the movement of the piston 118 as it moves away from the first position in response to the magnetic field pulse. In some embodiments, the a piston control system 122 comprising a piston arresting system configured to interact with and/or cooperate with the piston 118 to control at least a deceleration of the piston and/or dissipate the kinetic energy of the piston following the movement of the piston induced by the piston launching system 124.

In some implementations, the piston control system 122 is configured to stop the movement of the piston at a second location that is a distance from the first position along at least a portion of the length of the chamber 116 with the interrupter system 110 being in the open state. Further in at least some embodiments, the piston control system 122 further comprises a closing system cooperated with the piston that is configured to subsequently return the piston to the first position to again be electrically coupled with both the first electrode 112 and the second electrode 114. Typically, the piston 118 is not returned to the first position until one or more threshold conditions are detected (e.g., overvoltage conditions, threshold current levels, etc.).

With the use of the movable piston 118 and the piston launching system 124, the interrupter system 110 rapidly opens the electrical connection between the first electrode 112 and the second electrode 114. As such, the interrupter system 110 can be used to provide rapid protection to a system, such as a DC distribution system, in respond to conditions and/or events that might otherwise be potentially damaging to the system.

Circuit breakers and/or interrupters are sometimes categorized as a consequence of their construction and method of operation into one of three basic categories: (a) electromechanical circuit breakers; (b) static circuit breakers; and, (c) hybrid circuit breakers. Electromechanical breakers are desirable in some implementations due at least in part to their low insertion loss, but can often suffer from relatively slow operation, typically on the order of tens of milliseconds. Static circuit breakers are desirable in some implementations due to their relatively fast operation, typically on the order of several microseconds, but typically suffer from relatively high insertion loss. Hybrid circuit breakers or interrupters attempt to combine the desirable features of the electromechanical breakers and the static breakers to realize both a relatively low insertion loss while achieving a relatively fast opening circuit breaker.

Some systems employ semiconductor devices to realize fast-acting hybrid circuit breakers or interrupters. For example, some approaches utilize some variation of fast static circuit breaker or counter current injection scheme operating in parallel with an electromechanical interrupter or circuit breaker. The opening time of the interrupter, however, is typically limited by the slower of the parallel electromechanical interrupter or static circuit breaker.

Some present embodiments provide interrupter systems that provide a low loss mechanical interrupter with relatively rapid opening times, and in some instances opening times on the same order as semiconductor devices, such that when employed in a hybrid interrupter or circuit breaker, providing superior circuit opening times. Accordingly, some embodiments provide interrupter systems that provide fast switching between a first state that provides low loss electrical conduction and a second state that provides high voltage galvanic isolation from several to many hundreds of kilovolts, often referred to as an interrupter.

Figure 2A:
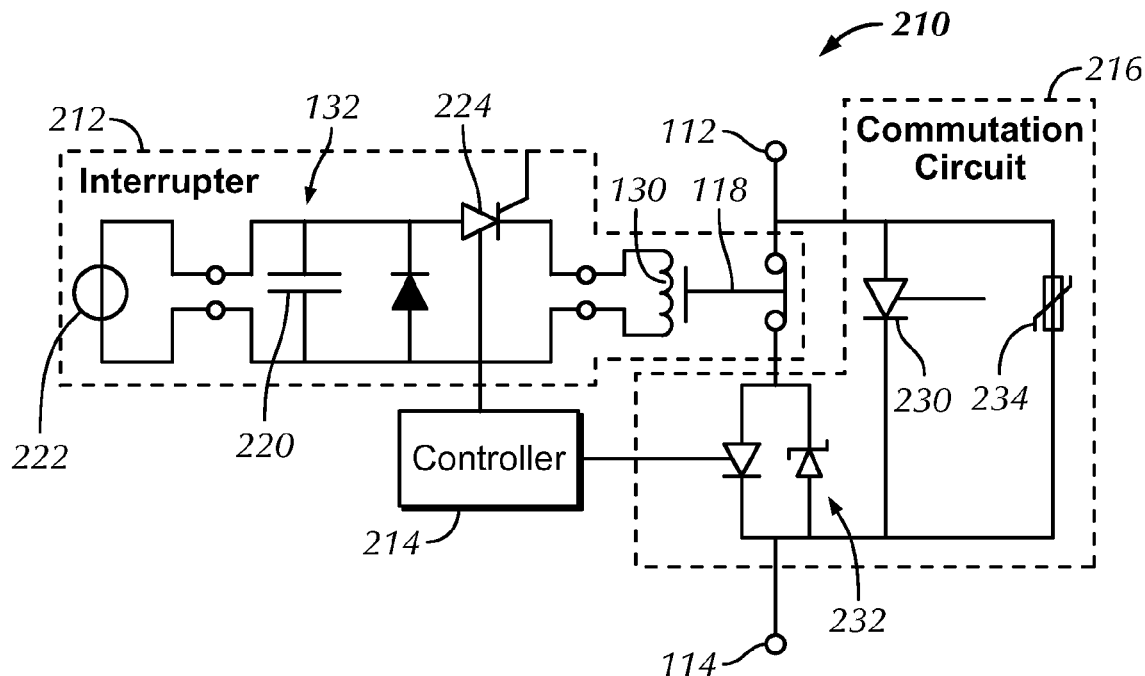
FIGS. 2A-2B show a simplified schematic diagram of an interrupter system, in accordance with some embodiments.
Figure 2B:
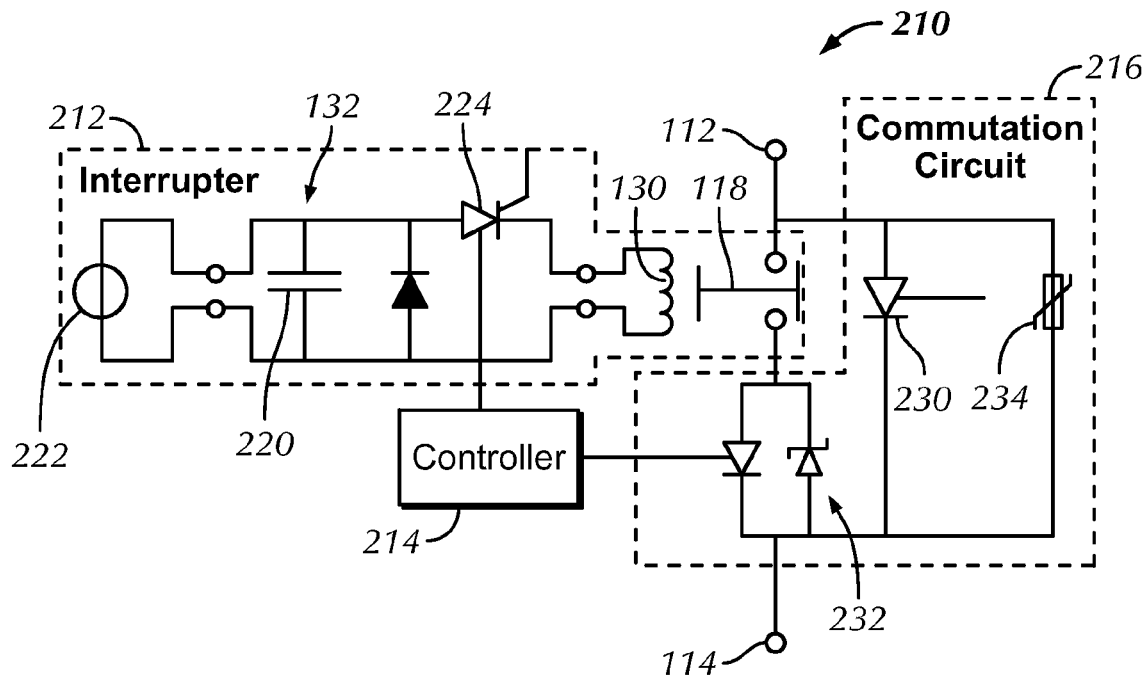

FIGS. 2A-2B show a simplified schematic diagram of an interrupter system 210 in accordance with some embodiments. The interrupter system 210 includes an interrupter sub-system 212, a controller 214, and in some implementations one or more auxiliary circuits 216 (sometimes referred to as a commutation circuit). In some embodiments, the auxiliary circuit 216 comprises auxiliary devices and/or switches (e.g., semiconductor devices) such that the interrupter system 210 may, in some implementations, be classified as a hybrid interrupter.

The interrupter sub-system 212 includes a mechanical interrupter (e.g., a piston 118) positioned proximate an impulse force launcher, which in some embodiments includes a drive coil 130. The drive coil couples with the impulse launcher drive control system 132. In some embodiments, the drive control system 132 includes an electric pulse system that generates the electrical pulse to activate the drive coil 130. The electric pulse system, in some implementation, includes one or more capacitors 220 (or other such rapid discharge devices) that are charged through a charging power supply 222, which may be separate from or derived from the power carried across the first and second electrodes 112, 114, and a pulse activator 224.

The auxiliary circuit 216 is operated in concert with the interrupter sub-system 212, where the auxiliary circuit 216 momentarily shunts and/or commutates the current away from the mechanical interrupter (e.g., the piston 118) and into the auxiliary circuit. Once the piston 118 (or other such interrupter) opens, the auxiliary circuit opens resulting in the voltage break across the piston. In some embodiments, the auxiliary circuit 216 includes one or more bypass switches 230 and one or more commutation switches 232. Some embodiments optionally include one or more energy dissipating devices or systems 234 (e.g., metal-oxide varistor (MOV), etc.). The bypass switch 230 and the dissipation systems 234 are coupled in parallel with the mechanical interrupter switch provided by the piston 118. In some embodiments, the bypass switch 230 is implemented through one or more semiconductor switching devices (e.g., IGCT, IGBT, or other such switching device).

FIG. 2A shows the piston 118 in a closed state where the piston 118 is electrically coupled with the first electrode 112 and the second electrode 114 providing the electrically conductive path between the first electrode and the second electrode during normal operation and/or operation within one or more predefined threshold limits (e.g., voltage and/or current thresholds). FIG. 2B shows the piston 118 in an open state where the piston 118 has been driven away from electrode contacts and is no longer electrically coupled with one or both of the first and second electrodes 112, 114 breaking conductive path between the first and second electrodes.

In operation, in accordance with some embodiments, the controller 214 is notified to open the interrupter and/or the controller 214 monitors one or more parameters, alarms, conditions (e.g., current and/or voltage threshold levels) and the like to determine whether the interrupter system is to be activated to interrupt the current between the first and second electrodes 112, 114. In response to determining that the interrupter is to be activated, the controller 214 triggers the activator 224 coupling the electrical pulse from the capacitor (or capacitance) 220 driving the drive coil 130 to generate the magnetic field pulse. The piston 118 is driven away from the electrode contacts 113, 115 of the first and second electrodes 112, 114 opening the current path between the first and second electrodes.

Some embodiments further attempt to limit, suppress and/or prevent arching across the electrode contacts when the piston 118 is driven away from the electrode contacts by incorporating the auxiliary circuit 216. The auxiliary circuit 216 is included, in some embodiments, providing at least a temporary shunting of the current away from mechanical interrupter piston 118 and into the commutation branch (e.g., solid state semiconductor branch) provided by the auxiliary circuit 216 as the piston 118 is being activated. Accordingly, the controller 214 can trigger to close one or more of the bypass switches 230 temporarily shunting the current. Typically, the interrupter is activated just following the activation of the bypass switch 230 limiting arcing. Similarly, the commutation switch 232 can be activated simultaneously with or following the activation of the bypass switch 230 (and in some instances prior to driving the piston). In many embodiments, the piston 118 is driven to open the current path within a time similar to the time it takes for the semiconductor bypass switch 230 to operate.

In those embodiments that include the dissipating devices 234, once the piston 118 has been activated and the current path is broken, the controller 214 can open the bypass switch (es) 230 such that the fault current is directed into the energy dissipation 234 devices and/or high impedance devices. Once dissipated other actions can be taken, for example, the branch of a distribution system where the fault occurred and the interrupter was activated can be disconnected from the distribution system and relevant actions to be taken to correct any issues (e.g., opening a disconnect switch(s) to isolate the network branch), and/or the interrupter can be automatically closed reestablishing the electrically conductive path, for example, in restoration of normal threshold conditions.

Figure 3:
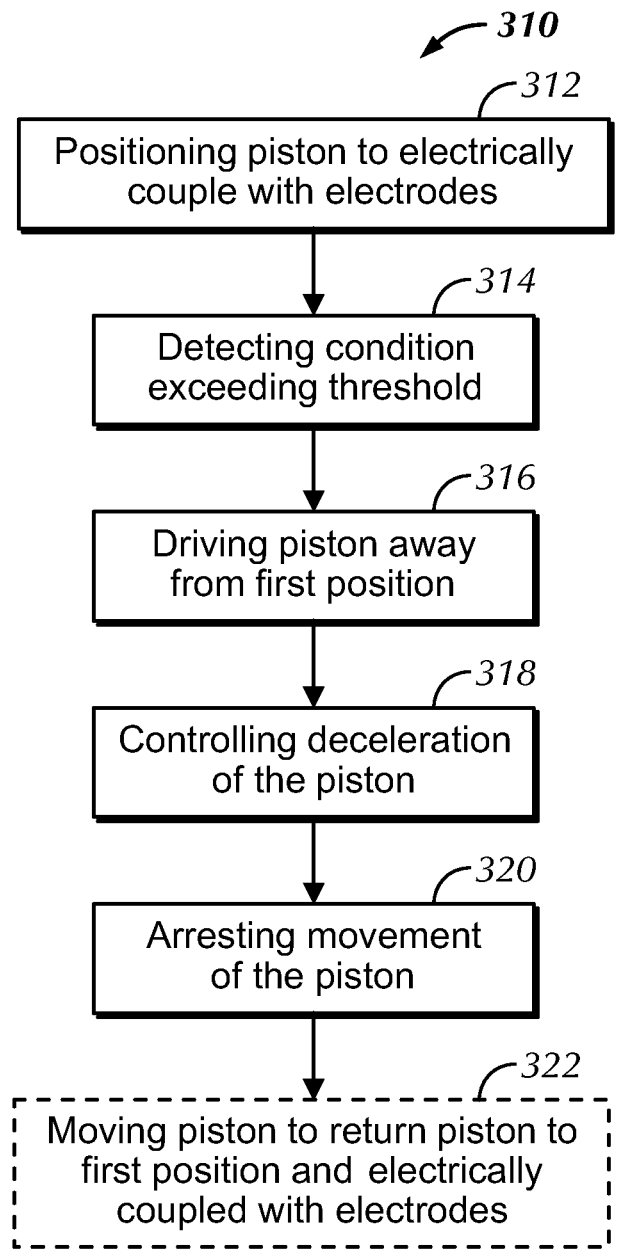
FIG. 3 depicts a simplified flow diagram of a process of protecting an electrical network, in accordance with some embodiments.

FIG. 3 depicts a simplified flow diagram of a process 310 of protecting an electrical circuit, system, network, transmission line, and the like, in accordance with some embodiments. In step 312, a piston 118 with an electrical conductor 120 is positioned in a first position such that the electrical conductor is electrically coupled with both a first electrode 112 and a second electrode 114, typically through contact with electrode contacts 113, 115, and providing a conductive path between the first electrode and the second electrode. In step 314, a condition, parameter or the like is detected that meets or exceeds a threshold (e.g., current and/or voltage thresholds).

In step 316, the piston 118 is driven away from the first position and the electrical contacts breaking the conductive path between the first electrode and the second electrode and establishing an open state. In step 318, a deceleration of the piston 118 is controlled as it is driven away from the electrical contacts. In step 320, the movement of the piston 118 is arrested at a second position separate from the first position such that the piston is not electrically coupled with at least one of the first electrode 112 and the second electrode 114 when in the second position and while maintaining the piston in a position to be returned to the first position. Some embodiments include optional step 322 where the piston 118 is moved to return the piston to the first position to be electrically coupled with both the first and second electrodes 112, 114. In some embodiments, the returning of the piston to the first position is an automated process such that a user does not have to manually place the piston into the first position and/or replace the piston.

Figure 4:
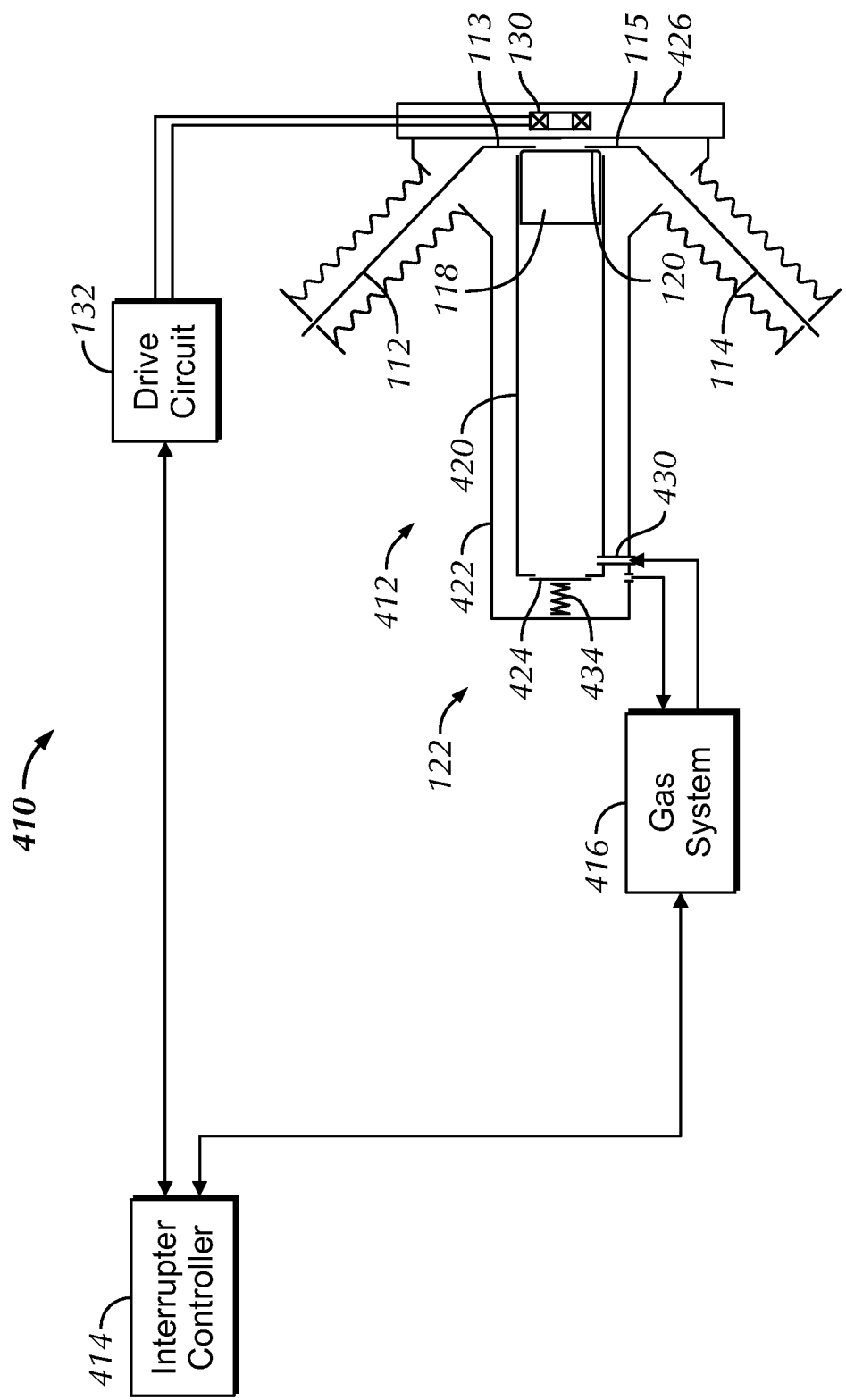
FIG. 4 shows a simplified block diagram of an exemplary interrupter system, in accordance with some embodiments.

FIG. 4 shows a simplified block diagram of an exemplary interrupter system 410, in accordance with some embodiments. The interrupter system 410 includes an interrupter assembly or unit 412, a controller 414, an impulse force launcher, which in some embodiments comprises a drive control system 132 cooperated with a drive coil 130, and piston control system 122 that includes at least a gas system 416. The interrupter assembly 412, shown in a cross-sectional view, comprises a first electrode 112, a second electrode 114, a contactor piston 118 with one or more electrical conductors 120, the drive coil 130, a first or inner chamber 420, a second or outer chamber 422, a valve 424, and one or more insulators 426.

The piston 118 is configured to move along at least a portion of the length of the inner chamber 420. When the piston 118 is in the closed or first position, the electrical conductor 120 of the piston 118 is electrically coupled with both the first and second electrodes 112, 114 (e.g., through contact with electrode contacts 113, 115) providing a conduction path between the first and second electrodes.

Figure 5A:
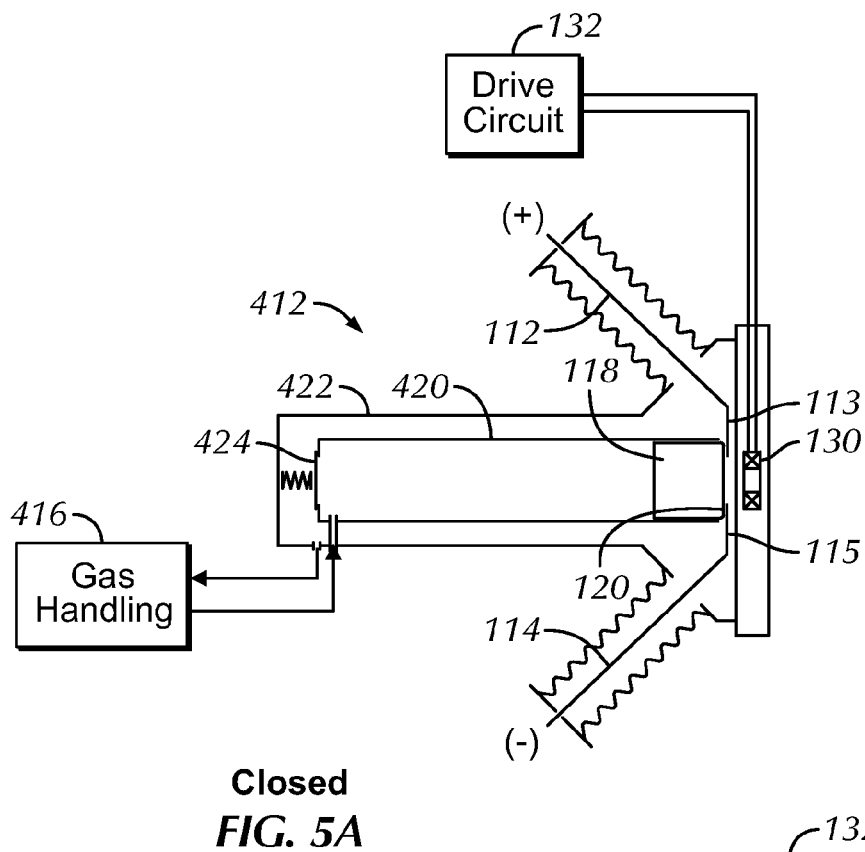
FIGS. 5A-B show simplified cross-sectional views of an interrupter assembly, in accordance with some embodiments, which can be used in the interrupter system of FIG. 4.

FIG. 5A shows a simplified cross-sectional view of the interrupter assembly 412, in accordance with some embodiments, with the piston 118 in the first or closed position and providing electrically conductive path between the first electrode 112 and the second electrode 114. Typically in the first position, the electrical conductor 120 of the piston 118 is in contact with and electrically coupled with both of the electrode contacts 113, 115 extending into and/or positioned proximate an end of the inner chamber 420 providing electrically conductive path between the first electrode 112 and the second electrode 114.

Figure 5B:
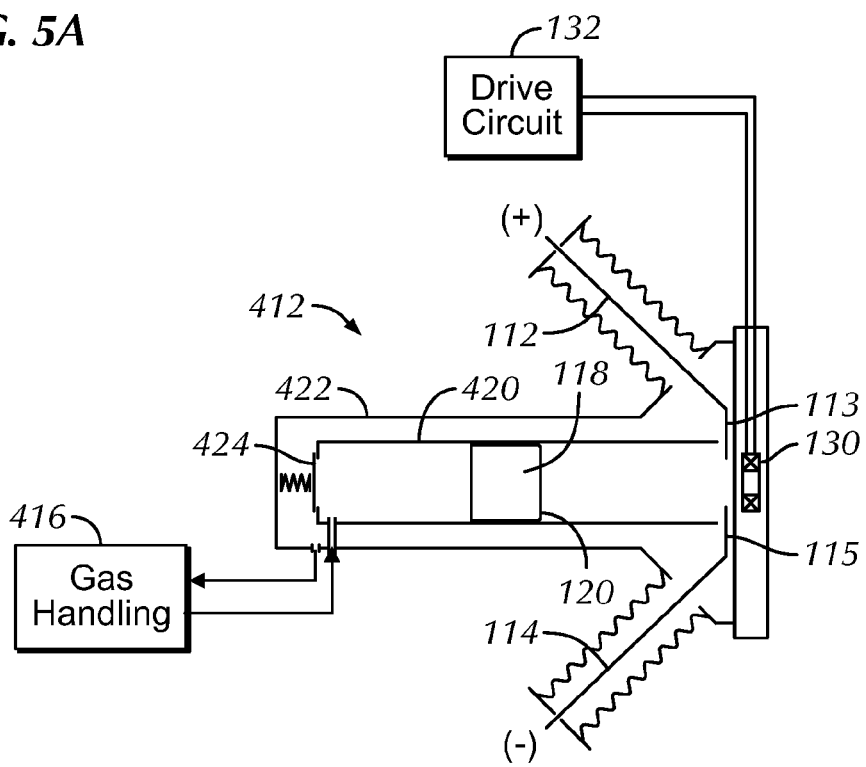

FIG. 5B shows a simplified cross-sectional view of the interrupter assembly 412 in an open state, in accordance with some embodiments, with the piston 118 moved away the first position such that the piston 118 is not electrically coupled with at least one of the first electrode 112 and the second electrode 114.

When the interrupter assembly 412 is in a closed state, FIG. 5A, the piston 118 is electrically coupled with, and typically pressed against the electrode contacts 113, 115 providing an electrical path between the first electrode 112 and the second electrode 114 so as to permit electrical conduction. When a voltage is applied across the terminals of the electrodes 112, 114, an electrical current will flow, for example, from the first electrode 112 through the piston 118 to the second electrode 114. In some embodiments, the interrupter system 410 and/or interrupter assembly 412 is applicable for use in DC and AC applications as there is no preferred direction for electrical current or polarity.

When the interrupter assembly 412 is in an open state, FIG. 5B, the piston 118 is driven and/or has been driven away from the electrode contacts 113,115 and no longer provides a conduction path between either of the electrodes 112, 114. One or more gases are typically maintained within the interruption assembly 412. In some embodiments, the gas comprises an insulating gas that can aid in inhibiting arcing across the gap or separation between the electrode contacts 113, 115. The open circuit resulting from the movement of the piston away from the first position and the insulating gas filling the region between the electrical gaps formed between the electrode contacts 113, 115 thereby provides electrical isolation and effectively prevents current flow. The degree of electrical isolation achievable is dependent on at least the insulating gas, the insulating gas pressure and the amount separation between the electrode contacts, with operating ranges, in accordance with some embodiments, from a few to several hundred kilovolts.

Referring to FIGS. 4 and 5A-5B, in some embodiments, the piston 118 is mounted within the inner chamber 420 that allows for free motion along a least a portion of the length of the inner chamber, but otherwise confines the motion of the piston. In many embodiments, the inner chamber is a cylindrical chamber allowing linear motion of the piston along at least a portion of the length of the inner chamber. The inner chamber 420 is arranged within the outer chamber 422. Again, in some embodiments, the volumes of the inner chamber 420 and outer chamber 422 are connected by the valve 424 that allows for gas flow between the inner and outer chambers in a controlled manner. Again, the valve 424 is typically biased in a closed state with an opening pressure threshold.

One or both of the inner chamber 420 and outer chamber 422 are pressurized with a gas (e.g., an insulating gas). For example, the gas system 416 is cooperated with ports, inlets and/or passages 430, 432 allowing the gas system to at least in part control the flow of the gas within and/or between the two chambers, and/or to control pressures within the chambers. In some embodiments, the volume of the outer chamber encompasses the region around the electrode contacts 113, 115. As a result, the region around the electrode contacts is exposed to pressurized insulating gas.

The piston 118 is shaped to move within the inner chamber 420. For example, in some embodiments, the piston 118 is cylindrically shaped. Further, in some embodiments, the piston is configured to create a seal with the inner chamber allowing pressure differentials to be maintained on opposing faces of the piston. The seal may be established through an entire length of the piston, through one or more rings around the piston or other such configurations. As such, with the seal or at least partial seal provided by the valve and with the gas valve in a closed state the at least a portion of the insulating gas is effectively sealed or maintained between the valve 124 and the piston 118 when the piston is in the first position. In other embodiments, a gas tight seal is not established. In many of these embodiments, however, spacing between the piston and the inner wall of the inner chamber 420 is relatively smalls allowing the gas system 416 to continue to maintain a pressure differential when desired.

Again, the piston 118 includes the electrical conductor 120 that provides at least part of the electrical path between the first electrode 112 and the second electrode 114 when the piston is in the closed state. In some embodiments, the electrical conductor 120 makes up some or all of a face of the piston proximate to, and in at least some instances facing, the drive coil 130. Accordingly, in some embodiments the face of the conductor facing the drive coil 130 is the electrical conductor 120. The body of the piston 118 is constructed of a suitable material that provides for strength to withstand the pressure differentials and the forces induced by the magnetic field pulses. Further, in some embodiments, some or all of the body of the piston is constructed of a suitable material to provide low friction, is coated with a low friction material and/or includes one or more rings, ridges or other structures with low friction material(s) allowing the piston to more readily slide within the inner chamber 420. Similarly, the inner wall of the inner chamber 420 may be constructed of, be coated with and/or include ridges or other structures with low friction material(s). Typically, lubricants are not incorporated into the system.

When the electrical circuit, distribution system and/or network in which the interrupter system 410 is installed is operating normally, the interrupter system is in a closed state, with the piston in the first position with the electrical conductor 120 being electrically coupled with both the first and second electrodes 112, 114. Under these conditions, the controller 414, in some embodiments, sends control commands to the gas system 416 instructing the gas system to maintain a positive pressure in the inner chamber 420 between the piston 118 and the valve 424 relative to the outer chamber 422. This creates a pressure differential across the piston 118. The pressure differential acting on the opposing faces of the piston generates a net force pressing the piston into physical contact with the electrode contacts 113, 115.

The contact pressure between the piston 118 and the electrode contacts 113, 115 produces a relatively low resistance electrical path between the terminals of first and second electrode 112, 114. The gas system 416 can further be configured to provide adequate pressure and flow to account for blow-by between the piston 118 and the wall of the inner chamber 420.

The opening and/or cracking pressure threshold of the valve 424 is set above the pressure differential between the inner chamber 420 and outer chamber 422 so as to avoid loss of pressure under normal operating conditions. In some embodiments, the controller 414 can further send, and in some instances simultaneously sends control commands to the drive control system 132 to store electrical energy (e.g., in the capacitor 220) in preparation for generating an electrical pulse in the drive coil 130 on command.

Still referring to FIGS. 4 and 5A-5B, the controller 414, in response to threshold conditions being detected and/or exceeded, activates the drive control system 132 to pulse the drive coil 130 generating the magnetic field pulse that induces the force on the electrical conductor 120 and/or other portions of the piston 118 driving the piston away from the first position and the electrical coupling with one or both of the first and second electrodes 112, 114. In some embodiments, the controller 414 makes the determination of the threshold conditions. In other embodiments, the controller receives notification of the condition and controls the interrupter system 410. The cooperation of the impulse force launching system and the movable piston allow the interrupter system 410 to rapidly open the coupling between the first electrode and the second electrode. For example, some embodiments provide a response time to drive the piston opening the conductive path in less than 1 ms, and often less than 500 µs. Some implementations provide a high-speed, mechanical interrupter that conducts electricity with very low loss when in the closed state, and change state from the closed state to the open state (i.e., breaking the conductive path) within 50-250 µs establishing a high voltage galvanic isolation when in the opened state.

Further, the piston configuration can be used with both AC and DC systems, as well as with relative low voltages to extremely high voltages depending on the construction and/or material of the components of the interrupter assembly 412. For example, in some implementations, the interrupter system 410 and/or interrupter assembly 412 are rated at over 100 kV and/or 3.5 kA. As another example, some embodiments provide interrupters rated at 500 A/125 kVDC, and other embodiments that can be scaled to both higher and lower ratings and/or voltages. Still further, these ratings are achieved with relatively low conduction losses (e.g., less than about 1 kW).

In some embodiments, the piston control system 122 further includes a piston arresting system that, in some embodiments, includes the valve 424 positioned within the inner chamber 420 that closes an aperture, passage or the like in the wall of the inner chamber. Typically, the valve 424 is biased in a closed state, for example, with a spring 434 or other such biasing device or system. In some embodiments, the piston 118 is positioned between the valve 424 and the electrode contacts, at least when in the first or closed position. Further, in some implementations, the piston establishes a seal between the piston and the wall of the inner chamber 420, and/or there is limited space between the piston and the wall of the inner chamber. Upon activation of the drive coil 130 the piston 118 is driven away from the first position compressing gas within the inner chamber 420. As the pressure increases the pressure acts to control the deceleration of the piston and/or dissipate the kinetic energy of the piston. Further, as the pressure increases above a threshold level, the valve 424 opens releasing at least some of the gas from the portion of the inner chamber between the valve and the piston such that built up pressure does not forced the piston 118 back toward the electrode contacts 113, 115.

In some embodiments, the piston control system 122 further comprises a latching system configured to prevent the piston from returning to the first position before desired and/or to maintain a position of the piston 118 within the inner chamber 420 such that the piston and/or electrical conductor 120 is not in contact with the electrode contacts. The latching system, in some embodiments, is configured with the outer chamber 422 cooperated with the first chamber such that the gas released through the valve 424 from the inner chamber enters the outer chamber 422. In some embodiments, the outer chamber 422 is positioned at least partially about the inner chamber 420. Further, the inner chamber 420 is open proximate the electrode contacts 113, 115, and/or includes openings or passages proximate the electrode contacts or at least closer to the electrical contacts than a position where the piston 118 is controlled to stop. Accordingly, as the gas is released through the valve 424, from a portion of the inner chamber 420 between the piston and the valve 424, the gas is displaced by the movement of the piston and enters the outer chamber 422 while reducing the pressure in the valve portion of the inner chamber between the piston and the area of the inner chamber proximate the valve.

The displaced gas entering the outer chamber 422 causes an increase in pressure within the outer chamber 422 as well as an increase in pressure on the piston directed away from the electrode contacts. As the pressures stabilizes about the piston 118, the piston is effectively latched or maintained in a second position and not electrically coupled with one or both of the first or second electrodes 112, 114. Further, the latching effectively prevents the piston from returning to the first position and/or contacting the electrode contacts 113, 115. Accordingly, some embodiments provide a passive arresting control and/or latching that is activated in response to the launching of the piston. Additionally, in some embodiments, at least some of the insulating gas is redirected toward the electrode contacts 113, 115, which aids in suppressing arcing.

Figure 6A:
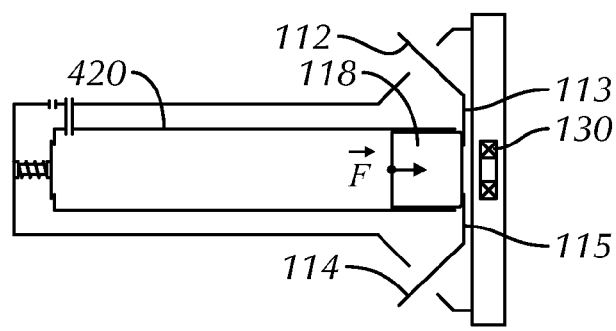
FIGS. 6A-6E show a series of cross-sectional views of a portion of an interrupter assembly illustrating an opening sequence, in accordance with some embodiments.

FIGS. 6A-6E show a series of cross-sectional views of a portion of the interrupter assembly 412 illustrating, in accordance with some embodiments, an opening sequence where the piston 118 is driven away from the first position and the electrode contacts 113, 115 opening the electrical path between the first electrode 112 and the second electrode 114. For example, FIG. 6A shows the piston 118 in the first position with the electrical conductor 120 of the piston electrically coupled with the electrode contacts 113, 115 of the first and second electrodes 112, 114. In some embodiments, a force (F) is applied on the piston 118 to maintain the piston in the first position and electrically coupled with the first and second electrodes providing the electrical path between the first and second electrodes. The force can be applied, in some embodiments, through an increased gas pressure in the inner chamber 420.

Figure 6B:
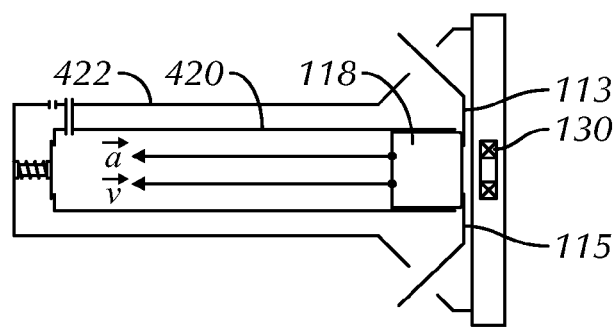

Referring to FIGS. 4 and 6A-6E, when the interrupter system 410 detects a threshold condition and/or receives a signal to open or interrupt, the controller 414 sends a command to the drive control system 132 triggering an electric discharge into the drive coil 130. The resulting electric pulse in the drive coil 130 generates a relatively large magnetic pulse. The magnetic pulse induces large currents in at least the electrical conductor 120 of the piston 118 due at least in part to their close proximity and relatively large Lorentz forces that drive the piston to accelerate away from the electrode contacts 113, 115 and drive coil 130 at a relatively high speed. FIG. 6B shows the induced acceleration (a) and increasing velocity (ii) of the piston 118 away from the electrode contacts 113, 115 and the drive coil 130.

Figure 6C:
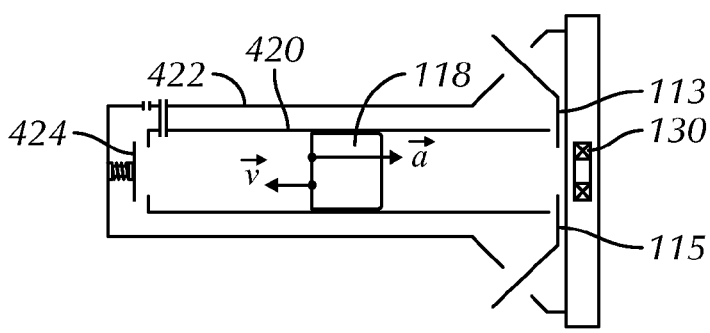

Referring to FIGS. 4 and 6C, as the piston 118 moves away from the electrode contacts 113, 115, the volume of the inner chamber 420 between the piston and the valve 424 decreases resulting in an increase in the pressure in the inner chamber. The increasing pressure provides control over the movement of the piston 118 decelerating the piston and decreasing the velocity of the piston. When the pressure in the inner chamber 420 exceeds the opening or cracking pressure threshold of the valve 424, the valve opens venting high pressure gas from the inner chamber 420 and into the outer chamber 422.

Figure 6D:
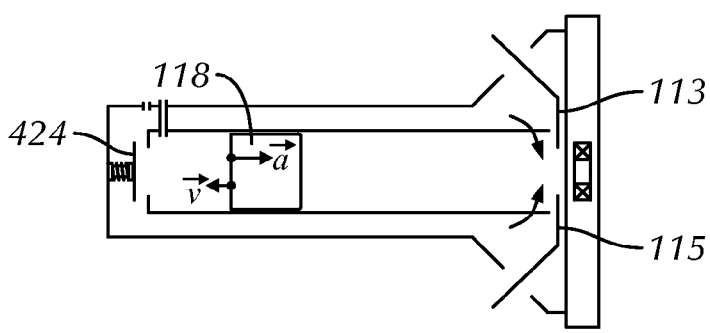
Figure 6E:
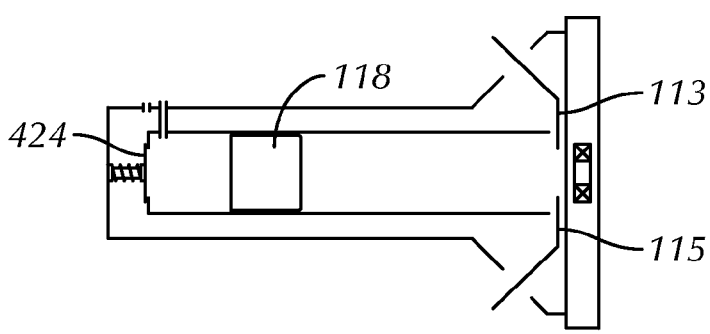

Referring to FIGS. 4 and 6D, the pressure in the inner chamber 420 between the piston 118 and the valve 424 continues to acts to control the movement of the piston slowing the piston, which is throttled by the orifice formed by the open valve 424. Referring to FIGS. 4 and 6E, as the piston 118 slows, the gas flow through the valve 424 from the inner chamber 420 to the outer chamber 422 also slows and the pressure differential across the valve decreases. When the pressure differential across the open valve drops below its threshold opening or cracking pressure the valve 424 closes. In some embodiments, the closing results in a resealing of the inner chamber 420 between the piston 118 and the valve 424.

Typically, the pressure inside the inner chamber 420 remains greater than the pressure in the outer chamber 422 due at least to the valve opening pressure threshold and can result, again, in a pressure differential across the piston 118. Also the velocity of piston may not be zero. As a consequence, the piston slows to a stop, and then may reverse direction. With the valve 424 closed, as the piston 118 moves toward the electrode contacts 113, 115, the pressure differential across the piston reverses again resulting in minor displacement oscillations about a mean piston displacement until damped out (e.g., by friction). Accordingly, the piston is latched in a second position not in contact with the electrode contacts, and the interrupter assembly 412 is in an open state and latched-open.

Referring back to FIG. 4, in some embodiments, the piston control system 122 further includes a closing system that allows the interrupter system 410 to move the piston 118 back to the first position and electrically coupled with the first and second electrodes 112, 114. In some embodiments, the closing system includes the gas system 416 that cooperates with the inner chamber 420 and the outer chamber 422. Accordingly, the gas system 416 can include a gas pump that pumps gas from the outer chamber 422 back into the inner chamber 420 allowing the pressure differential to drive the piston 118 back toward the electrode contacts 113, 115 and the first position.

Figure 7A:
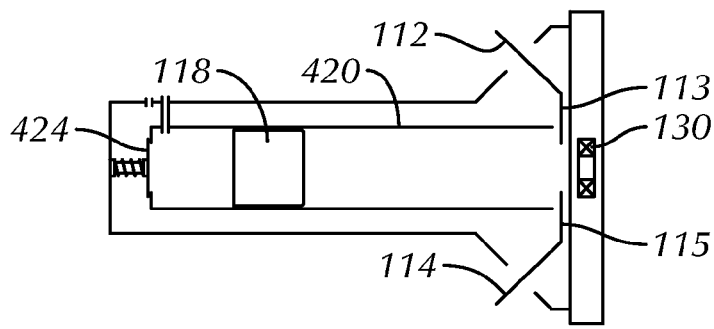
FIGS. 7A-7E show a series of cross-sectional views of a portion of the interrupter assembly illustrating a closing sequence, in accordance with some embodiments.
Figure 7B:
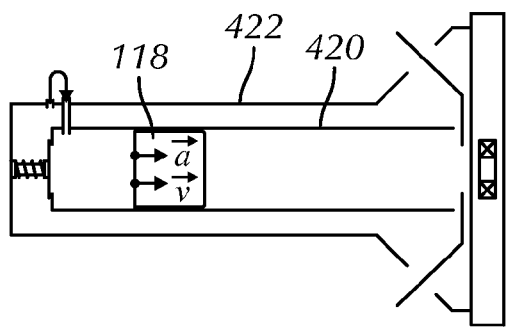
Figure 7C:
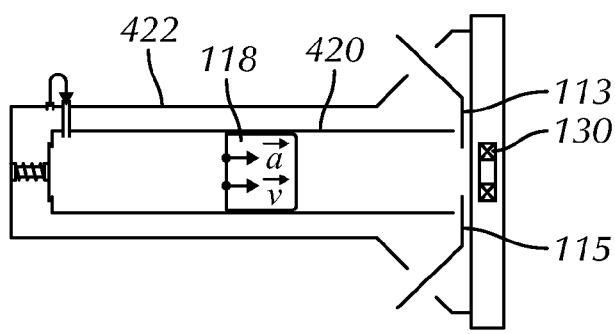
Figure 7D:
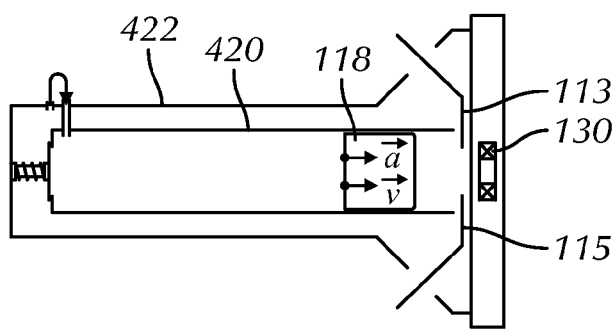

FIGS. 7A-7E show a series of cross-sectional views of a portion of the interrupter assembly 412 illustrating, in accordance with some embodiments, a closing sequence where the piston 118 is moved back toward the first position and the electrode contacts 113, 115 to reestablish the electrical path between the first electrode 112 and the second electrode 114. FIG. 7A shows the interrupter assembly 412 with the piston 118 latched in the second position such that the electrical conductor 120 is not electrically coupled with at least one of the first electrode 112 and the second electrode 114.

Referring to FIGS. 4 and 7B-7D, when the interrupter system 410 detects normal operating conditions have returned (e.g., current and/or voltage conditions returning below thresholds) and/or receives a signal to close, the controller 414 initiates a process of returning the piston to the first position. Typically, this is an automated processes the automatically returns the piston to the first position without user interaction and/or without a user having to manually place the piston into the first position and/or replace the piston. For example, in some embodiments the controller 414 signals the gas system 416 to pump gas from the outer chamber 422 to the inner chamber 420 resulting in a pressure differential across the piston 118 that results in a force that drives the piston toward the electrode contacts 113, 115. The reclose speed of the piston 118 is controlled by the rate at which the inner chamber 420 is pressurized and/or the valve open threshold.

Figure 7E:
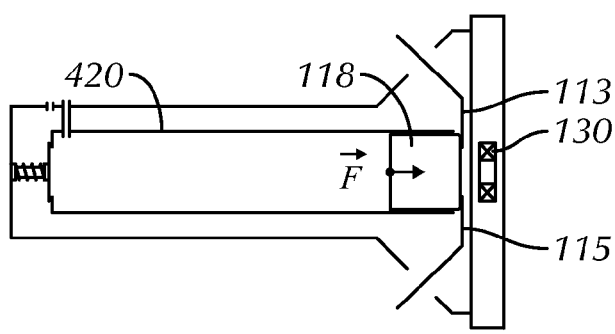

Referring to FIGS. 4 and 7E, when the piston 118 is seated against the electrode contacts 113, 115, the controller 414 signals the gas system 416 to restore the initial gas pressure in the inner chamber 420 and to maintain a specified pressure differential between the inner chamber 420 and outer chamber 422 to ensure electrical contact between the electrical conductor 120 of the piston 118 and the electrode contacts 113, 115. With the piston 118 returned to the first position and providing the electrical path between the first electrode 112 and the second electrode 114, the interrupter assembly 412 is in a closed state and ready to resume normal operations.

Figure 8:
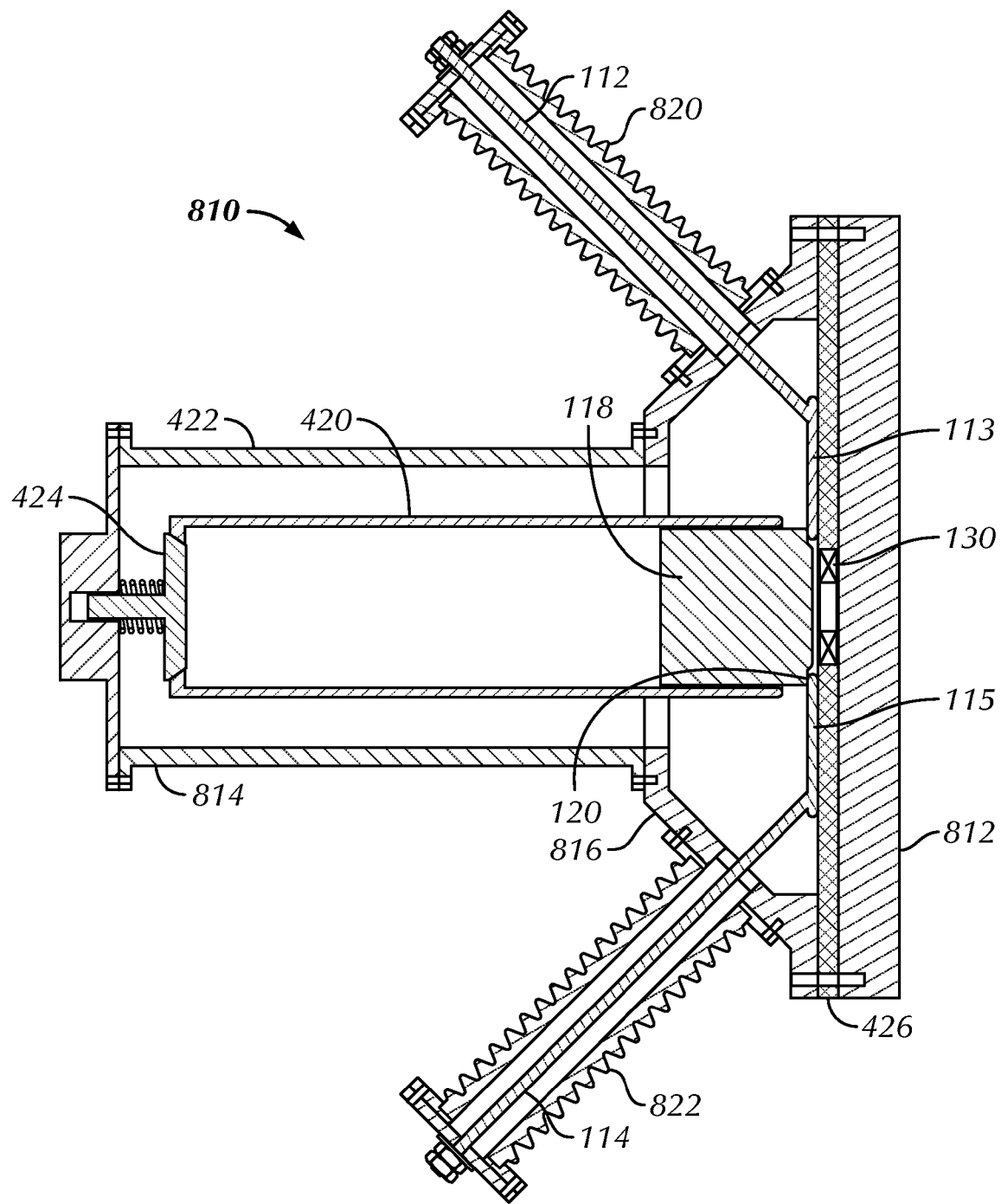
FIG. 8 illustrates a cross-sectional view of an interrupter assembly 810, in accordance with some embodiments.

FIG. 8 illustrates a cross-sectional view of an interrupter assembly 810, in accordance with some embodiments. The interrupter assembly 810 comprises first electrode 112, second electrode 114, first electrode contact 113, second electrode contact 115, a contact piston 118 with one or more electrical conductors 120, the drive coil 130, an inner chamber 420, an outer chamber 422, a valve 424 closing an opening in the first chamber cooperating the inner chamber and the outer chamber, one or more ports (not shown) on the inner chamber and/or the outer chamber to allow a gas system 416 to couple with and control pressures within one or both of the inner chamber and the outer chamber, insulators 426 and a base or foundation 812.

In some embodiments, at least a portion of the inner chamber 420 is positioned within the outer chamber 422. Further, in some embodiments, the outer chamber comprises an extended portion 814 that is cooperated with a support or housing 816 portion. The first and second electrodes 112, 114 are secured with the housing 816 extending through the housing with the electrode contacts 113, 115 positioned to cooperate with the piston 118. The housing 816 and/or outer cylinder can be constructed of an insulating material and provide electrical insulation. Further insulation may be provided by the main insulator 426. Further, in some embodiments, the foundation 812 provides additional insulation. The inner chamber 420 and outer chamber 422 can be configured with any number of configurations (e.g., cylindrical, cubic, etc.) and can depend on the intended implementation. Similarly, the piston 118 can be configured to correspond with the shape and/or cross-sectional shape of the inner chamber 420.

In some embodiments, the piston 118 is cylindrically shaped. The face of the piston 118 facing the drive coil 130 includes an electrically conductive portion and/or is constructed from an electrically conducting material, and typically includes and/or is the electrical conductor 120 of the piston. For example, in some embodiments, the electrical conductor 120 is the face of the piston and can be circular, generally ring shaped, or other such shapes, and typically corresponds with the cross-sectional shape of the piston body. The body of the piston 118 is constructed of a suitable material that may or may not be electrically conducting but provides for suitable strength under high acceleration, and in some embodiments low friction, as the piston 118 slides within the inner chamber 420. Further, the piston can be constructed as a single structure or may be multiple pieces secured together. In some embodiments, the drive coil 130 has a relatively low profile and in some instances is an approximately flat coil or coils of conductive material. In some embodiments, the coil is ring shaped and can be generally circular, toroidal, square or other relevant shapes.

In some embodiments, the electrical conductor 120 is circular and/or ring shaped, which can enhance magnetic coupling with the drive coil 130. Further, in some embodiments, the piston 118 is generally cylindrical in shape, which allows for: good magnetic coupling with the drive coil 130, thereby minimizing the stored energy needed to launch the piston 118 and the size of the drive circuit (3) elements; a shape that when accelerated within the inner chamber 420 provides for stable, high speed motion with minimal frictional heating; and allows for repeatably arresting the motion of the piston 118 and for restoring to the first position with the electrical conductor 120 being electrically coupled with the first and second electrodes 112, 114.

As described above, the interrupter assembly 810 can include multiple insulators and/or components can be constructed of electrically insulating materials. For example, the main insulator 426, the housing 816, and the foundation 812 can provide electrical insulation. In some embodiments, these elements collectively form a structural assembly to which are mounted the electrodes 112, 114, the inner chamber 420 and the outer chamber 422 (or at least the extended portion 814 of the outer chamber). Some embodiments further include electrode insulators 820, 822 that provide insulation to the first and second electrodes 112, 114, respectively, allowing the electrodes to extend away from the housing, which can allow for easier coupling with transmission lines or other conductors.

The electrode contacts 113, 115 are in contact with the electrical conductor 120 of the piston 118 when the interrupter assembly 810 is in a closed state. In some instances, the electrode contacts 113, 115 are pinched between the piston 118 and the main insulator 426, which is supported by and/or bears against the foundation 812. Additionally, in some embodiments, the electrode contacts 113, 115 are configured with a sector shaped region. Other embodiments employ other shaped regions, such as but not limited to circular, oval, rectangular, square, or substantially any other relevant shape. Further, the electrode contact sectors are, in some embodiments, relatively planar and/or with flat surfaces. The region provides an electrical conduction path from the electrodes 112, 114 to the electrical conductor 120 of the piston 118. The area of the sector and the contact pressure are determined typically so as to achieve low electrical loss. Similarly, the material used to form the electrode contacts 113, 115 and/or the electrical conductor 120 of the piston 118 can be selected to reduce electrical losses.

In addition, when the interrupter assembly 810 is in the open state, a high voltage exists between the electrode contacts 113, 115. As a consequence, the main insulator 426 is constructed of a non-conducting material and configured to provide good resistance to high voltage tracking and breakdown. The housing 816 is constructed of a material that may or may not be electrically conducting but provides adequate structural strength under the intended modes of operation. Further, the housing 816 can form at least part of a structural element to which the outer chamber 422 or at least the extended portion 814 of the outer chamber and the electrodes 112, 114 are secured. Additionally, the housing can be constructed of material that may or may not be electrically conducting but provides adequate structural strength under intended modes of operation.

The electrodes 112, 114 comprise two electrode conductors extending into and/or electrically coupled with the electrode contacts 113, 115, and the electrode insulators 820, 822. In some embodiments, the electrodes are configured so that at one end a connection to an external circuit or network can be made (e.g., through screw terminals or other such coupling) and at the other end comprise the electrode contacts 113, 115 that contact with the piston 118 when the piston is in the first position and the interrupter assembly is in the closed state. The electrodes 112, 114 can be positioned in substantially any configuration, and often are arranged depending on intended implementation. In some embodiments, for example, the two electrodes 112, 114 are arranged so as to be diametrically opposed one from the other and/or on opposite sides of a central axis of the interrupter assembly that extends generally along the lengths of the inner and outer chambers and along which the piston is aligned and moves.

When the interrupter assembly 810 is connected to an external circuit or network, one electrode (e.g., the first electrode 112) is connected to a positive terminal and the other (e.g., second electrode 114) is connected to a negative terminal of the external circuit or network. It is noted, however, that in many embodiments there is no preferred polarity and/or polarity does not have to be predefined. In some implementations, however, the electrodes 112, 114 and/or the electrode insulators 820, 822 may be constructed with identifiers and/or coloring to designate polarity simply to aid an installer in cooperating the interrupter assembly with a circuit or network.

Some embodiments further include one or more components to enhance electric breakdown strength between the electrode contacts 113 and 115 when the interrupter assembly is in an open state. For example, some embodiments include an electrically conductive ring like structure, referred to as a guard ring. The guard ring is electrically coupled with one of the electrodes (e.g., the first electrode 112). Further, in some embodiments as is described in FIGS. 9A and 9B, the guard ring is shaped and positioned so as to encircle the inner chamber 420 at an end of the inner chamber proximate to the electrode contacts 113, 115. In other embodiments, depending on whether or not the inner chamber 420 is conductive and/or whether or not all portions of the piston are conductive, the guard ring may be alternatively positioned and oriented as is further described below.

Figure 9A:
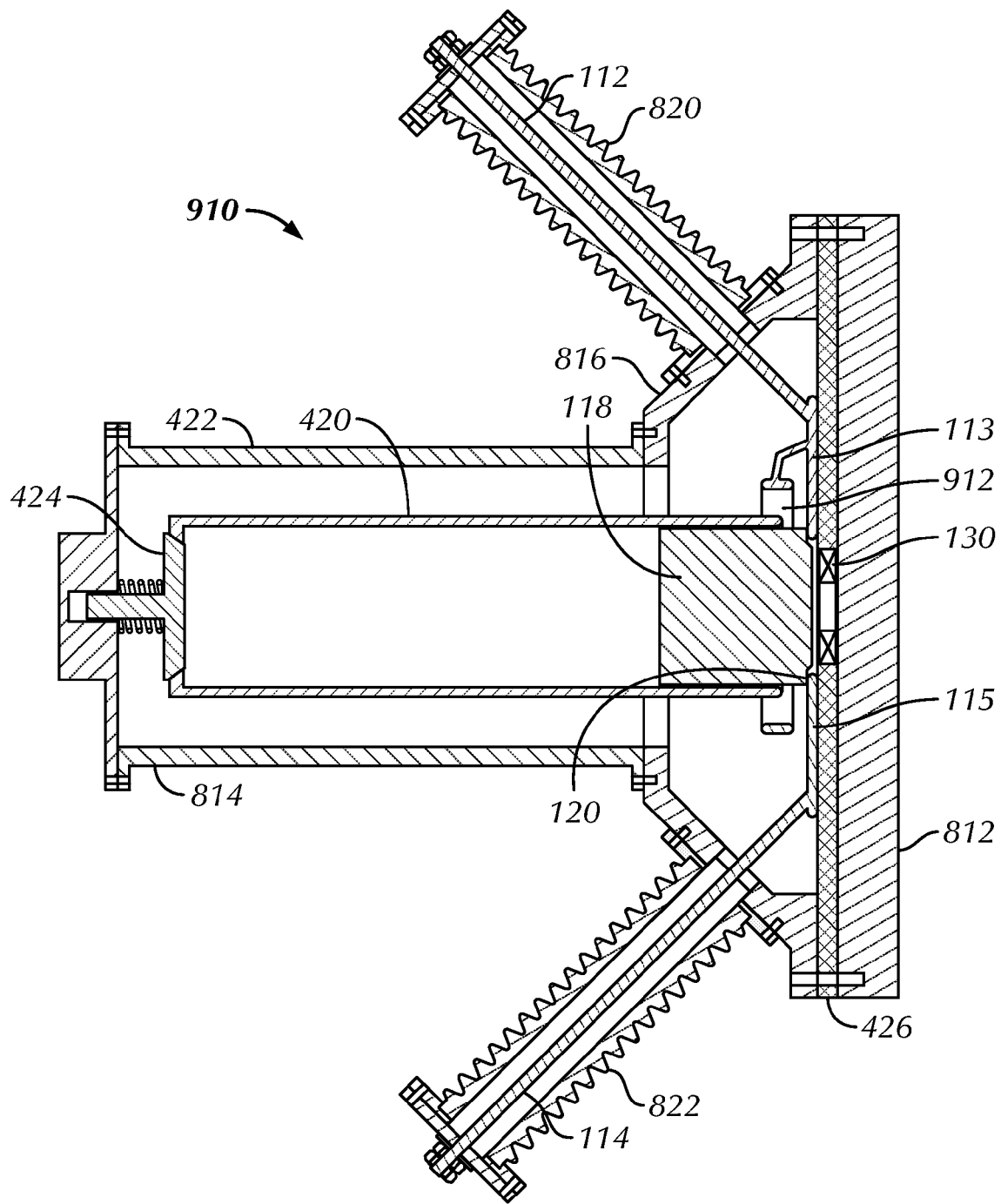
FIG. 9A illustrates a simplified schematic, cross-sectional view of an exemplary interrupter assembly 910 that comprises a guard ring, in accordance with some embodiments.
Figure 9B:
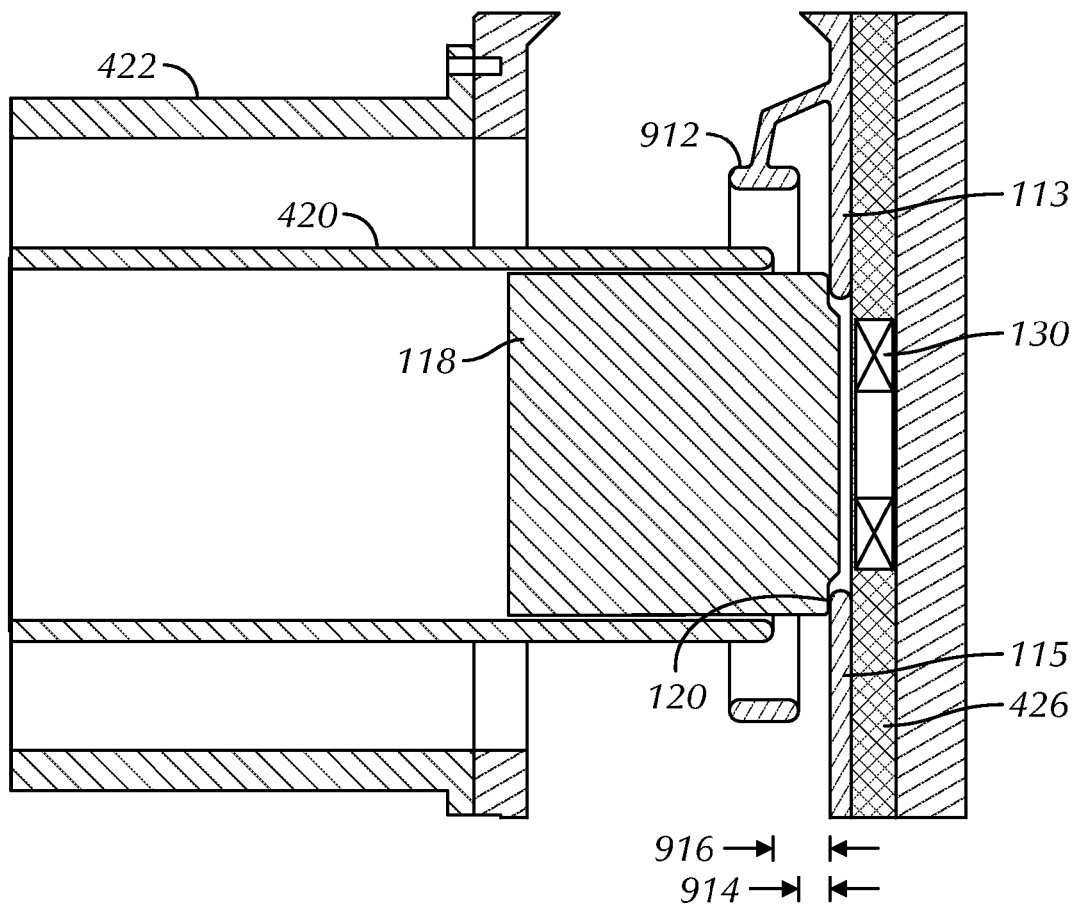
FIG. 9B shows a zoomed in view of the interrupter assembly illustrated in FIG. 9A.
Figure 9C:
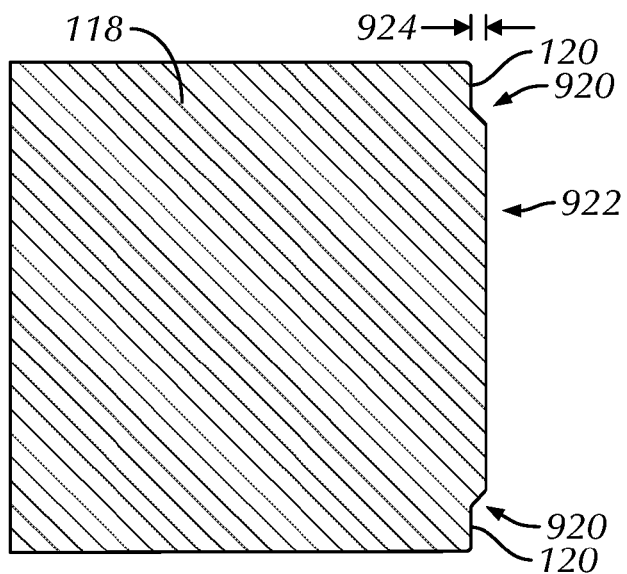
FIG. 9C shows a simplified cross-sectional view of an exemplary piston, in accordance with some embodiments.

FIG. 9A illustrates a simplified schematic, cross-sectional view of an exemplary interrupter assembly 910 that comprises a guard ring 912, in accordance with some embodiments. FIG. 9B shows a zoomed in view of the interrupter assembly 910 proximate the guard ring 912 and electrode contacts 113, 115 and where the piston 118 is positioned when the interrupter assembly 910 is in the closed state (e.g., the first position). FIG. 9C shows a simplified cross-sectional view of an exemplary piston 118, in accordance with some embodiments, that can be utilized, for example, in the interrupter assembly 910 of FIG. 9A.

Referring to FIGS. 9A-C, the interrupter assembly 910 is similar to the interrupter assembly 810 illustrated in FIG. 8 with the addition of an exemplary embodiment of the guard ring 912, and further comprises the first electrode 112, second electrode 114, first electrode contact 113, second electrode contact 115, a contact piston 118 with one or more electrical conductors 120, the drive coil 130, an inner chamber 420, an outer chamber 422, a valve 424 closing an opening in the first chamber cooperating the inner chamber and the outer chamber, one or more ports (not shown) on the inner chamber and/or the outer chamber to allow a gas system 416 to couple with and control pressures within one or both of the inner chamber and the outer chamber, main insulator 426, foundation 812, housing 816, and electrode insulators 820, 822.

In the illustrated embodiment, the guard ring 912 comprises an electrically conductive material configured in the generally ring like structure to be positioned proximate the electrode contacts 113, 115. The guard ring 912 is electrically coupled with one of the two electrodes (e.g., the first electrode 112) and is shaped and positioned so as to encircle a volume proximate the electrode contacts 113, 115. In some embodiments as illustrated, in the event the inner chamber 420 is electrically conductive, the guard ring 912 further encircles a portion of the wall of the inner chamber 420 proximate the electrode contacts 113, 115. Alternatively, in the event the inner chamber 420 is not electrically conductive, the guard ring 912 is positioned proximate to the piston to encircle the piston 118 without encircling the inner chamber 420 (e.g., in the illustration of FIGS. 9A and 9B, the right edge of the inner chamber wall could be shortened such that the guard ring 912 directly encircles the piston 118. Furthermore, in embodiments where only a portion of the piston 118 is electrically conductive (e.g., the electrical conductor 120 of the piston is only at the face (e.g., the far right edge of the piston in FIGS. 9A and 9B)), the guard ring is configured to encircle the electrical conductor 120 of the piston. Thus, however configured, the guard ring is to be positioned, sized and oriented to encircle (e.g., extend circumferentially about) and be electrically proximate to at least the conducting part of the piston. For example, the guard ring is indirectly electrically proximate to the conducting portion of the piston and encircles a portion of the conductive inner chamber 420 that itself encircles the conducting portion of the piston. In another example, the guard ring is directly electrically proximate to the conducting portion of the piston and encircles a portion of the conducting portion of the piston itself. Furthermore, the guard ring 912 is further positioned to be separated from the electrode contacts 113, 115 by a distance 914. It is understood that this distance may vary depending on the configuration and conductivity of the piston 118 and inner chamber 420. Additionally, in some embodiments, the guard ring is configured and positioned to allow the insulating gas to flow around the electrode contacts, and in some instances is spaced from the wall of the inner chamber 420 and/or piston 118.

The guard ring 912 is positioned as illustrated and as alternatively described so as to provide adequate electric breakdown strength between the electrode contact 113 with which the guard ring 912 is electrically coupled (some times referred to as the guard ring electrode or guard ring electrode contact, which in the exemplary embodiment of FIGS. 9A-9B is the first electrode contact 113 electrically coupled with the first electrode 112) and the other electrode contact 115 when the interrupter assembly 910 is in the open state. Additionally or alternatively, the guard ring 912 balances capacitive coupling, reduces the maximum E-field in the gap between the electrode contacts 113, 115, and improves the voltage standoff. In some implementations, these benefits of the guard ring further allow the interrupter assembly to be smaller in one or both the length and diameter while still achieving intended results. Further, in some embodiments, the guard ring 912 is constructed with a slit or other suitable structure or member that limits or prevents the development of circumferentially flowing electric currents that may be induced by the proximity of the guard ring 912 to the magnetic field pulse of the drive coil 130.

In some embodiments, the electrode insulators 820, 822 comprise non-conducting generally tubular structure with flanges to permit one or more both ends to facilitate fastening of the electrode insulators and electrodes to the housing 816 and terminals of electrodes configured to allow an external circuit or network to be coupled with the interrupter assembly 910. The electrode insulator is typically further configured to provide adequate high voltage breakdown and surface tracking resistance between its flanges both inside and out, and to provide adequate structural strength to tolerate in internal pressures of the interrupter assembly.

The inner chamber 420, in some embodiments, includes a tubular structure within which the piston 118 is constrained to move. Additionally, the inner chamber 420 is constructed from a suitable material with sufficient strength to support the differential pressures generated as a result of normal operations and may or may not be electrically conducting. Similarly, the outer chamber 422 comprises a tubular structure within which the inner chamber 420 and valve 424 are mounted. The outer chamber is also constructed from a suitable material (which may be the same as or different than the material of the inner chamber) with sufficient strength to support the differential pressures generated as a result of normal operations and may or may not be electrically conducting.

The valve 424 cooperates the inner volumes of the inner chamber 420 and the outer chamber 422. The valve, when closed, prevents gas flow from one chamber to the other and when open provides an orifice or passage (which may have variable cross section) that modulates the gas flow from one chamber to the other. When closed, the valve allows a pressure differential to be established by the gas system 416 (see FIG. 4), which in part establishes a contact pressure between the electrical conductor 120 of the piston 118 and the electrode contacts 113, 115. When the valve 424 is open, the orifice modulates the gas flow from the inner chamber 420 to the outer chamber 422, establishing the pressure differential realized across the faces of the piston 118 that acts to control the movement dynamics of the piston. In some embodiments, the valve 424 comprises a spring-loaded check-valve. In other embodiments, the valve may comprise a solenoid-driven valve with an associated power circuit to control the valve. In those embodiments having the solenoid-driven valve, when the controller 414 initiates an interrupt (e.g., receives a signal to open the interrupter assembly 112 or detects a threshold condition), the signal to trigger the drive control system 132 and the signals to open and close the solenoid-driven valve can be coordinated to properly arrest, latch and reclose the piston 118.

Referring to FIG. 9B, in some embodiments, the wall of the inner chamber 420 is separated or spaced by a distance 916 from the electrode contacts 113, 115 and/or the main insulator 426 providing a gap through which the insulating gas can flow to be proximate the electrode conductors to inhibit arcing. Other embodiments are configured with holes, passages or the like through the wall of the inner chamber allow the insulator gas to flow through.

Referring to FIG. 9C, the piston 118 can be constructed to provide that at least a portion of the electrical conductor 120 and/or an electrically conductive portion of the piston is positioned close to the drive coil 130 to receive the magnetic field pulse. In some embodiments, the piston 118 and/or the electrical conductor 120 are configured with a step 920, recess and/or ramp that, for example, can extend around a perimeter of the face of the piston 118 and/or electrical conductor 120 such that some or all of a central portion 922 of the piston 118 and/or electrical conductor 120 extend a distance 924 to allow that central portion 922 to be closer to the drive coil 130. The distance 924 can be substantially any distance. Further, the embodiment shows the step 920 as being generally perpendicular to the side of the piston; however, the step can have substantially any configuration that cooperates with the electrode contacts 113, 115.

Figure 10:
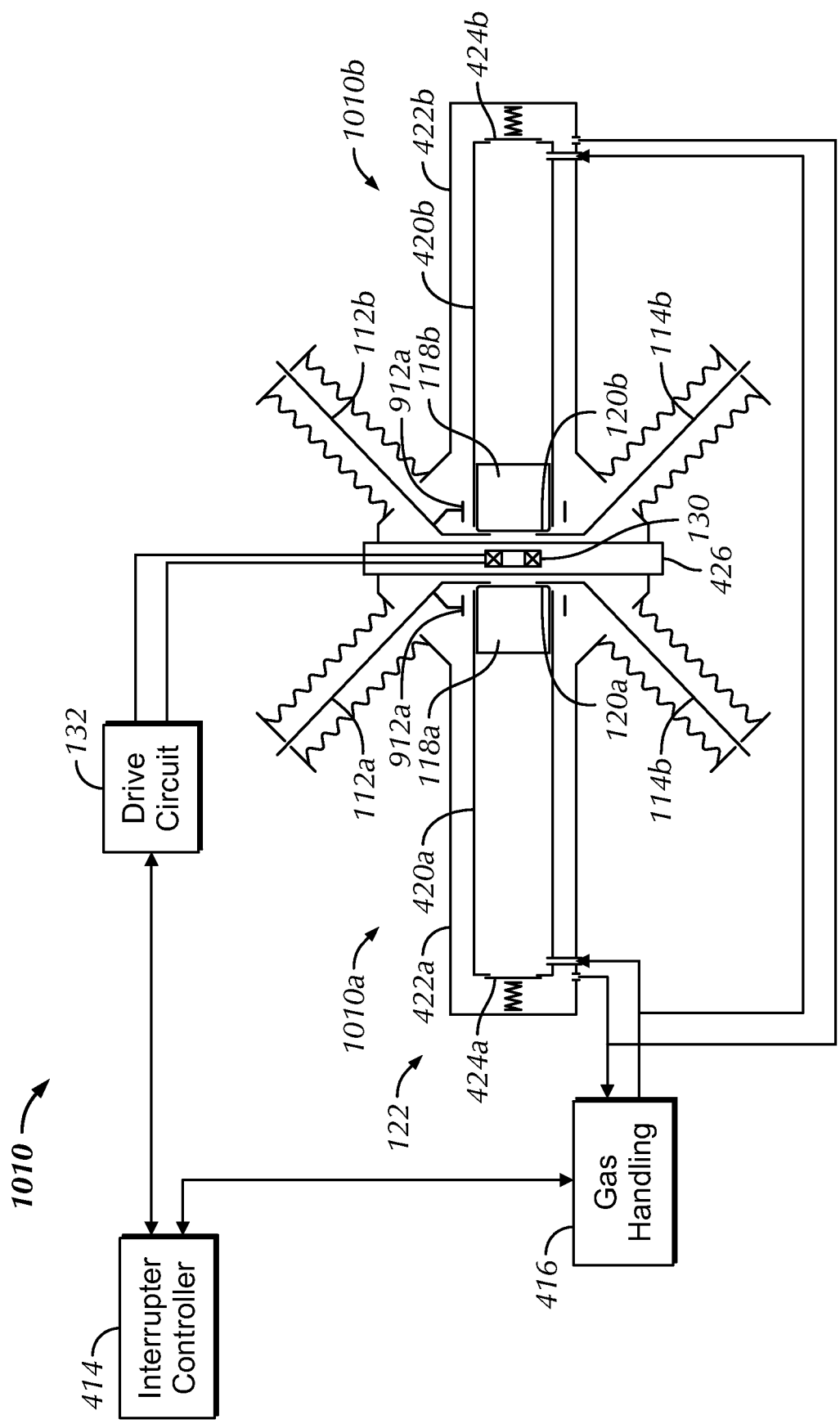
FIG. 10 illustrates a simplified block diagram of an exemplary modular interrupter system, in accordance with some embodiments.
Figure 11:
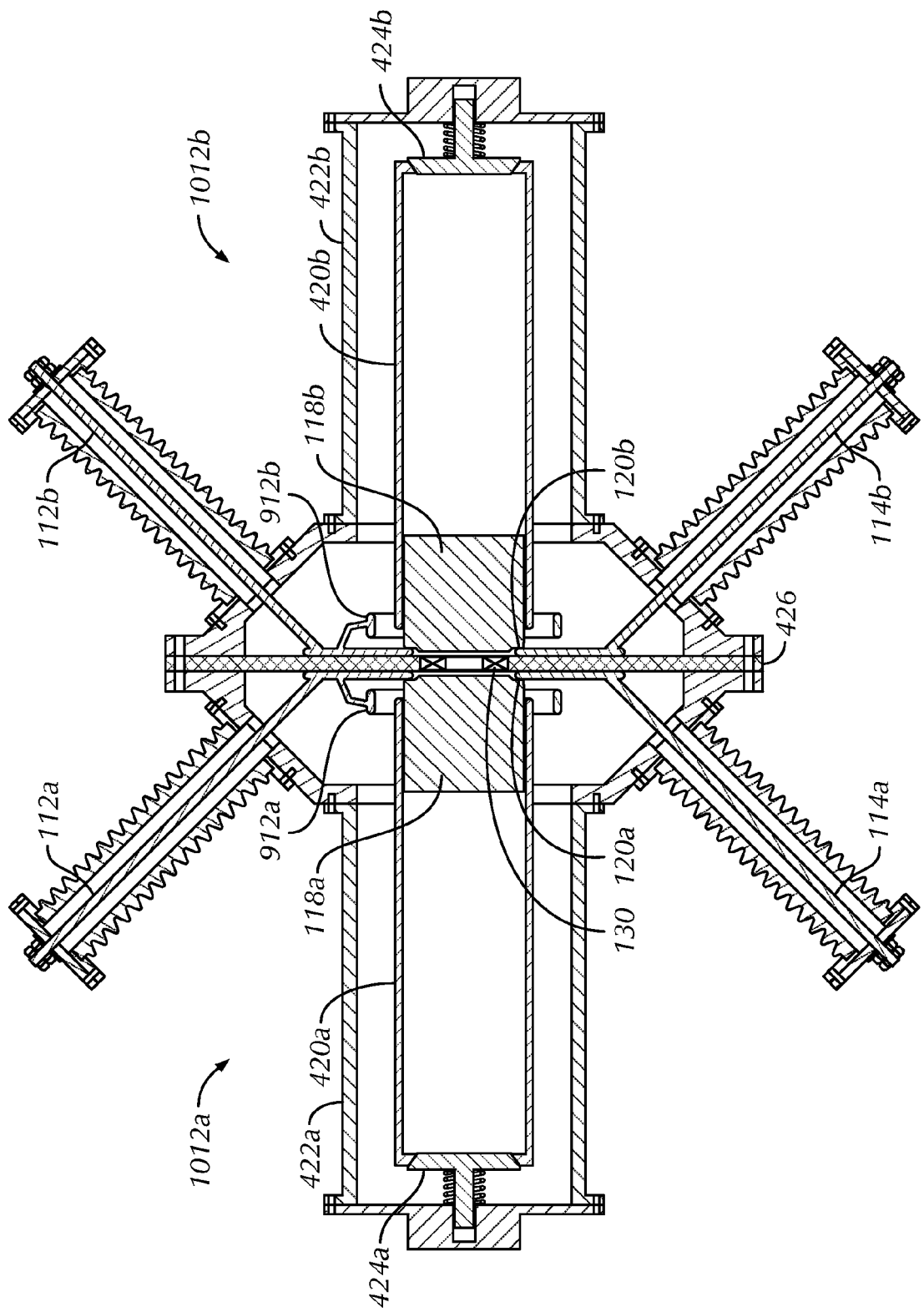
FIG. 11 illustrates a cross-sectional view of exemplary interrupter assemblies cooperatively configured, in accordance with some embodiments, which can be utilized in the modular interrupter system of FIG. 10.

FIG. 10 illustrates a simplified block diagram of an exemplary modular interrupter system 1010, in accordance with some embodiments. FIG. 11 illustrates a cross-sectional view of exemplary interrupter assemblies 1010a, 1010b cooperatively configured, in accordance with some embodiments, which can be utilized in the modular interrupter system 1010 of FIG. 10. Referring to FIGS. 10 and 11, the interrupter system 1010 includes a pair of interrupter assemblies 1010a, 1010b (or 1012a and 1012b) (sometimes referred to as first interrupter assembly 1010a, 1012a, and second interrupter assembly 1010b, 1012b), a controller 414, a drive control system 132, and piston control system 122 that includes at least a gas system 416. In some embodiments, the two interrupter assemblies are configured to be cooperatively controlled and driven by a single controller 414 and drive control system 132 with a drive coil 130. Further, in some implementations, the interrupter system includes a single gas system 416 that cooperates with both of the interrupter assemblies 1010a, 1010b to at least in part control the pressures within the interrupter assemblies, such as when controlling movement of the pistons returning the pistons to the first position. In other embodiment, two gas systems could be utilized.

In some embodiments, the first and second interrupter assemblies 1010a, 1010b, 1012a, 1012b each include, respectively, first electrodes 112a, 112b, second electrodes 114a, 114b, pistons 118a, 118b each with one or more electrical conductors 120a, 120b, first or inner chamber 420a, 420b, second or outer chamber 422a, 422b, valve 424a, 424b, and relevant insulators. Again, because of the cooperative configuration, the two interrupter assemblies are secured or mounted with a single main insulator 426 (or two main insulators are cooperated), with a single drive coil 130 that when activated simultaneously drives both pistons 118a, 118b. In some embodiments, one or both of the interrupter assemblies 1010a, 1010b, 1012a, 1012b includes guard rings 912a, 912b such as described above.

The interrupter assemblies 1010a, 1010b, 1012a, 1012b are configured such that their functionality and method of operation are similar to those described above with respect one or more of FIGS. 4, 5A-5B and 8-9. The pistons 118a, 118b are arranged symmetrically about the drive coil 130. Accordingly, when the drive control system 132 is triggered to induce the magnetic field pulse through the drive coil 130, the pistons 118a, 118b are simultaneously launched in opposite directions, with their respective movements within the inner chambers 420a, 420b and/or their arrest are controlled in manners similar to those as described above and depicted at least in one or more of FIGS. 4, 5A-5B and 8-9. Further, in some embodiments, the both inner chamber 420a, 420b are connected by gas lines and both outer chambers 422a, 422b are connected by gas lines allowing gas operations through the gas system 416 to be conducted and controlled simultaneously.

The modular arrangement utilizing two interrupter assemblies provides many benefits. For example, with the two pistons 118a, 118b arranged symmetrically about the drive coil 130, the internal forces are substantially cancel. As a consequence, the mounting structure of the modular interrupter system 1010 of FIGS. 10-11 may, in some implementations, be configured to merely support the weight of the system. Further, because there are four electrodes, the interrupter system 1010 may be modularly configured as (a) two independent interrupter assemblies; (b) one series connected interrupter assembly with about twice the voltage capability or more; or (c) one parallel connected interrupter with about twice the current carrying capability.

Figure 12A:
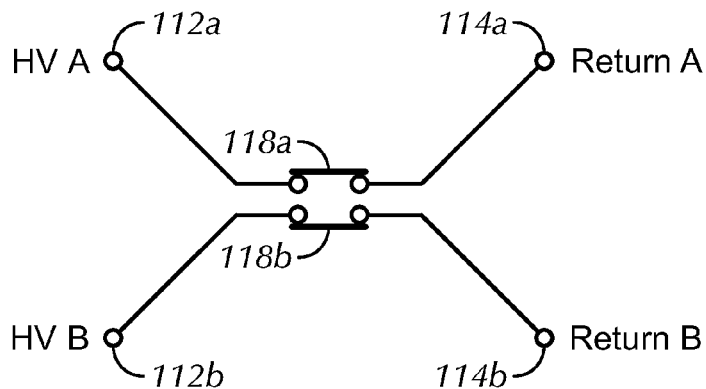
FIG. 12A shows a simplified coupling diagram showing a parallel coupling of two pistons of first and second interrupter assemblies providing two interrupter assemblies, in accordance with some embodiments.

FIG. 12A shows a simplified coupling diagram showing a parallel coupling of two pistons 118a, 118b of first and second interrupter assemblies providing two interrupter assemblies, in accordance with some embodiments. In this configuration, the first piston 118a couples between a first electrode 112a (e.g., a high voltage connection) and a second electrode 114a (e.g., a return) establishing a conductive path between the first electrode 112a and the second electrode 114a, and the second piston 118b couples between a third electrode 112b (e.g., a high voltage connection) and a fourth electrode 114b (e.g., a return) establishing a conductive path between the third electrode 112b and the fourth electrode 114b.

Figure 12B:
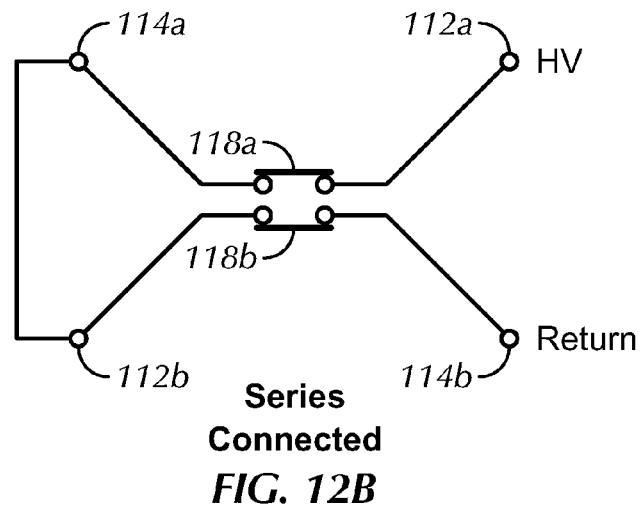
FIG. 12B shows a simplified coupling diagram showing a series coupling of two pistons of first and second interrupter assemblies configured to operate as a single interrupter assembly, in accordance with some embodiments.

FIG. 12B shows a simplified coupling diagram showing a series coupling of two pistons 118a, 118b of first and second interrupter assemblies configured to operate as a single interrupter assembly with about twice the voltage capability or more, in accordance with some embodiments. A first piston 118a couples a first electrode 112a (e.g., a high voltage connection) in series with a first internal electrode 114a that in turn is coupled in series with a second internal electrode 112b. A second piston 118b couples the second internal electrode 112b with the second electrode 114b (e.g., a return).

Figure 12C:
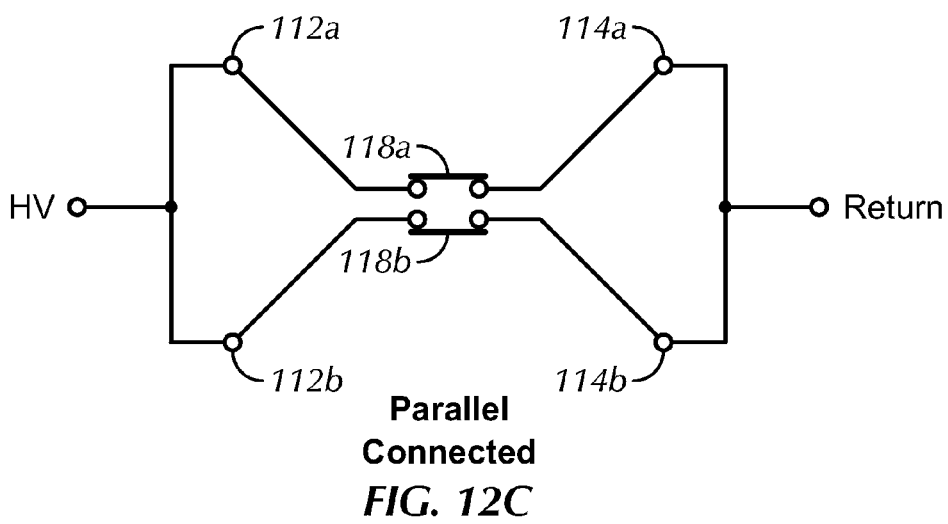
FIG. 12C shows a simplified coupling diagram showing two pistons coupled in parallel and configured to operate as a single interrupter assembly, in accordance with some embodiments.

FIG. 12C shows a simplified coupling diagram showing two pistons 118a, 118b coupled in parallel and configured to operate as a single interrupter assembly, in accordance with some embodiments. First electrodes 112a and 112b of each interrupter assemblies are coupled together, while second electrodes 114a and 114b of each interrupter assemblies are coupled together. A high voltage is applied to the two first electrodes with the two second electrodes providing the return. Accordingly, the configuration provides a single interrupter assembly with interrupter assemblies coupled in parallel providing about twice the current carrying capability.

Figure 13A:
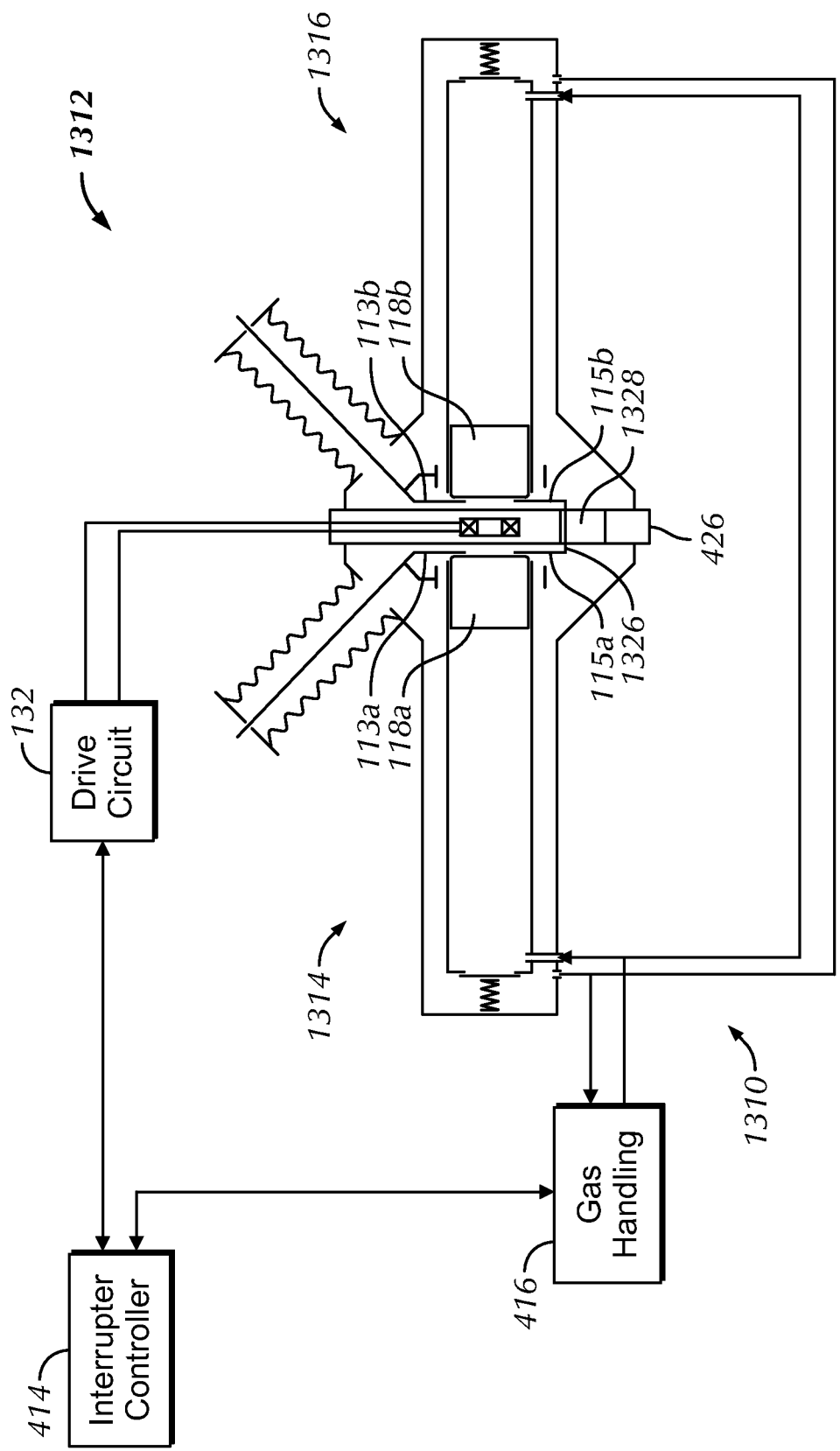
FIG. 13A illustrates a simplified block diagram of an exemplary modular interrupter system, in accordance with some embodiments.
Figure 13B:
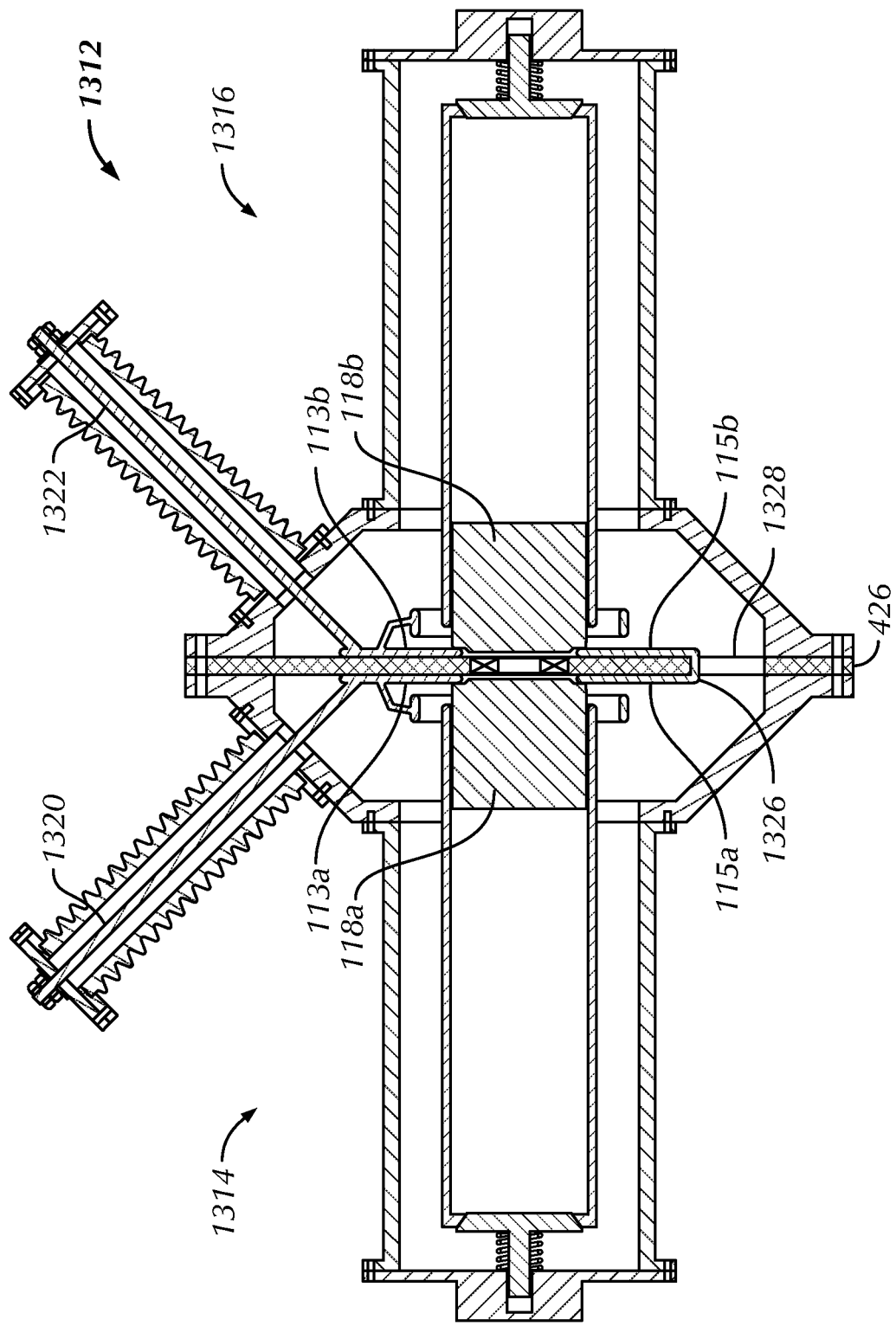
FIG. 13B illustrates a cross-sectional view of the exemplary modular series interrupter assembly of FIG. 13A, in accordance with some embodiments.

FIG. 13A illustrates a simplified block diagram of an exemplary modular interrupter system 1310, in accordance with some embodiments, that comprises a first interrupter assembly 1314 coupled in series with a second interrupter assembly 1316 cooperatively providing a modular series interrupter assembly 1312. FIG. 13B illustrates a cross-sectional view of the exemplary modular series interrupter assembly 1312 of FIG. 13A, in accordance with some embodiments. Referring to FIGS. 13A-13B, the interrupter system 1310 further includes a controller 414, a drive control system 132, piston control system 122 that includes at least a gas system 416, and the modular series interrupter assembly 1312. Similar to the series coupled embodiment described above with respect to FIG. 12B, the modular series interrupter assembly 1312 provides a two terminal device that utilizes the two interrupter assemblies 1314, 1316 configured to operate as a single modular series interrupter assembly with about twice the voltage capability.

In some embodiments, the modular series interrupter assembly 1312 has two externally accessible electrodes 1320, 1322, the first electrode 1320 cooperated with the first interrupter assembly 1314 and the second cooperated with the second interrupter assembly 1316. Each of the first and second interrupter assemblies 1314, 1316 are similar to the interrupter assemblies described above, such as those described with reference to FIGS. 4 and 8-9, and operate similar to those interrupter assemblies, except that the first interrupter assembly 1314 and the second interrupter assembly 1316 are coupled in series. In some embodiments, one or both of the interrupter assemblies 1314, 1316 includes a guard ring (such as guard rings 912a, 912b) such as described herein.

As with the interrupter assemblies described above, the first and second interrupter assemblies 1314, 1316 include first and second electrode contacts 113a, 115a and 113b, 115b, respectively, and a piston 118a, 118b that contacts and establishes an electrically conductive path between the respective first electrode contact and the second electrode contact. In the modular series interrupter assembly 1312, however, the second electrode contact 115a of the first interrupter assembly 1314 is directly coupled with the second electrode contact 115b of the second interrupter assembly 1316 through an intermediate jump or series coupling 1326. In some embodiments, the second electrode contacts 115a, 115b (and their associated external electrodes and insulators) are replaced with the intermediate series coupling 1326 (also be referred to as an intermediate series electrode).

Further, in some embodiments, the main insulator 426 is slotted and/or includes a passage 1328 through which the intermediate series coupling 1326 passes. Additionally, the passage 1328 can be configured to allow for the proper placement and/or locating of the intermediate series coupling 1326 and second electrode contacts 115a, 115b (or intermediate series electrode) relative to the pistons 118a, 118b. Other embodiments may include additional external electrodes with the intermediate series coupling 1326 being coupled with the additional external electrodes externally coupling the two interrupter assemblies in series.

In operation, the drive control system 132 triggers that drive coil 130 to induce the magnetic field pulse. In response to the pulse, both pistons 118a, 118b are driven away from the first electrode contacts 113a, 113b and second electrode contacts 115a, 115b breaking the electrically conductive path between the first external electrode 1320 and the second external electrode 1322.

The gas system 416 couples with both of the interrupter assemblies 1314, 1316 to provide control over the pressures within the first and second chambers of the interrupter assemblies. FIG. 13A shows a single gas system 416, however, it will be appreciated that the gas system can include one or more pumps and/or other such gas control systems and in some instances may include independent gas systems that are separately controlled by the controller 414. As described above, the single gas system 416 at least in part controls the pressures within the chambers to aid in controlling movement of the pistons 118a, 118b and/or maintaining the pistons positions.

Figure 14:
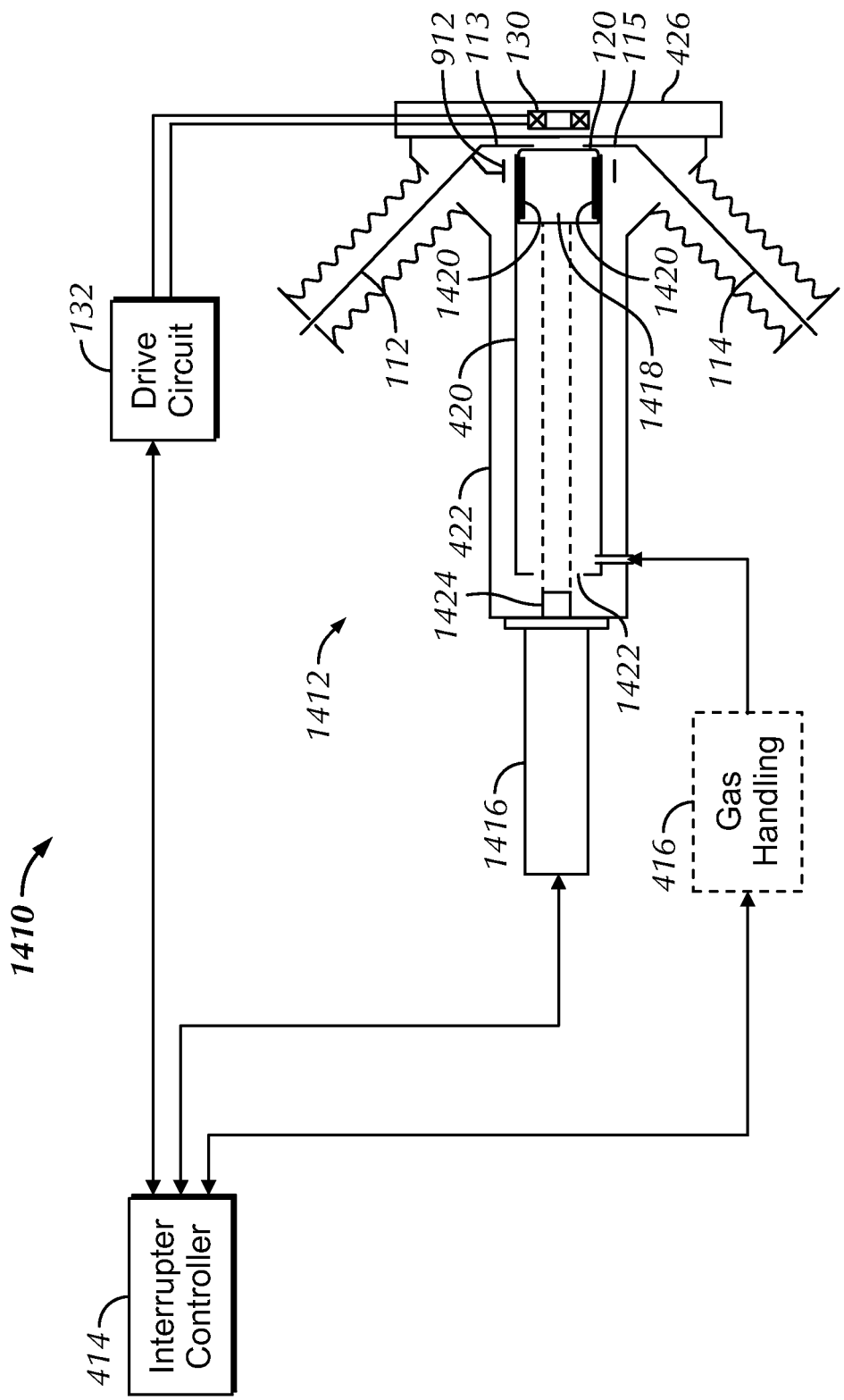
FIG. 14 illustrates a simplified block diagram of an exemplary interrupter system that additionally or alternatively employs friction to control and/or aid in controlling the movement of the piston, in accordance with some embodiments.
Figure 15:
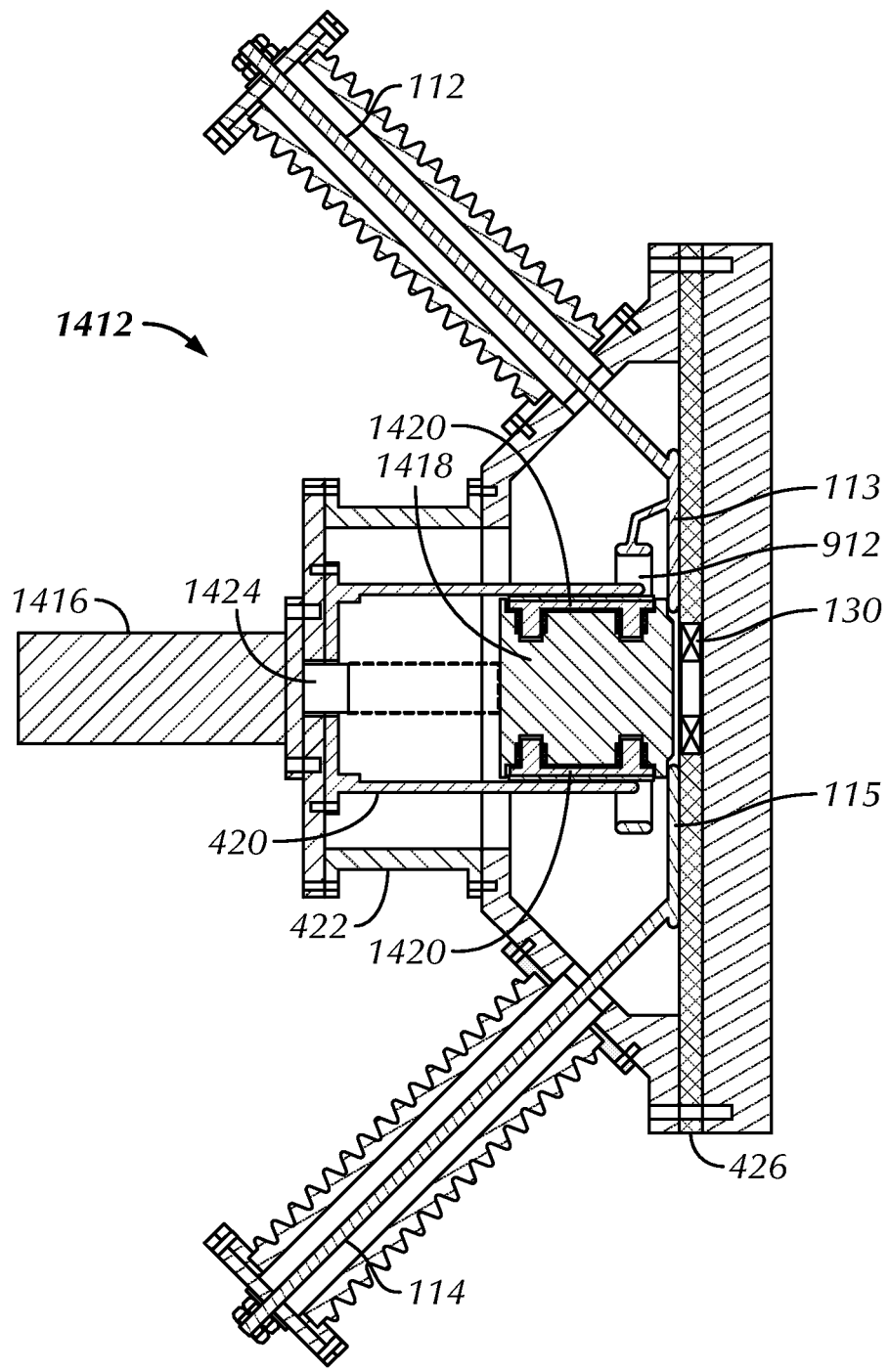
FIG. 15 illustrates a cross-sectional view of an exemplary interrupter assembly, in accordance with some embodiments.

FIG. 14 illustrates a simplified block diagram of an exemplary interrupter system 1410 that additionally or alternatively employs friction to control and/or aid in controlling the movement of the piston 1418, in accordance with some embodiments. FIG. 15 illustrates a cross-sectional view of an exemplary interrupter assembly 1412, in accordance with some embodiments. Referring to FIGS. 14-15, the interrupter system 1410 includes an interrupter assembly or unit 1412, a controller 414, a drive control system 132, and optionally includes a gas system 416.

The interrupter assembly 1412 comprises a first electrode 112, a second electrode 114, the piston 1418 with one or more electrical conductors 120 and one or more friction elements, surfaces or contacts 1420, a drive coil 130, a first or inner chamber 420, optionally a second or outer chamber 422, an actuator 1416, and one or more insulators 426. In some embodiments, the interrupter assembly 1412 further includes a guard ring 912 coupled with one of the electrodes and positioned proximate the first and second electrode contacts 113, 115. For example, in some implementations the guard ring 912 is positioned to at least partially encircle a portion of the inner chamber 420 proximate the electrode contacts; however, as described herein, depending on which portions of the piston and the inner chamber are electrically conductive, the guard ring may be differently configured but in any event, the guard ring encircles (e.g., extends circumferentially about) and is electrically proximate to the conducting part of the piston either directly encircling the conducting portion of the piston and/or encircling a conductive inner chamber that encircles the conducting portion of the piston.

Similar to the interrupter systems described above, the piston 1418 is movably positioned within the inner chamber 420 and configured to move longitudinally along at least a portion of the length of the inner chamber. When in a first position the piston 1418 is electrically coupled with the first and second electrodes 112, 114, typically through contact between the electrical conductor 120 of the piston and the first and second electrode contacts 113, 115 that are part of and/or electrically coupled with the first and second electrodes 112, 114, respectively.

Upon activation, the drive coil 130 is configured to drive the piston away from the first position breaking the conductive path between the first electrode 112 and the second electrode 114 provided through the electrical conductor 120 of the piston 1418. In some embodiments, the interrupter assembly 1412 utilizes the actuator 1416 to move the piston 1418 back and return it to the first position. In some embodiments, the actuator is a linear actuator that is activated and controlled by the controller 414 or a separate actuator controller that operates in cooperation with the controller 414.

The actuator 1416 is shown secured with the outer chamber 422. In some embodiments, the outer chamber may not be included and the actuator can be secured with the inner chamber 420. In those embodiments where the outer chamber 422 is included, the inner chamber 420 includes an orifice or opening 1422 through which an actuator pushing rod or piston 1424 passes when pushing the piston 1418 back to first position reseating the piston in contact with the electrode contacts 113, 115.

The friction elements 1420 are configured to contact friction contacts within the inner chamber 420. In many embodiments, at least some portion of the inner walls of the inner chamber 420 is the friction contacts. In other embodiments, one or more friction contact (e.g., strips, rings, etc.) can additionally or alternatively be secured with the inner wall of the inner chamber 420.

In some embodiments, the friction elements 1420 are integral with the piston 1418 to provide friction force as part of the control of movement of the piston. For example, in some embodiments, the friction element 1420 is secured with a lateral side or periphery of the piston 1418. In some embodiments, the friction element extends around a circumference of the piston, while in other implementations may be positioned at various positions on the lateral service of the piston. Further, the friction element 1420 may be biased away from a central axis of the piston 1418. For example, in some embodiments the integral friction element 1420 includes one or more springs (e.g., see FIG. 15) that bias the friction element against the inner wall of the inner chamber 420. Still further, in some embodiments, the biasing of the friction element 1420 may be adjustable to achieve a desired friction force between the friction element 1420 and the inner wall of the inner chamber 420 or other friction contacts within the inner chamber. The drive coil 130 and linear actuator 1416 are configured to induce sufficient force on the piston 1418 to at least initially overcome the friction force provided by the friction element 1420.

As an example, in some embodiments, the 1418 piston with the friction element(s) 1420 is shaped to correspond to the inner chamber 420 (e.g., cylindrically shaped). The face of the piston 1418 facing the drive coil 130 includes the electrical conductor 120 and/or is constructed from an electrically conducting material providing the electrical conductor. The body of the piston 1418 is constructed of a suitable material that may or may not be electrically conducting and includes one or more integral, adjustable friction elements 1420 arranged so as to slide on the inner wall of the inner chamber 420 or other such friction contacts on the inner chamber.

Again, some embodiments optionally include the outer chamber 422. The inner chamber 420 is arranged within an outer chamber 422. The inner chamber includes the orifice 1422 that cooperates the outer chamber with the inner chamber, which allows the actuator rod 1424 to extend into the inner chamber to contact the piston 1418. The orifice 1422 further allows for the free flow of gas between the two chambers. The linear actuator 1416 is mounted on the outer chamber 422 opposite the drive coil 130. Some embodiments optionally include the gas system 416 that is configured to deliver the insulating gas that inhibits and/or suppresses arcing. In some implementations, the gas system 416 optionally maintains a desired pressure (typically substantially constant) inside the internal volume of the first and second chambers under the control of the controller 414.

Figure 16A:
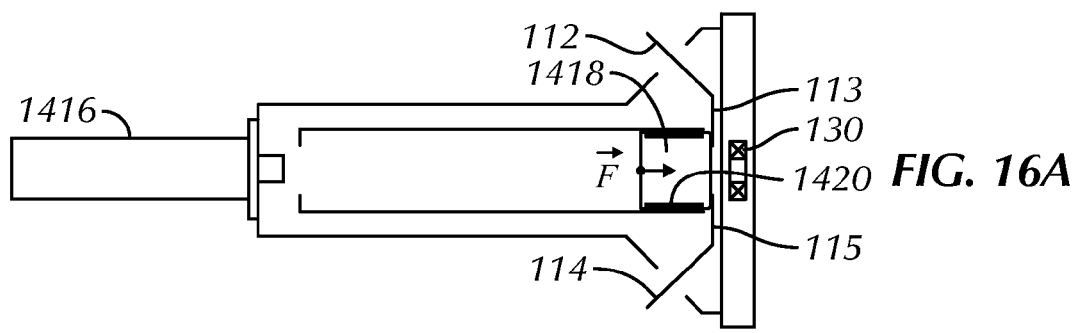
FIGS. 16A-16E show a series of cross-sectional views of a portion of the interrupter assembly of FIG. 14 illustrating an opening sequence, in accordance with some embodiments.

FIGS. 16A-16E show a series of cross-sectional views of a portion of the interrupter assembly 1412 of FIG. 14 illustrating an opening sequence, in accordance with some embodiments, where the piston 1418 is driven away from the first position and the electrode contacts 113, 115 opening the electrical path between the first electrode 112 and the second electrode 114. For example, FIG. 16A shows the piston 1418 in the first position with the electrical conductor 120 of the piston electrically coupled with the electrode contacts 113, 115 of the first and second electrodes 112, 114. The piston 1418 is in the first position and the interrupter assembly 1412 is in a closed state when an electrical circuit or network in which the interrupter assembly 1412 is installed is operating normally allowing current to flow between the first electrode 112 and the second electrode 114.

Under these conditions, the piston 1418, which was previously positioned with the electrical conductor 120 in contact with the electrode contacts, remains in contact with the electrode contacts as consequence of the force provided by the one or more friction elements 1420 bearing upon the inner wall of the inner chamber 420. In some embodiments, a contact force or pressure is further maintained between the piston 1418 and the electrode contacts in part through the friction between the friction element(s) 1420 and the inner chamber. Further, this contact force or pressure produces a relatively low resistance electrical path across the electrode contacts and thus between the first and second electrodes. In some embodiments, while the system is operating normally, the controller 414 sends one or more control commands to the drive control system 132 to store electrical energy in preparation for generating an electrical pulse in the drive coil 130 on command.

Figure 16B:
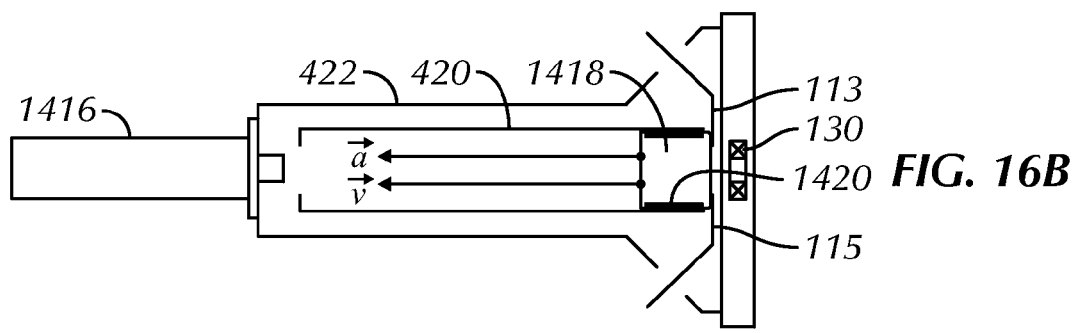
Figure 16C:
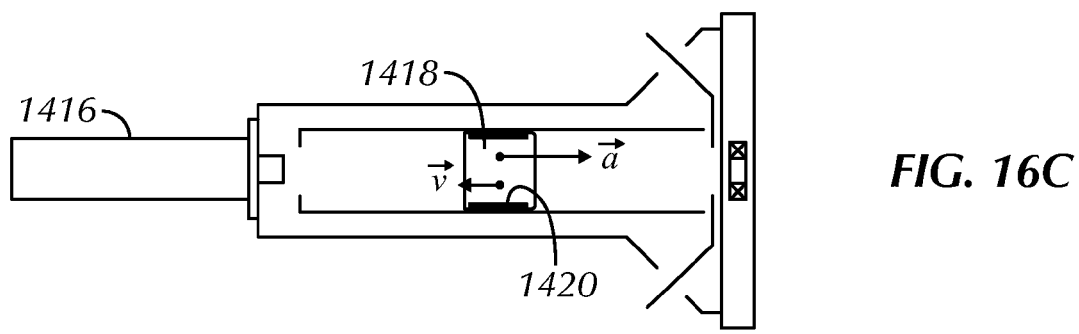
Figure 16D:
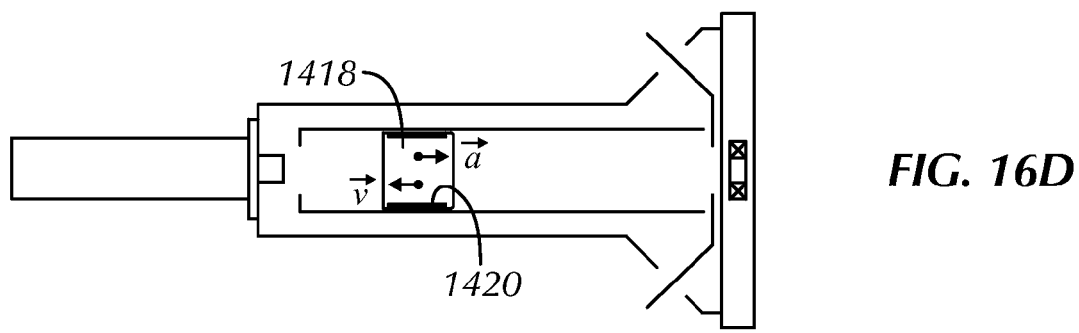

Referring to FIGS. 14-15 and 16B, when the interrupter system 410 detects a threshold condition and/or receives a signal to open or interrupt, the controller 414 sends a command to the drive control system 132 triggering an electric discharge into the drive coil 130 to generate a magnetic pulse. The magnetic pulse induces relatively large currents in the electrical conductor 120 (e.g., a conducting face) of the piston 1418 and correspondingly large Lorentz force that drives the piston 1418 to accelerate away from the electrode contacts 113, 115 and drive coil 130 at a relatively high speed.

Figure 16E:
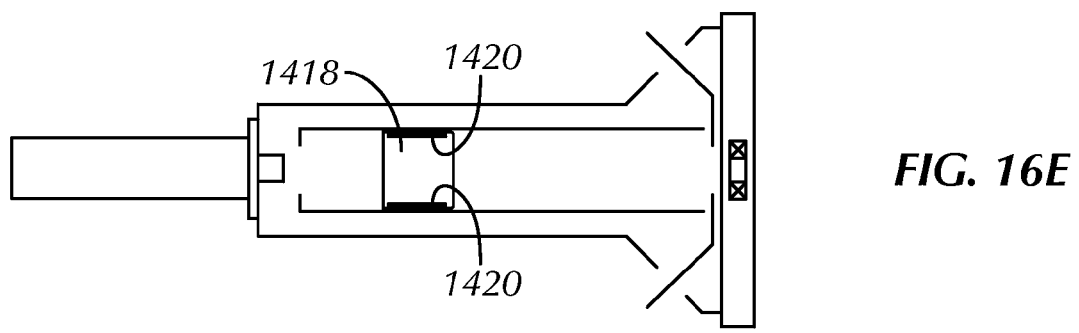

Referring to FIGS. 14-15 and 16C-16D, as the contactor piston 1418 moves away from the electrode contacts 113, 115, the friction forces developed by the friction elements 1420 on the piston bearing on the inner wall of the inner chamber 420 provide at least some control of the movement of the piston in dissipating the kinetic energy of the piston and decelerating the piston. The friction further arrests the piston at a prescribed displacement as determined by the generated launch force, the mass of the piston and the friction forces (again, which may be adjustable by the settings on one or more adjustable friction elements. FIG. 16E shows the piston after having been stopped in the open state such that the electrically conductive path between the first electrode 112 and the second electrode 114 is broken.

Figure 17A:
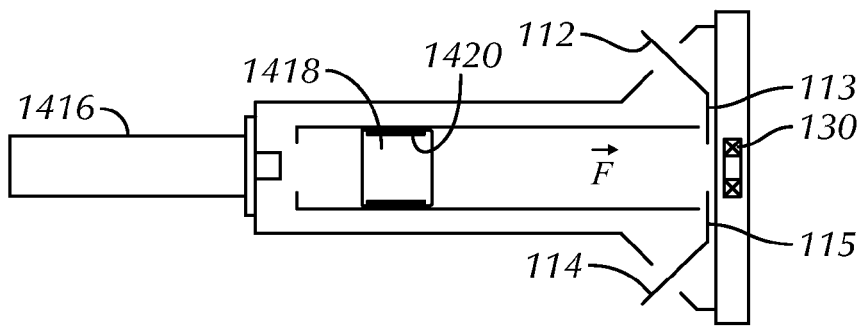
FIGS. 17A-17E show a series of cross-sectional views of a portion of the interrupter assembly shown in FIG. 14 and illustrating a closing sequence, in accordance with some embodiments.
Figure 17B:
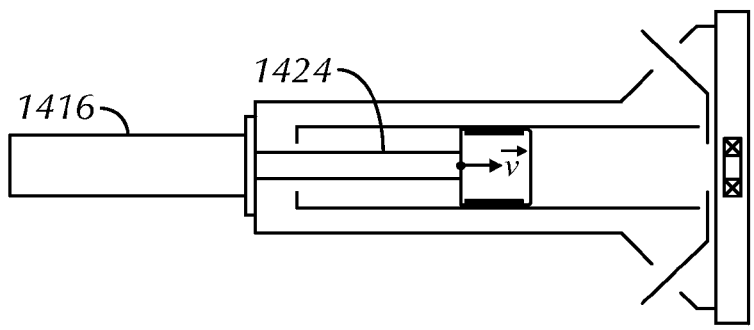
Figure 17C:
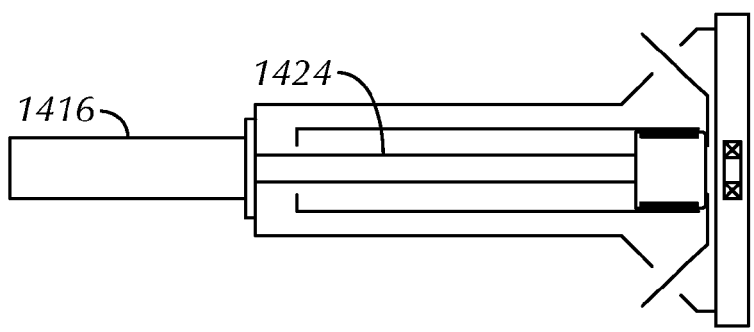

FIGS. 17A-17E show a series of cross-sectional views of a portion of the interrupter assembly 1412 illustrating a closing sequence, in accordance with some embodiments, where the piston 1418 is moved back toward the first position and the electrode contacts 113, 115 to reestablish the electrical path between the first electrode 112 and the second electrode 114. FIG. 17A shows the interrupter assembly 1412 with the piston 1418 latched in the second position through the friction force between the one or more friction elements 1420 and the inner wall of the inner chamber 420 such that the electrical conductor 120 is not electrically coupled with at least one of the first electrode 112 and the second electrode 114.

Referring to FIGS. 14-15 and 17B-C, when the controller 414 determines that the electrical connection can be reestablished (e.g., detects a return below threshold condition and/or receives a signal to close) the controller 414 signals the linear actuator 1416 to extend the actuator rod 1424. The extended actuator rod contacts and pushes the piston 1418 at a controlled speed until the piston is reseated against the electrode contacts 113, 115 with a desired contact pressure, and returning the interrupter assembly 1412 to the closed state.

Figure 17D:
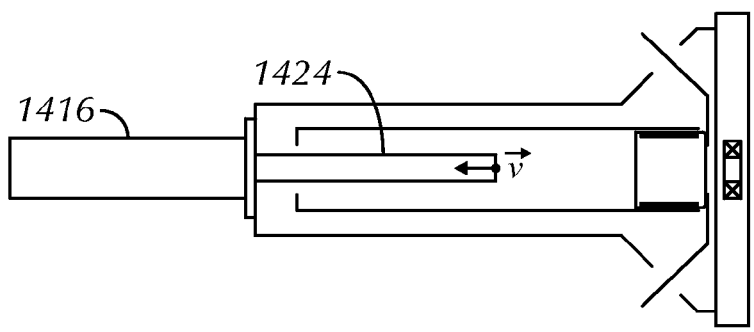
Figure 17E:
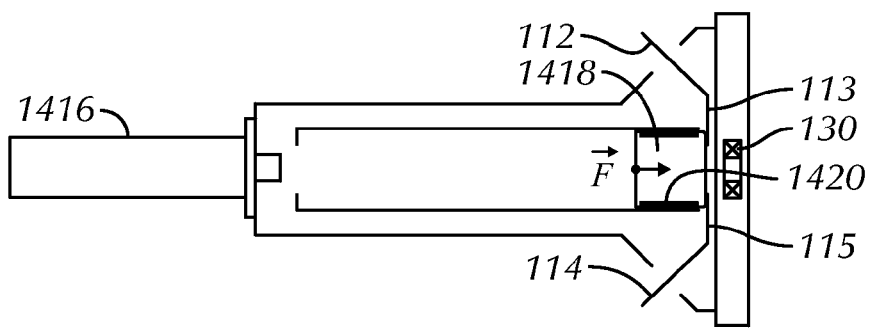

Referring to FIG. 17D, the linear actuator 1416 retracts the actuator rod 1424 vacating the inner chamber 420 providing space to allow the piston 1418 to again be launched away from the first position should conditions dictate (e.g., current and/or voltage in excess of thresholds. FIG. 17D shows the interrupter assembly 1412 in the closed state with the piston 1418 in the first position ready to resume normal operations providing an electrically conductive path between the first and second electrodes 112, 114.

It is noted that some embodiments may utilize one or more friction elements 1420 with a piston 1418 while further employing the gas system 416 to provide further control of the movement of the piston. Additionally, for example, one or more friction elements and/or a piston with integrated friction elements can be utilized with embodiments depicted above, including in embodiments depicted in FIGS. 1A-1B, 4-11, and 13A-13B. Further, interrupter assemblies that utilize piston with friction elements can also be modularly cooperated, including modularly cooperated as depicted in FIGS. 12A-C.

Figure 18:
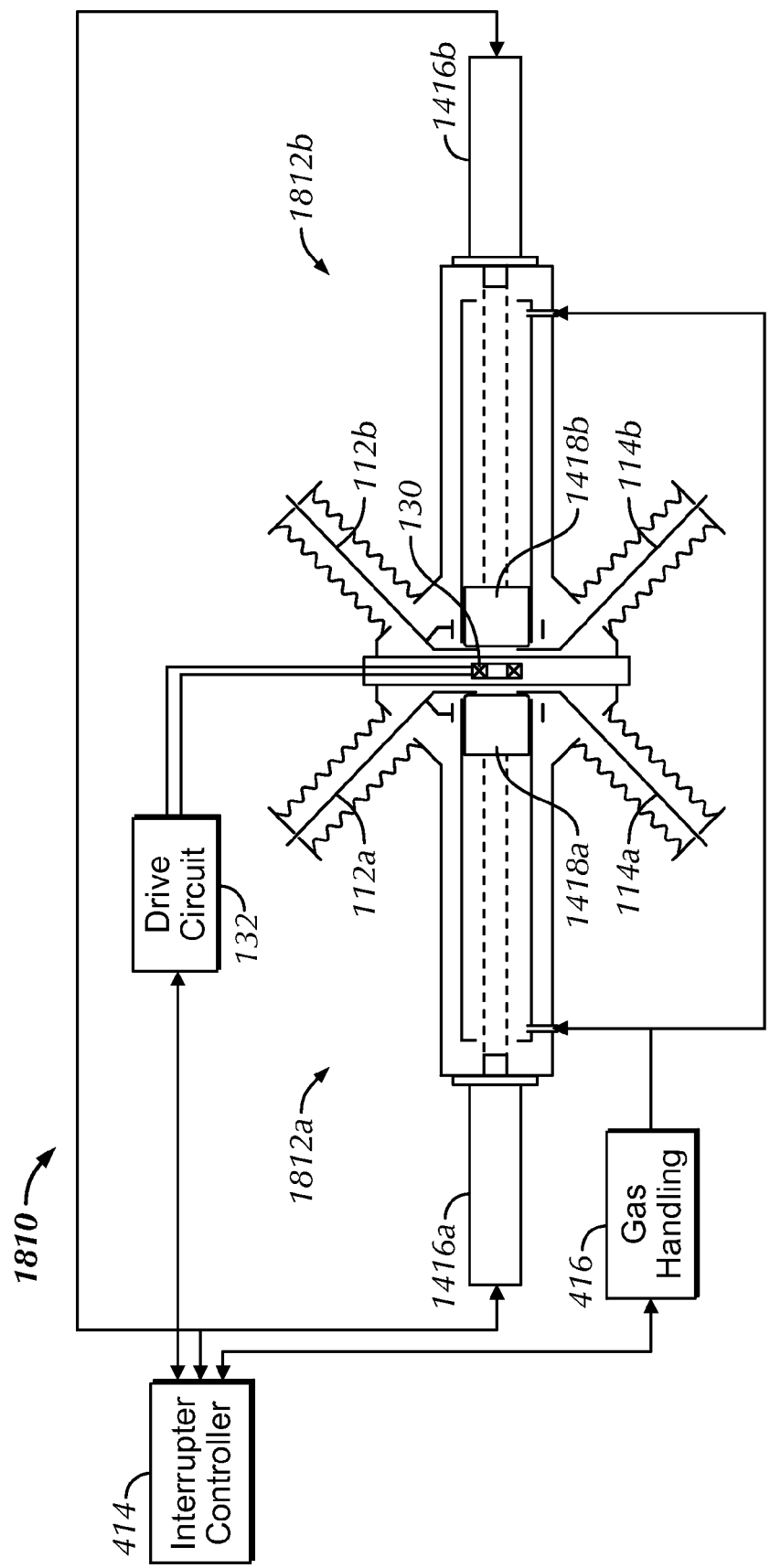
FIG. 18 illustrates a simplified block diagram of an exemplary modular interrupter system that employs friction, in accordance with some embodiments.
Figure 19:
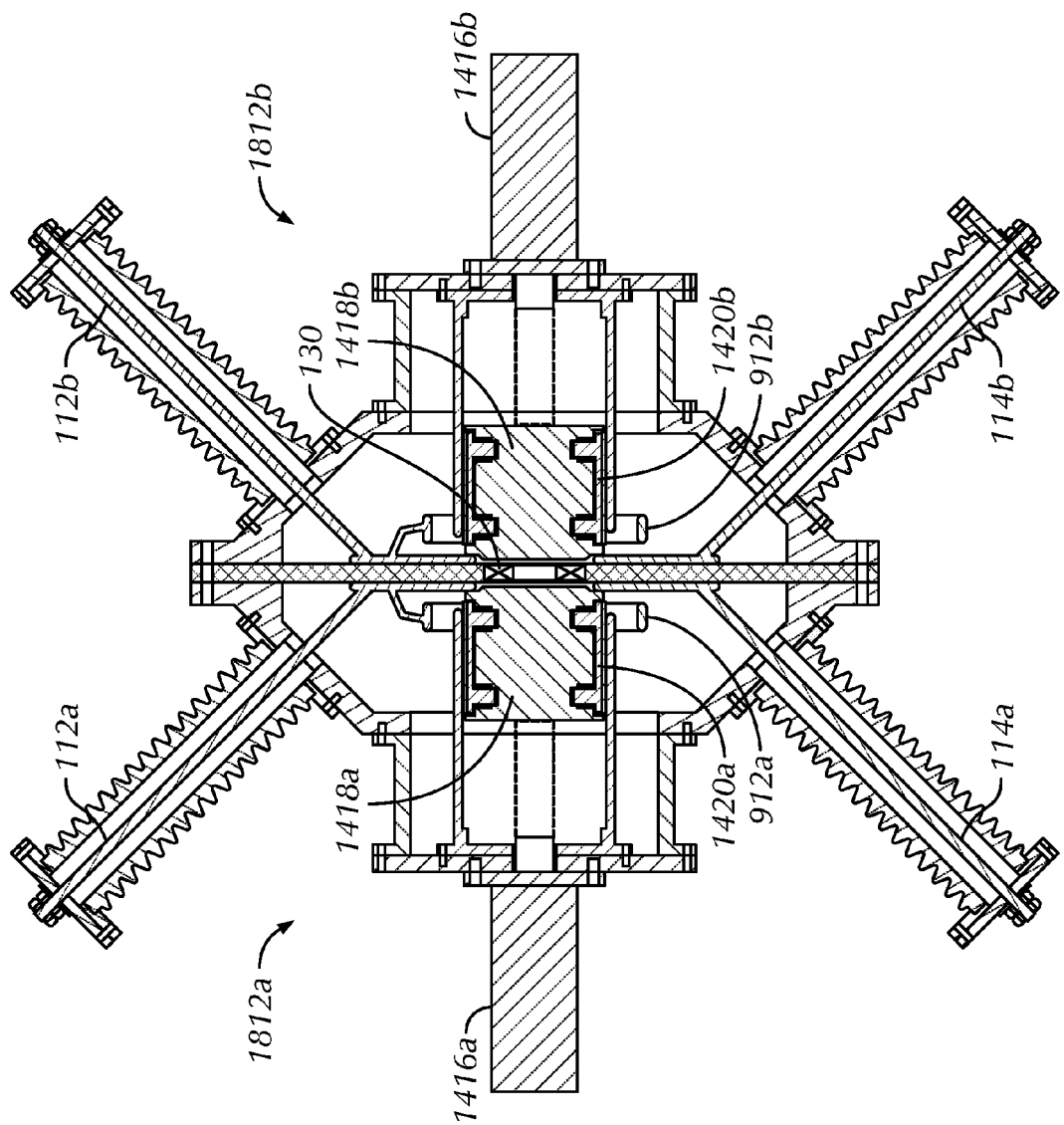
FIG. 19 illustrates a cross-sectional view of exemplary modular interrupter assemblies cooperatively configured, in accordance with some embodiments.

FIG. 18 illustrates a simplified block diagram of an exemplary modular interrupter system 1810 that employs friction with the piston 1418 to at least in part provide some control over the movement of the piston, in accordance with some embodiments. The interrupter system 1810 includes two interrupter assemblies 1812a, 1812b that are cooperated and cooperatively controlled. FIG. 19 illustrates a cross-sectional view of exemplary modular interrupter assemblies 1812a, 1812b cooperatively configured, in accordance with some embodiments, and that can be utilized in the modular interrupter system 1810 of FIG. 18.

Referring to FIGS. 18 and 19, the interrupter system 1810 includes the two interrupter assemblies 1812a, 1812b, a controller 414, a drive control system 132, and piston control system 122 that at least in part utilizes friction generated through one or more friction elements 1420 cooperated with and/or integrated into the piston 1418. In some embodiments, the two interrupter assemblies 1812a, 1812b are configured to be cooperatively controlled and driven by a single drive coil 130 triggered by the drive control system 132, which is typically controlled by the controller 414. Further, in some implementations, the interrupter system 1812 optionally includes one or more single gas systems 416 that cooperate with both of the interrupter assemblies 1012a, 1012b, and can provide, for example, the insulating gas and/or maintain a pressure within the interrupter assemblies.

The interrupter assemblies 1812a, 1812b are each similar to and operate similar to the interrupter assembly 1412 described above with reference to at least FIGS. 14-17E. Accordingly, the interrupter assemblies 1812a, 1812b include pistons 1418 that utilize friction as at least part of the piston control. Again, the piston can include one or more integral friction elements 1420 that contact the inner chamber 420 and/or friction contacts cooperated with or part of the inner chamber 420. Some embodiments further include guard rings 912a, 912b such as described herein. Linear actuators 1416a, 1416b are included to return the pistons 1418a, 1418b to the first position contact the electrode contacts.

In some embodiments, the pistons 1418a, 1418b are arranged symmetrically about the drive coil 130. When the drive control system 132 is triggered, the pistons 1418a, 1418b are both simultaneously launched in opposite directions with control of the movement and arresting of the pistons along the inner chamber is provided at least in part through the friction forces generated by the one or more friction elements 1820. Upon determining that normal operations can resume, the controller 414 activates the linear actuators 1416a, 1416b to reseat both pistons 1418a, 1418b in preparation for subsequent normal operation.

Similar to the interrupter system 1010 depicted in FIG. 10, the interrupter system 1810 and interrupter assemblies 1812a, 1812b provide several benefits. For example, in some embodiments, because the two pistons 1418a, 1418b are arranged symmetrically about the drive coil 130, the internal forces produced at least as a result of launching the pistons and/or returning the pistons to the first positions cancel. As a consequence, the mounting structure of the interrupter system 1810 need only support the weight of the cooperated interrupter assemblies. Further, because there are four electrodes 112*a*, 112*b*, 114*a*, 114*b*, the interrupter assemblies 1812*a*, 1812*b* may be configured as (a) two independent interrupters, (b) one series connected interrupter assembly with about twice the voltage capability, or (c) one parallel connected interrupter assembly with about twice the current carrying capability.

Figure 20:
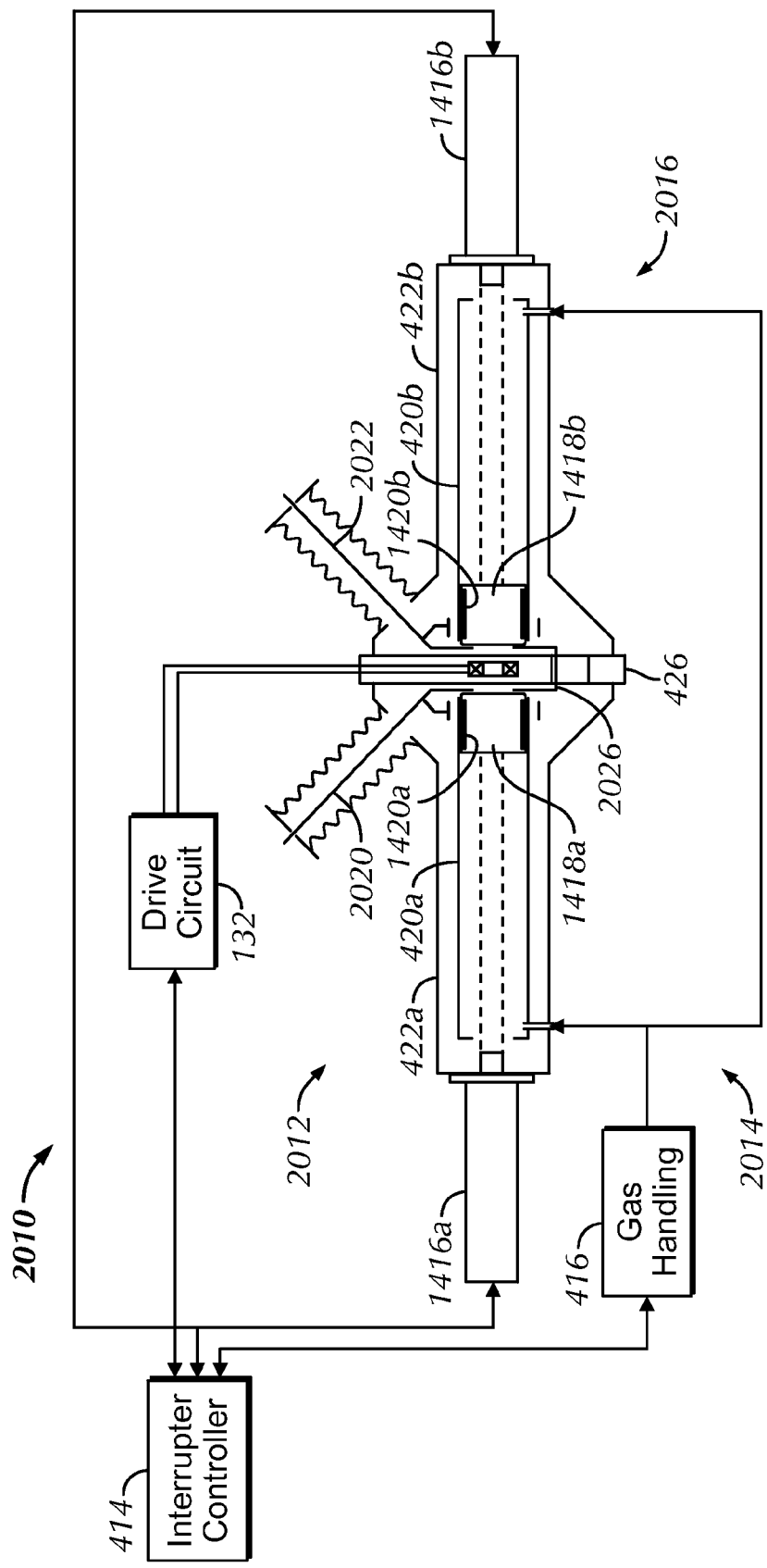
FIG. 20 illustrates a simplified block diagram of an exemplary modular interrupter system, in accordance with some embodiments.
Figure 21:
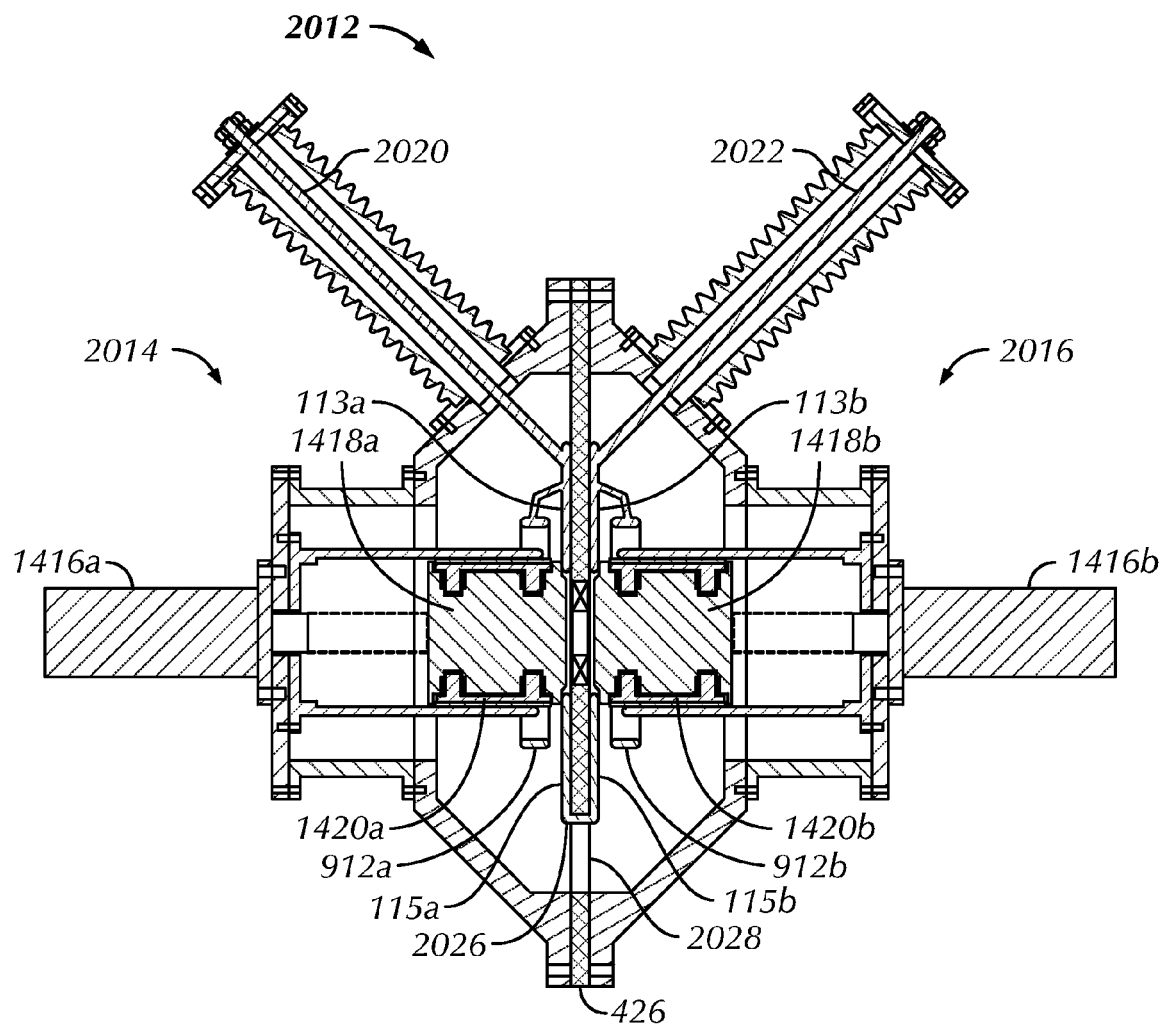
FIG. 21 illustrates a cross-sectional view of the exemplary modular series interrupter assembly of FIG. 20, in accordance with some embodiments.

FIG. 20 illustrates a simplified block diagram of an exemplary modular interrupter system 2010, in accordance with some embodiments, that comprises a first interrupter assembly 2014 coupled in series with a second interrupter assembly 2016 cooperatively providing a modular series interrupter assembly 2012. FIG. 21 illustrates a cross-sectional view of the exemplary modular series interrupter assembly 2012 of FIG. 20, in accordance with some embodiments. Referring to FIGS. 20-21, the interrupter system 2010 further includes a controller 414, a drive control system 132, piston control system 122 that includes the pistons 1418*a*, 1418*b* each with one or more friction elements 1420*a*, 1420*b*, optionally one or more gas systems 416, and the modular series interrupter assembly 2012. Similar to the series coupled embodiment described above, the modular series interrupter assembly 2012 provides a two terminal device with first external electrode 2020 and the second external electrode 2022 and that utilizes the two interrupter assemblies 2014, 2016 configured to operate as a single modular series interrupter assembly with about twice the voltage capability.

In each of the interrupter assemblies 2014, 2016, the second electrodes and corresponding insulators are not included, and instead the second electrode contacts 115*a*, 115*b* are coupled together through an intermediate jump or series coupling 2026. Additionally, in some implementations, the main insulator 426 includes a slot or passage 2028 through which the intermediate coupling 2026 is passed. The passage 2028 can be configured to provide or help with accurate placement and/or of the intermediate series coupling 2026 relative to the electrode contacts 115*a*, 115*b* and/or the electrical conductors 120 of the contact pistons 1418*a*, 1418*b*. The modular series interrupter assembly 2012 provides a two terminal device that provides electrical functionality that is similar to the series connected configuration of FIG. 12B. Further, in some embodiments one or both of the interrupter assemblies 2012*a*, 2010*b* include a guard ring 912*a*, 912*b* that are typically electrically coupled with the external electrodes 2020, 2022 as described herein and provide adequate electric breakdown strength between the electrode contacts 113*a* and 115*a*, and 113*b* and 115*b* when the interrupter assembly 910 is in the open state.

Similar to the interrupter systems described above, in operation, the controller 414 activates the drive control system 132 that pulses the drive coil 130 that in turn induces the magnetic field pulse launching both pistons 1418*a*, 1418*b* away from the electrode contacts 113*a*, 113*b*, 115*a*, 115*b* breaking the electrically conductive path between the first external electrode 2020 and the second external electrode 2022. The friction elements 1420*a*, 1420*b* interact with the friction contacts of the inner chamber 420*a*, 420*b* (e.g., inner walls of the inner chambers) to at least in part control the movement of the pistons decelerating the pistons as they move way from the first positions. The controller 414 is further configured to activate the actuators 1416*a*, 1416*b* to return the pistons 1418*a*, 1418*b* to the first position with the electrical conductor 120 electrically coupled with the electrode contacts 113*a*, 115*a*, 113*b*, 115*b*.

As described above, the piston 118 (or 1418) is configured to cooperate with the inner chamber and to move along at least a portion of the length of the inner chamber. Further, the piston is configured to be returned by the interrupter system to the first position to reestablish the electrically conductive path between the first and second electrodes. Typically, the piston is automatically returned without user interaction and/or without a user having to manually place the piston into the first position and/or replace the piston. Accordingly, in some embodiments, the interrupter assembly and/or piston is self closing and/or automatically controlled to close without a user or technician having to physically interact with the interrupter assembly. Further, interrupter systems are configured to implement the open and close cycles repetitively numerous times without requiring replacement parts and/or user interaction. For example, in some embodiments, the interrupter assemblies are configured to provide ten or more open and close cycles without a failure. Many embodiments are configured for hundreds or thousands of open and close cycles, without requiring a user to manually place the piston in the first position following an opening and/or without the user having to replace the piston. Accordingly, the piston has a shape or shapes and is constructed from materials to withstand the multiple launches and returns to the first position. Further, the piston can be formed as an integral device, formed from discrete parts that are cooperated, formed from a single material, formed from multiple materials, may include one or more coatings, and/or other such configurations. Similarly, the piston can be made from one or more suitable materials that may or may not be electrically conducting while providing sufficient strength to withstand the high acceleration, friction forces, pressure differentials and other such factors.

FIGS. 22A-22G show simplified cross-sectional views of exemplary piston configurations, in accordance with some embodiments. For example, FIG. 22A shows a piston 2212 having a body portion 2214, which in some embodiments is hollow, cooperated with a face portion. The face portion includes the electrical conductor 120. In some embodiments, the face is electrically conductive constructed from and/or having an electrically conductive material extending over at least a portion of the face. In some embodiments, the face comprises an isolated, ring shaped electrical conductor 120 (e.g., a copper or copper coated conductor ring). The body portion 2214 can be constructed of substantially any relevant material that is capable of withstanding the intended forces. For example, the body portion can be formed of aluminum, graphite, plastic, composite, ceramic, or other such materials or combinations of such materials. In some implementations, the body portion is closed at one or both ends. One or more structural supports and the like may additionally be internally and/or externally included, such as but not limited to ridges, creases, ribbing, fins, variations in thickness, enclosed faces, supporting faces, beams, or other such structural supports or combinations of such supports. Further, in some embodiments, the body portion 2214 and/or the electrical conductor 120 may include seal portions 2216 intended to cooperate with the inner wall of the inner chamber to seal the gas(es) within the inner chamber. In other embodiments, the seal portions 2216 are additionally or alternatively configured as friction elements 1420 as described above. Still further, one or more of the seal portions 2216 may additionally or alternatively include a magnet 2218 or other material magnetic material that can be used in maintaining positioning of the piston (e.g., in the first and/or second positions) and/or in controlling the movement and/or deceleration of the piston (e.g., series of magnets and/or magnetic devices spaced along the length of the inner chamber and/or the piston).

As another example, FIG. 22B shows an exemplary piston 2222 with a hollow body portion 2214 with a separate electrical conductor 120 secured with the body portion. Some embodiments may include an insulating connector 2226 between the piston body and the electrical conductor 120, and/or the body portion may be non-conductive. The body portion further is open at the end opposite the electrical conductor 120. Again, the piston 2222 may include seal portions, friction elements, magnetic material and the like.

FIGS. 22C-22G show examples of an integral pistons 2230-2234 where the piston body 2214 and the electrical conductor 120 are formed from a single integral material (e.g., aluminum). Typically, in these integral configurations the material forming the piston is at least partially conductive to provide the electrical path between the electrodes. In other embodiments, the electrical conductor may comprise a coating over some or all of the relevant face.

Further, regarding FIG. 22E, the piston 2232 comprises a hollow channel 2240 extending through the length of the piston. In some embodiments, the hollow channel 2240 may cooperate with a track or rod within the inner chamber 420 or utilized in place of the inner chamber and along which the piston 2232 moves for at least a portion of the length of the rod.

Although the embodiments of the pistons depicted in FIGS. 22A-22G are generally cylindrical, it is noted that shapes other than cylindrical can be used.

Figure 23:
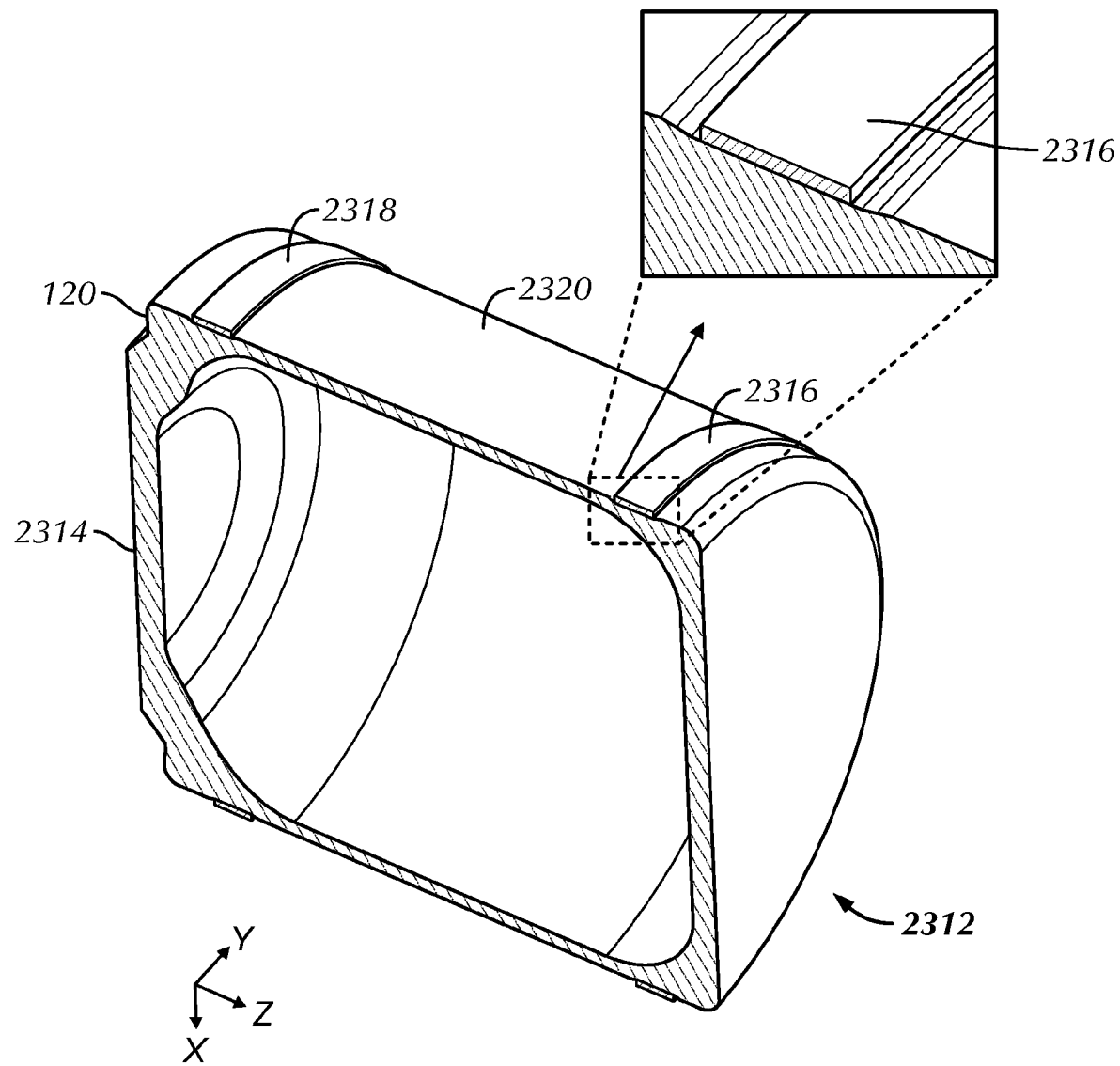
FIG. 23 shows another example of a piston, in accordance with some embodiments.

FIG. 23 shows another example of a piston 2312 in accordance with some embodiments. The piston includes a face 2314 that includes the electrical conductor 120 and/or is electrically conductive such that the face is the electrical conductor. The body 2320 of the piston is hollow. Further, one or more strips 2316, 2318 are formed on and/or secured with the body 2320. The strips 2316, 2318 can be configured to reduce drag of the piston 2312 as it moves through the inner chamber 420. For example, one or more strips of Teflon, aluminum or other material or combinations of such materials may be used. Additionally, in some implementations the strips may act as a seal with the inner chamber wall or reduce the gap between the piston and the inner wall of the inner chamber. In other embodiments, the strips 2316, 2318 can be configured as friction elements 1420 that increase the drag of the piston as it travels along the inner chamber helping to control the piston. Further, the strips and/or piston can be constructed with material to withstand relevant temperature variations, including increases in temperature due to friction.

Figure 24:
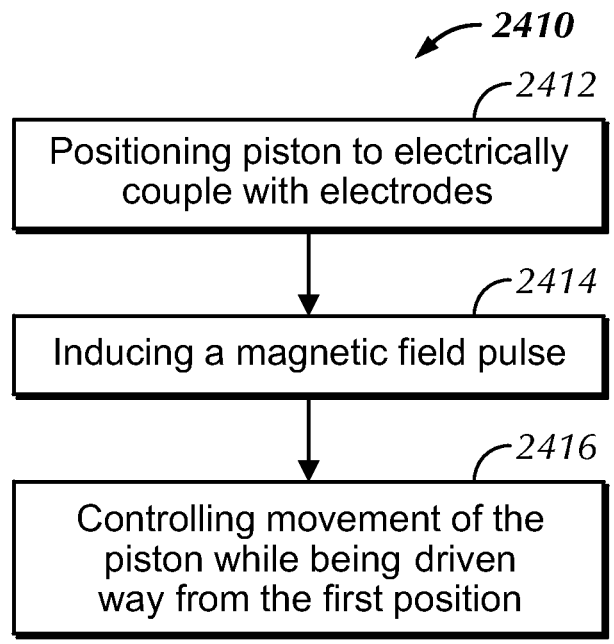
FIG. 24 depicts a simplified flow diagram of an exemplary process of providing protection to one or more electrical circuits, systems and/or networks, in accordance with some embodiments.

FIG. 24 depicts a simplified flow diagram of an exemplary process 2410 of providing protection to one or more electrical circuits, systems and/or networks, in accordance with some embodiments. In step 2412, a piston is positioned at a first position and electrically couple with a first electrode and a second electrode such that the piston establishes an electrically conductive path between the first electrode and the second electrode when in the first position providing a closed state. In step 2414, an impulse force, such as but not limited to a magnetic field pulse, is induced proximate the piston while the piston is in the first position such that the piston is driven away from the first position and the electrical coupling with the first electrode and the second electrode. This establishes an open state such that the piston is no longer in contact with at least one of the electrodes and breaks the electrically conductive path between the first electrode and the second electrode. In step 2416, the movement of the piston is controlled as the piston is being driven away from the first position.

In some embodiments, the movement of the piston is further automatically controller without further user or technician interaction, for example in response to threshold conditions being detected and/or exceeded. Additionally, the movement of the piston is further automatically controller, in some embodiments, such that the piston is returned to the first position and again electrically coupled with both the first and second electrodes without further user interaction and/or without a user or technician having to manually reset, reposition or replace the piston. Accordingly, some embodiments further control the piston and drive the piston to return the piston to the first position such that the piston is electrically coupling with the first electrode and the second electrode and reestablishes the electrically conductive path between the first electrode and the second electrode. For example, in some implementations, one or more gases are forced into a chamber in which the piston travels increasing a pressure on the piston and driving the piston along at least a portion of a length of the chamber to return the piston to the first position and reestablish the electrically conductive path between the first electrode and the second electrode. Other embodiments alternatively or additionally drive the piston to return the piston to the first position by activating an actuator that contacts and mechanically drives the piston back to the first position.

The control of the piston can further include controlling the movement of the piston as the piston is being driven away from the first position by allowing a pressure, within a chamber in which the piston travels while being driven away from the first position, to increase as the piston travels along the chamber, and releasing pressure within the chamber as the pressure exceeds a threshold pressure. The releasing of the pressure can be achieved, in some embodiments, by the increased pressure exceeding a biasing threshold on a valve that releases a portion of gas(es) within the chamber. In implementations, the release of the gas continues over time as the piston continues to move away from the first position, with the pressure acting as a breaking mechanism decelerating the piston and/or arresting the piston. Other embodiments additionally or alternatively induce a friction force between the piston and the chamber as the piston is driven away from the first position.

Figure 25:
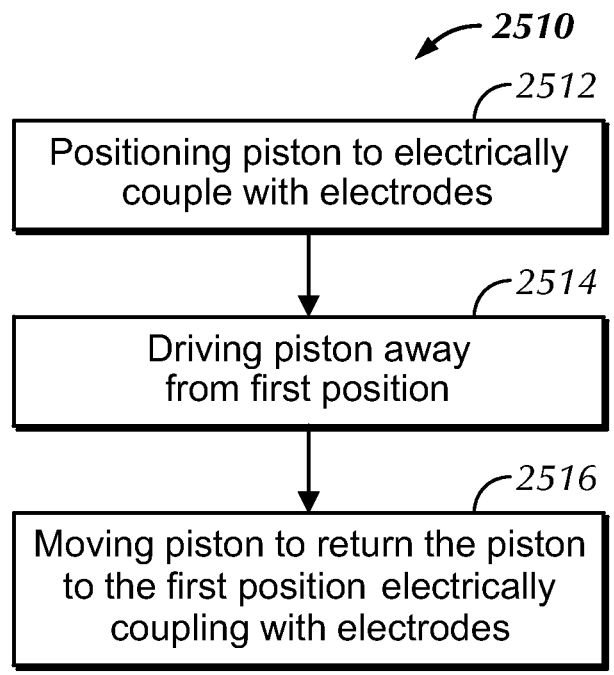
FIG. 25 depicts a simplified flow diagram of an exemplary process of providing protection to one or more electrical circuits, systems and/or networks, in accordance with some embodiments.

FIG. 25 depicts a simplified flow diagram of an exemplary process 2510 of providing protection to one or more electrical circuits, systems and/or networks, in accordance with some embodiments. In step 2512, a piston having a conductor is positioned in a first position such that the conductor of the piston is in contact with electrical contacts that are electrically coupled with a first electrode and a second electrode with the electrical conductor providing a conductive path between the first electrode and the second electrode. In step 2514, the piston is driven away from the electrical contacts breaking the conductive path between the first electrode and the second electrode and establishing an open state. In step 2516, a closing control is activated to drive the piston to return the piston to the first position when a threshold condition is satisfied such that the conductor of the piston contacts the electrical contacts and reestablishes the conductive path between the first electrode and the second electrode and the closed state.

Some embodiments further control a deceleration of the piston as it is driven away from the electrical contacts. Additionally or alternatively, the movement of the piston is arrested, prior to driving the piston to return to the first position, at a second position separate from the first position such that the piston is not electrically coupled with at least one of the first electrode and the second electrode when in the second position while maintaining the piston in position to be returned to the first position. The movement of the piston back to the first position can further be inhibited until the threshold condition is satisfied.

Figure 26:
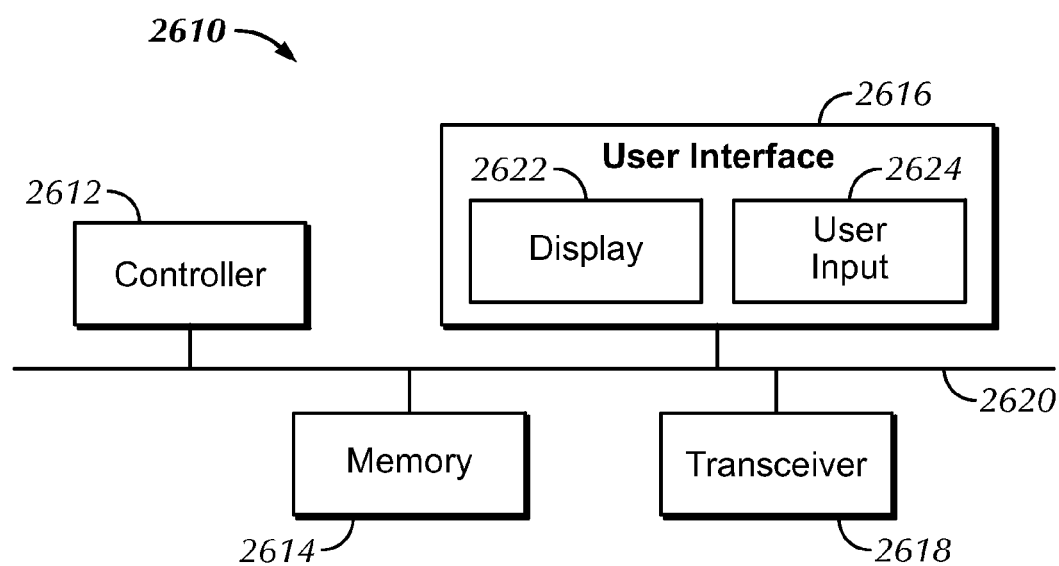
FIG. 26 illustrates a system for use in implementing methods, techniques, devices, apparatuses, systems, servers, sources and the like in providing user interactive virtual environments in accordance with some embodiments.

The methods, techniques, controllers, control systems, drive circuitry and the like described herein may be fully or partially utilized, implemented and/or run on many different types of devices, systems and/or combinations of devices. Referring to FIG. 26, there is illustrated a system 2600 that may be used for any such implementations, in accordance with some embodiments. One or more components of the system 2600 may be used for implementing some or all of one or more of the systems, controllers or other such devices mentioned above or below, or parts of such systems, controllers or devices, such as for example any of the above or below mentioned controller 214, 414, drive control system 132, gas system 416 and the like. However, the use of the system 2600 or any portion thereof is certainly not required.

By way of example, the system 2600 may comprise a controller or processor module 2612, memory 2614, a user interface 2616, and one or more communication links, paths, buses or the like 2620. A power source or supply (not shown) is included or coupled with the system 2600. The controller 2612 can be implemented through one or more processors, microprocessors, central processing unit, logic, local digital storage, firmware and/or other control hardware and/or software, and may be used to execute or assist in executing the steps of the methods and techniques described herein, and control various communications, programs, parameters, thresholds, services, etc. The user interface 2616 can allow a user to interact with the system 2600 and receive information through the system. In some instances, the user interface 2616 includes a display 2622 and/or one or more user inputs 2624, such as a remote control, keyboard, mouse, track ball, buttons, touch screen, etc., which can be part of or wired or wirelessly coupled with the system 2600.

Typically, the system 2600 further includes one or more communication interfaces, ports, transceivers 2618 and the like allowing the system 2600 to communication over one or more local networks, distributed networks, the Internet, communication links 2620, other networks or communication channels with other components of an interrupter system, other devices and/or other such communications. Further the transceiver 2618 can be configured for wired, wireless, optical, fiber optical cable or other such communication configurations or combinations of such communications.

The system 2600 comprises an example of a control and/or processor-based system with the controller 2612. Again, the controller 2612 can be implemented through one or more processors, controllers, central processing units, logic, software and the like. Further, in some implementations the controller 2612 may provide multiprocessor functionality. Still further, the controller 2612 can perform one or more of the steps of the processes 310, 2410 and/or 2510.

The memory 2614, which can be accessed by at least the controller 2612, typically includes one or more processor readable and/or computer readable media accessed by at least the controller 2612, and can include volatile and/or nonvolatile media, such as RAM, ROM, EEPROM, flash memory and/or other memory technology. Further, the memory 2614 is shown as internal to the system 2610; however, the memory 2614 can be internal, external or a combination of internal and external memory. The external memory can be substantially any relevant memory such as, but not limited to, one or more of flash memory secure digital (SD) card, universal serial bus (USB) stick or drive, other memory cards, hard drive and other such memory or combinations of such memory. The memory 2614 can store code, software, executables, scripts, data, thresholds, parameters, programs, log or history data, user information and the like.

One or more of the embodiments, methods, processes, approaches, and/or techniques described above or below or portions thereof may be implemented in one or more computer programs executable by one or more processor-based systems. By way of example, such a processor based system may comprise the processor based system 2600, a specifically configured control system, one or more computer, etc. Such a computer program may be used for executing various steps and/or features of the above or below described methods, processes and/or techniques. That is, the computer program may be adapted to cause or configure a computer or processor-based system to execute and achieve the functions described above or below. For example, such computer programs may be used for implementing any embodiment of the above or below described steps, processes or techniques for controlling the interruption of a system, circuit, network or the like. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the relevant embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: positioning a piston comprising a conductor in a first position such that a conductor of the piston is in contact with electrical contacts providing a conductive path between a first electrode and a second electrode; detecting a condition in excess of a threshold; driving the piston away from the electrical contacts breaking the conductive path between the first electrode and the second electrode and establishing an open state; controlling a deceleration of the piston as it is driven away from the electrical contacts; and arresting movement of the piston at a second position separate from the first position such that the piston is not electrically coupled with at least one of the first electrode and the second electrode when in the second position while maintaining the piston in a position to be returned to the first position.

Other embodiments provide one or more computer-readable storage mediums storing one or more computer programs configured for use with a computer simulation, the one or more computer programs configured to cause a computer and/or processor based system to execute steps comprising: positioning a piston in a first position electrically coupled with a first electrode and a second electrode with the piston establishing an electrically conductive path between the first electrode and the second electrode when in the first position providing a closed state; inducing a magnetic field pulse proximate the piston while in the first position driving the piston away from the first position and the electrical coupling with the first electrode and the second electrode establishing an open state such that the piston is no longer in contact with at least one of the first electrode and the second electrode and breaking the electrically conductive path between the first electrode and the second electrode; and controlling movement of the piston as the piston is being driven away from the first position.

Other embodiments provide one or more computer-readable storage mediums storing one or more computer programs configured for use with a computer simulation, the one or more computer programs configured to cause a computer and/or processor based system to execute steps comprising: positioning a piston comprising a conductor in a first position such that the conductor of the piston is in contact with electrical contacts that are electrically coupled with first and second electrodes and providing a conductive path between the first electrode and a second electrode; driving the piston away from the electrical contacts breaking the conductive path between the first electrode and the second electrode and establishing an open state; and activating closing control to drive the piston to return the piston to the first position when a threshold condition is satisfied such that the conductor of the piston contacts the electrical contacts and reestablishing the conductive path between the first electrode and the second electrode and the closed state.

Many of the functional units described in this specification have been labeled as systems, circuits or modules, in order to more particularly emphasize their implementation independence. For example, a system may be implemented as a hardware circuit comprising custom VLSI circuits or gate arrays, off-the-shelf semiconductors such as logic chips, transistors, or other discrete components. A system may also be implemented in programmable hardware devices such as field programmable gate arrays, programmable array logic, programmable logic devices or the like.

Systems may also be implemented in software for execution by various types of processors. An identified system of executable code may, for instance, comprise one or more physical or logical blocks of computer instructions that may, for instance, be organized as an object, procedure, or function. Nevertheless, the executables of an identified system need not be physically located together, but may comprise disparate instructions stored in different locations which, when joined logically together, comprise the system and achieve the stated purpose for the system.

Indeed, a system of executable code could be a single instruction, or many instructions, and may even be distributed over several different code segments, among different programs, and across several memory devices. Similarly, operational data may be identified and illustrated herein within system, and may be embodied in any suitable form and organized within any suitable type of data structure. The operational data may be collected as a single data set, or may be distributed over different locations including over different storage devices, and may exist, at least partially, merely as electronic signals on a system or network.

Some embodiments provide systems, assemblies and/or devices that configured to provide fast switching between one state that provides low loss electrical conduction and a second state that provides high voltage galvanic isolation from several to many hundreds of kilovolts, often referred to as an interrupter systems and/or assemblies (or generally as interrupters). Further, the interrupter systems provide an electrical conduction path between its terminals when in a closed state, and upon command and/or detection of a predefined condition, break the electrical conduction path in a manner so that the conduction path is not re-established until commanded (sometimes referred to as latching) and maintains a sufficiently high voltage breakdown strength while in the open state and the conduction path is open. Further, some embodiments automatically re-establish the conduction path in a controlled manner, typically in response to a command and/or in response to detecting conditions and/or thresholds. Further, the conduction path is provided with low electrical conduction losses when in the closed state. Many embodiments achieve relatively fast opening times of the conduction path and can maintain the open condition for extended periods of time when needed while providing high electrical breakdown strength. Additionally, the automated closing can be achieved in response to a command and/or detected changes in conditions, and can be implemented without a user or technician having to manually reposition or replace the piston. The systems and/or assemblies are configured to operate over large number of close-open-close cycles with automated operation.

As described above, the protection systems, devices and/or assemblies can be utilized with AC or DC circuits or networks. Such protective devices can be particularly critical in some direct-current (DC) systems, for example, with DC distribution systems distributing DC power to one or more sub-distribution systems and/or loads. Alternating-current (AC) systems (e.g., AC distribution systems) often include circuit breakers, which typically work quite well because the AC signal cycles through zero every half cycle. When an AC signal path is opened (e.g., opening an interrupter or circuit breaker) that is actively carrying voltage and current, an electric arc (or spark) can often result between electrodes of the interrupter. Because of the cycling of the AC signal passing through zero, however, the electric arc is inherently and automatically quenched and/or suppressed by itself, and the system typically does not need to include further protections to address such arching.

DC systems, however, do not have such "zero crossings," and thus, there is typically not an inherent arc suppression. Accordingly, some embodiments are configured to rapidly response while further attempting to limit and/or suppress arcing. Further, some embodiments provide low insertion loss for normal modes of operation with fast interruption to limit peak fault currents. Further, the fast interruption is achieved while limiting and/or avoiding arcing without complex assemblies and/or additional features to limit arching.

Some embodiments provide systems and methods of protecting systems and/or networks utilizing a piston with at least one electrical conductor or electrically conducting face such that the conductor or conducting face serves as both a conduction path of electric current through the interrupter when closed and as an armature of a Thompson type electromagnetic launcher. Some embodiments include inner and outer chambers (e.g., with cylindrical configuration) interconnected with one or more passive or active variable orifice valves to first arrest, then latch the piston in an open position. In some embodiments, an insulating gas is used and apparatuses or assemblies are configured to ensure that the insulating gas in and around the electrodes or electrode contacts is replenished by recirculation when the piston moves.

In some embodiments, electrodes and/or electrode contacts are configured with relatively flat, sector shaped contact areas and configured with insulators such that the electrodes are electrically isolated from the other elements of the interrupter or breaker. Further, some embodiments include electrodes with one or more guard rings that are electrically proximate to and encircle the points of contact between the electrical conductor and the electrode contacts and/or the inner chamber, which in some instances at least balances capacitive coupling between the electrodes. The control of gas pressure is used in at least some embodiments to restore the piston to its closed position thereby reestablishing a conduction path through the interrupter or breaker. Further, the control of the gas pressure is used in some embodiments to realize an appropriate contact pressure between the piston and the electrodes sufficient to realize a sufficiently low electrical resistance.

Some embodiments use a piston that employs friction to at least partially control the piston movement. For example, some pistons include one or more integral, and in some instances adjustable, friction elements that bear on the inner chamber or other friction contact, and produce a friction force that serves to dissipate the kinetic energy of the piston when moving, latch the piston, realize an appropriate contact pressure between the piston and the electrodes sufficient to realize a sufficiently low electrical resistance and other such benefits or combinations of such benefits. Further, some embodiments use an inner and outer chamber or cylinder interconnected with an open orifice to ensure that the insulating gas in and around the electrodes is replenished by recirculation when the piston moves. A linear actuator is used in some embodiments to push the piston back to its closed position. Additionally, some embodiments use electrodes with flat, sector shaped contact areas and are configured with insulators such that the electrodes are electrically isolated from the other elements of the breaker. Further, some embodiments use electrodes with guard rings that are electrically proximate to and encircle at least a conductive portion of the piston and/or a conductive portion of the inner cylinder to balance the capacitive coupling between the various the electrodes.

Still further, some embodiments provide interrupter systems and/or interrupter assemblies that can be used with both AC and DC systems. Further, these systems and/or assemblies can provide protection at relatively high voltages and/or currents. For example, in some implementations, the interrupter systems and/or interrupter assembly can provide protection at voltages that are greater than 150 kV, and in some instances over 180 kV, and/or at currents of 3.5 kA or more. Further, the interrupter assemblies can be configured to transition from a closed state to an open state in less than 250μ, and in some instances less than 50 μs. For example, some embodiments are configured to drive the piston at 2.5 mm in 150 μs in transitioning to the open state.

Some embodiments provide interrupter systems that comprise a first electrode, a second electrode, a chamber, a piston and a guard ring. The piston is positioned within the chamber, wherein the piston comprises an electrical conductor configured to electrically couple with both the first electrode and the second electrode and to establish an electrical path between the first electrode and a second electrode when the piston is in a first position establishing a closed state, and wherein the piston is configured to move along at least a portion of the chamber such that the piston is no longer electrically coupled with at least one of the first electrode and the second electrode such that there is no longer an electrical path between the first electrode and the second electrode. The guard ring electrically couples with the first electrode, wherein the guard ring comprises a conductive body formed in substantially a ring shape and is positioned to be electrically proximate to and extend circumferentially about at least a portion of the electrical conductor of the piston when the piston is in the first position.

Further, in some of these embodiments, the guard ring is configured to balance capacitive coupling between a first electrode contact of the first electrode and a second electrode contact of the second electrode, wherein the first electrode contact and the second electrode contact are positioned to be in contact with and electrically coupled with the electrical conductor of the piston when the piston is in the first position. The guard ring is typically separated from the first electrode contact by a first distance while still being electrically coupled with the first electrode. In some implementations, the electrical conductor is further configured to induce movement of the piston along at least a portion of the length of the chamber in response to an magnetic field pulse causing the piston to move away from the first position such that the electrical conductor is no longer electrically coupled with at least one of the first electrode and the second electrode causing a transition from the closed state to an open state wherein there is no longer an electrically conductive path between the first electrode and the second electrode.

Some embodiments further comprise a gas within the chamber, and a valve cooperated with the chamber, wherein the valve is biased closed and configured to open in response increased pressure on the gas caused by movement of the piston away from the first position and to at least dissipate kinetic energy of the piston as it moves away from the first position. Additionally or alternatively, in some embodiments the piston further comprises an integral friction element that is configured to contact a portion of the chamber during at least a portion of the movement of the piston induced in response to an impulse force and to stop the movement of the piston away from the first position and latch the piston away from the first position such that there is no longer an electrically conductive path between the first electrode and the second electrode.

Other embodiments provide methods of interrupting an electrical current flowing through a system by positioning a piston in a first position electrically coupled with a first electrode and a second electrode with the piston establishing an electrically conductive path between the first electrode and the second electrode when in the first position providing a closed state; inducing a magnetic field pulse proximate the piston while in the first position driving the piston away from the first position and the electrical coupling with the first electrode and the second electrode establishing an open state such that the piston is no longer in contact with at least one of the first electrode and the second electrode and breaking the electrically conductive path between the first electrode and the second electrode; and controlling movement of the piston as the piston is being driven away from the first position. Some embodiments further control the piston and drive the piston to return the piston to the first position electrically coupling with the first electrode and the second electrode and reestablishing the electrically conductive path between the first electrode and the second electrode.

Some embodiments control the piston and drive the piston to return the piston to the first position comprising forcing a gas into a chamber in which the piston travels increasing a pressure on the piston driving the piston along at least a portion of a length of the chamber to return the piston to the first position and the reestablishing of the electrically conductive path between the first electrode and the second electrode. Additionally or alternatively, some embodiments control the piston and drive the piston to return the piston to the first position comprising activating an actuator to contact and mechanically drive the piston back to the first position. Further, some embodiments, provide methods that control the movement of the piston as the piston is being driven away from the first position comprising allowing a pressure, within a chamber in which the piston travels while being driven away from the first position, to increase as the piston travels along the chamber; and releasing pressure within the chamber as the pressure exceeds a threshold pressure caused by the movement of the piston along at least a portion of a length of the chamber as the piston is driven from the first position and along at least the portion of the length of the chamber.

Some embodiments additionally or alternatively redirect gas released in response to the releasing of the pressure within the chamber causing an increase in pressure against the piston between the piston and the electrical contacts; and inhibit the piston from returning to the first position as a result of the increased pressure between the piston and the first electrical contact and the second electrical contact. In some instances, the controlling movement of the piston as the piston is being driven away from the first position comprises inducing a friction force between the piston and a chamber in which the piston travels while being driven away from the first position.

Some embodiments provide methods of interrupting electrical current flowing through one or more transmission lines. The method comprise: positioning a piston comprising a conductor in a first position such that the conductor of the piston is in contact with electrical contacts that are electrically coupled with first and second electrodes and providing a conductive path between the first electrode and a second electrode; driving the piston away from the electrical contacts breaking the conductive path between the first electrode and the second electrode and establishing an open state; and activating closing control to drive the piston to return the piston to the first position when a threshold condition is satisfied such that the conductor of the piston contacts the electrical contacts and reestablishing the conductive path between the first electrode and the second electrode and the closed state. In some embodiments, the method further comprises: controlling a deceleration of the piston as it is driven away from the electrical contacts. Additionally or alternatively, some embodiments further comprise: arresting movement of the piston, prior to driving the piston to return to the first position, at a second position separate from the first position such that the piston is not electrically coupled with at least one of the first electrode and the second electrode when in the second position while maintaining the piston in position to be returned to the first position; and inhibiting movement of the piston back to the first position until the threshold condition is satisfied.

Some embodiments provide interrupter systems that comprise: a first electrode; a second electrode; a piston movably located at a first position and electrically coupled with both the first electrode and the second electrode establishing a closed state, wherein the piston comprises an electrical conductor that electrically couples with the first electrode and the second electrode providing an electrically conductive path between the first electrode and the second electrode when in the closed state; an impulse force launcher configured to, when activated, induce a force on the piston causing the piston to move away from the electrical coupling with the first electrode and the second electrode such that the electrical conductor is no longer in contact with at least one of the first electrode and the second electrode and establishing an open circuit between the first electrode and the second electrode defining an open state; and a piston control system comprising a piston arresting system cooperated with the piston and configured to control a deceleration of the piston following the movement of the piston induced by the impulse force launcher such that the piston is not in electrical contact with at least one of the first electrode and the second electrode when in the open state. The impulse force launcher can be implemented through numerous devices, methods and/or systems. For example, and without limitation, the impulse force launcher can be configured to induce a magnetic field pulse, a pyrotechnic or other explosive force, a release and/or expansion of gas, and/or other such mechanisms or methods.

While the invention herein disclosed has been described by means of specific embodiments, examples and applications thereof, numerous modifications and variations could be made thereto by those skilled in the art without departing from the scope of the invention set forth in the claims.

What is claimed is:

1. An interrupter system, comprising:
   a first electrode;
   a second electrode;
   a piston movably located at a first position and electrically coupled with both the first electrode and the second electrode establishing a closed state, wherein the piston comprises an electrical conductor that electrically couples with the first electrode and the second electrode providing an electrically conductive path between the first electrode and the second electrode when in the closed state;
   an electromagnetic launcher configured to, when activated, induce a magnetic field pulse causing the piston to move away from the electrical coupling with the first electrode and the second electrode such that the electrical conductor is no longer electrically coupled with at least one of the first electrode and the second electrode and establishing an open circuit between the first electrode and the second electrode defining an open state; and
   a piston control system comprising a piston arresting system cooperated with the piston and configured to control a deceleration of the piston following the movement of the piston induced by the electromagnetic launcher such that the piston is not electrically coupled with at least one of the first electrode and the second electrode when in the open state.

2. The interrupter system of claim 1, wherein the piston control system further comprises:
   a closing system cooperated with the piston wherein the closing system is configured to return the piston to the first position to again be electrically coupled with both the first electrode and the second electrode.

3. The interrupter system of claim 2, wherein the piston arresting system is further configured to stop the movement of the piston at a second location following the movement of the piston induced by the electromagnetic launcher to cause the transition to the open state, and to latch the piston in the second position until induced to return to the first position by the closing system.

4. The interrupter system of claim 3, further comprising:
   a chamber; and
   an insulating gas;
   wherein the arresting system is configured to use the chamber and the insulating gas, wherein the piston is movably positioned within the chamber such that the piston moves along the chamber from the first position toward the second position when induced by the electromagnetic launcher; and
   wherein the insulating gas is configured to induce a pressure on the piston reducing a velocity of the piston resulting from the movement of the piston induced by the magnetic field pulse.

5. The interrupter system of claim 3, wherein the arresting system further comprises an integral friction element cooperated with the piston, and a friction contact that is separate from the piston and the integral friction element, wherein the integral friction element is configured to contact the friction contact during at least a portion of the movement of the piston induced by the electromagnet launcher and to stop the movement of the piston away from the first position.

6. The interrupter system of claim 2, wherein the piston control system comprises a latching system configured to latch the piston in the second position until the piston is induced to return to the first position by the closing system.

7. The interrupter system of claim 2, wherein the closing system comprises a gas pump cooperated with a chamber, wherein the piston is positioned within the chamber and the gas pump is configured to pump a gas into a portion of the chamber to induce movement of the piston to return the piston to the first position.

8. The interrupter system of claim 2, wherein the closing system comprises a linear actuator that when activated is configured to mechanically drive the piston to back to the first position.

9. The interrupter system of claim 1, further comprising:
a first chamber;
a second chamber; and
an insulating gas;
wherein the first chamber is cooperated with the second chamber such that the insulating gas flows between the first chamber and the second chamber as the piston moves between the first position and a second position, wherein the piston is not electrically coupled with at least one of the first electrode and the second electrode when in the second position and in the open state.

10. The interrupter system of claim 9, wherein the piston arresting system comprises a gas valve cooperated with the first chamber, wherein the gas valve is biased in a closed state sealing at least a portion of the insulating gas between the gas valve and the piston when the piston is in the first position, and wherein the gas valve is configured to open in response to an increase in pressure caused by the movement of the piston away from the first position as induced by the electromagnetic launcher such that at least some of the insulating gas passed from the first chamber to the second chamber.

11. The interrupter system of claim 9, wherein the piston control system further comprises:
a closing system cooperated with the piston, wherein the closing system comprises a gas pump cooperated with the first chamber and the second chamber, wherein the gas pump is configured to pump at least some of the insulating gas from the second chamber into the first chamber decreasing a pressure within the second chamber and increasing a pressure in the first chamber causing the piston to move from the second position to the first position.

12. The interrupter system of claim 1, further comprising:
a guard ring electrically coupled with the first electrode, wherein the guard ring comprises a conductive body formed in substantially a ring shape and is positioned to be electrically proximate to and extend circumferentially about at least a portion of the electrical conductor of the piston when the piston is in the first position.

13. The interrupter system of claim 1, further comprising:
a mechanical interrupter comprising the piston, the first chamber, the first electrode and the second electrode; and
an auxiliary circuit coupled in parallel with the mechanical interrupter.

14. The interrupter system of claim 1, further comprising:
a controller configured to control the electromagnetic launcher to induce the magnetic field pulse to induce the movement of the piston.

15. An interrupter system, comprising:
a first electrode;
a second electrode;
a piston movably located at a first position and electrically coupled with both the first electrode and the second electrode establishing a closed state, wherein the piston comprises an electrical conductor that electrically couples with the first electrode and the second electrode providing an electrically conductive path between the first electrode and the second electrode when in the closed state;
an impulse force launcher configured to, when activated, induce a force on the piston causing the piston to move away from the electrical coupling with the first electrode and the second electrode such that the electrical conductor is no longer electrically coupled with at least one of the first electrode and the second electrode and establishing an open circuit between the first electrode and the second electrode defining an open state; and
a piston control system comprising a piston arresting system cooperated with the piston and configured to control a deceleration of the piston following the movement of the piston induced by the impulse force launcher such that the piston is not electrically coupled with at least one of the first electrode and the second electrode when in the open state.

16. An interrupter system, comprising:
a first electrode;
a second electrode;
a first chamber; and
a piston movably positioned within the first chamber and configured to move along at least a portion of a length the first chamber;
wherein the piston comprises an electrical conductor configured to establish an electrically conductive path between the first electrode and the second electrode when the piston is in a first position providing a closed state, and the electrical conductor is further configured to induce movement of the piston along at least a portion of the length of the first chamber in response to an electromagnetic pulse causing the piston to move away from the first position such that the electrical conductor is no longer electrically coupled with at least one of the first electrode and the second electrode causing a transition from the closed state to an open state wherein there is no longer an electrically conductive path between the first electrode and the second electrode.

17. The interrupter system of claim 16, wherein the electrical conductor comprises an electrically conductive face at a first end of the piston, wherein the electrically conductive face comprises an electrically conductive material extending over at least a portion of a face of the piston and is electrically coupled with the first electrode and the second electrode when the piston is in the first position providing the closed state.

18. The interrupter system of claim 16, further comprising:
a gas within the first chamber, wherein the gas is configured to apply a pressure to the piston when the piston is in the first position to maintain the piston in the first position and electrically coupled with the first and second electrodes.

19. The interrupter system of claim 18, wherein the gas is further configured to be displaced by the movement of the piston in response to the electromagnetic pulse, and wherein the displaced gas is further configured to apply a pressure on the piston to maintain the piston away from the first position.

20. The interrupter of claim 19, further comprising:
a pump cooperated with the first chamber, wherein the pump is configured to pump the gas relative to the piston to induce a change in pressure about the piston inducing movement of the piston to return to the first position such that the electrical conductor is electrically coupled with both the first electrode and the second electrode reestablishing the closed state.

21. The interrupter system of claim 16, further comprising:
a latching system cooperated with the piston, wherein the latching system is configured to latch the piston in a second position separated by a first distance along the length of the first chamber from the first position maintaining the open state, wherein the piston when in the second position is not electrically coupled with at least one of the first electrode and the second electrode.

22. The interrupter system of claim 16, further comprising:
a guard ring electrically coupled with the first electrode, wherein the guard ring comprises a conductive body formed in substantially a ring shape and is positioned to be electrically proximate to and extend circumferentially about at least a portion of the electrical conductor of the piston when the piston is in the first position.

23. The interrupter system of claim 22, further comprising:
a first electrode contact electrically coupled with the first electrode, wherein the first electrode contact is configured to cooperate with and to contact the electrical conductor of the piston when the piston is in the first position establishing the electrical coupling between the electrical conductor and the first electrode, and wherein the guard ring is separated from the first electrode contact by a second distance.

24. The interrupter of claim 16, wherein the piston further comprises:
an integral friction element, wherein the integral friction element is configured to contact a portion of the first chamber during at least a portion of the movement of the piston induced in response to the electromagnetic pulse and to stop the movement of the piston away from the first position.

25. The interrupter of claim 16, further comprising:
an insulating gas contained within the first chamber, wherein the chamber is configured to re-circulate the insulating gas in response to the induced movement of the piston along at least the portion of the length of the first chamber in response to the electromagnetic pulse such that the insulating gas is replenished proximate a first electrical contact and a second electrical contact that contact and electrically couple the electrical conductor of the piston with the first electrode and the second electrode, respectively; and
wherein the insulating gas is configured to inhibit electric arcs across a separation between the first electrical contact and the second electrical contact.

26. An interrupter system, comprising:
a first electrode;
a second electrode;
a chamber;
a piston positioned within the chamber, wherein the piston comprises an electrical conductor configured to electrically couple with both the first electrode and the second electrode and to establish an electrical path between the first electrode and a second electrode when the piston is in a first position establishing a closed state, and wherein the piston is configured to move along at least a portion of the chamber such that the piston is no longer electrically coupled with at least one of the first electrode and the second electrode such that there is no longer an electrical path between the first electrode and the second electrode; and
a guard ring electrically coupled with the first electrode, wherein the guard ring comprises a conductive body formed in substantially a ring shape and is positioned to be electrically proximate to and extend circumferentially about at least a portion of the electrical conductor of the piston when the piston is in the first position.

27. The interrupter system of claim 26 wherein the guard ring is positioned to be indirectly electrically proximate to at least the portion of the electrical conductor of the piston and extend circumferentially about at least a portion of a conductive portion of the chamber that extends circumferentially about at least a portion of the electrical conductor of the piston when the piston is in the first position.

28. The interrupter system of claim 26 wherein the guard ring is positioned to be directly electrically proximate to at least the portion of the electrical conductor of the piston and extend circumferentially about at least the portion of a conductive portion of the chamber that extends circumferentially about at least a portion of the electrical conductor of the piston when the piston is in the first position.

29. The interrupter system of claim 26, wherein the guard ring is configured to balance capacitive coupling between a first electrode contact of the first electrode and a second electrode contact of the second electrode, wherein the first electrode contact and the second electrode contact are positioned to be in contact with and electrically coupled with the electrical conductor of the piston when the piston is in the first position.

30. The interrupter system of claim 29, wherein the guard ring is separated from the first electrode contact by a first distance.

31. An interrupter system, comprising:
a first electrode;
a second electrode;
a chamber;
a piston positioned within the chamber, wherein the piston is configured to electrically couple with both the first electrode and the second electrode establishing an electrical path between the first electrode and a second electrode when the piston is in a first position establishing a closed state, and wherein the piston is configured to move along at least a portion of the chamber such that the piston is no longer electrically coupled with at least one of the first electrode and the second electrode such that there is no longer an electrical path between the first electrode and the second electrode;
a gas within the chamber; and
a valve cooperated with the chamber, wherein the valve is biased closed and configured to open in response increased pressure on the gas caused by the movement of the piston away from the first position and to at least dissipate kinetic energy of the piston as it moves away from the first position.

32. The interrupter system of claim 31, further comprising:
a controller configured to induce the movement of the piston in response to threshold conditions.

33. A method of interrupting an electrical current, the method comprising:
positioning a piston comprising a conductor in a first position such that a conductor of the piston is in contact with electrical contacts providing a conductive path between a first electrode and a second electrode;
detecting a condition in excess of a threshold;

driving the piston away from the electrical contacts breaking the conductive path between the first electrode and the second electrode and establishing an open state;

controlling a deceleration of the piston as it is driven away from the electrical contacts; and arresting movement of the piston at a second position separate from the first position such that the piston is not electrically coupled with at least one of the first electrode and the second electrode when in the second position while maintaining the piston in a position to be returned to the first position.

34. The method of claim 33, further comprising:

activating closing control to move the piston to return the piston to the first position such that the conductor of the piston contacts the electrical contacts and reestablishing the conductive path between the first electrode and the second electrode and the closed state.

35. The method of claim 34, wherein the activating the closing control comprises:

pumping a gas proximate the piston inducing an increased pressure on the piston and driving the piston back to the first position.

36. The method of claim 34, wherein the activating the closing control comprises:

activating an actuator to contact and move the piston back to the first position.

37. The method of claim 33, wherein the driving the piston away from the electrical contacts comprises:

inducing a magnetic field pulse proximate the piston causing the piston to move away from the electrical contacts establishing the open state.

38. The method of claim 33, wherein the controlling the deceleration of the piston comprises:

allowing a pressure, within a chamber in which the piston travels while being driven away from the first position, to increase as the piston travels along the chamber; and controlling a release of pressure within the chamber as the pressure exceeds a threshold pressure caused by the movement of the piston along at least a portion of a length of the chamber as the piston is driven from the first position and along at least the portion of the length of the chamber.

39. The method of claim 38, further comprising:

redirecting gas released in response to the releasing of the pressure within the chamber causing an increase in pressure against the piston between the piston and the electrical contacts; and preventing the piston from returning to the first position as a result of the increased pressure between the piston and the first electrical contact and the second electrical contact.

40. The method of claim 33, wherein the controlling the deceleration of the piston comprises inducing a friction force between the piston and a chamber in which the piston travels while being driven away from the first position.

41. A method of interrupting an electrical current, the method comprising:

positioning a piston in a first position electrically coupled with a first electrode and a second electrode with the piston establishing an electrically conductive path between the first electrode and the second electrode when in the first position providing a closed state;

inducing a magnetic field pulse proximate the piston while in the first position driving the piston away from the first position and the electrical coupling with the first electrode and the second electrode establishing an open state such that the piston is no longer electrically coupled with at least one of the first electrode and the second electrode and breaking the electrically conductive path between the first electrode and the second electrode; and controlling movement of the piston as the piston is being driven away from the first position.

42. A method of interrupting an electrical current, the method comprising:

positioning a piston comprising a conductor in a first position such that the conductor of the piston is in contact with electrical contacts that are electrically coupled with first and second electrodes and providing a conductive path between the first electrode and a second electrode;

driving the piston away from the electrical contacts breaking the conductive path between the first electrode and the second electrode and establishing an open state; and activating closing control to drive the piston to return the piston to the first position when a threshold condition is satisfied such that the conductor of the piston contacts the electrical contacts and reestablishing the conductive path between the first electrode and the second electrode and the closed state.

* * * * *

UNITED STATES PATENT AND TRADEMARK OFFICE
CERTIFICATE OF CORRECTION

PATENT NO.         : 9,054,530 B2                                        Page 1 of 1
APPLICATION NO.    : 13/870615
DATED              : June 9, 2015
INVENTOR(S)        : Drake et al.

It is certified that error appears in the above-identified patent and that said Letters Patent is hereby corrected as shown below:

In the CLAIMS:
   Claim 20, column 41, line 1, delete "interrupter" and insert --interrupter system--.
   Claim 24, column 41, line 33, delete "interrupter" and insert --interrupter system--.
   Claim 25, column 41, line 41, delete "interrupter" and insert --interrupter system--.

Signed and Sealed this
Twelfth Day of January, 2016

Michelle K. Lee
*Director of the United States Patent and Trademark Office*